(12) United States Patent
Nozaki et al.

(10) Patent No.: US 8,189,059 B2
(45) Date of Patent: May 29, 2012

(54) DIGITAL CAMERA AND DIGITAL CAMERA SYSTEM

(75) Inventors: Hirotake Nozaki, Ko-to-ku (JP);
Takumi Kawahara, Ichikawa (JP);
Toshiaki Kobayashi, Nishigo-mura (JP);
Norikazu Yokonuma, Adachi-ku (JP);
Kazuyuki Kazami, Chuo-ku (JP);
Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 1074 days.

(21) Appl. No.: 10/758,178

(22) Filed: Jan. 16, 2004

(65) Prior Publication Data
US 2004/0150724 A1 Aug. 5, 2004

(30) Foreign Application Priority Data

| Jan. 29, 2003 | (JP) | 2003-019709 |
| Jan. 29, 2003 | (JP) | 2003-019710 |
| Jan. 29, 2003 | (JP) | 2003-019711 |
| Jan. 29, 2003 | (JP) | 2003-019712 |
| Jan. 29, 2003 | (JP) | 2003-019713 |
| Jan. 29, 2003 | (JP) | 2003-019769 |
| Jan. 29, 2003 | (JP) | 2003-019770 |
| Jan. 29, 2003 | (JP) | 2003-019771 |
| Jan. 29, 2003 | (JP) | 2003-019772 |
| Jan. 29, 2003 | (JP) | 2003-019773 |

(51) Int. Cl.
*H04N 5/232* (2006.01)
*H04N 9/04* (2006.01)
*H04N 5/225* (2006.01)

(52) U.S. Cl. ............... 348/211.3; 348/207.99

(58) Field of Classification Search .......... 348/207.1, 348/207.11, 211.99, 211.1, 211.2, 211.3, 348/211.4, 211.5, 211.6, 211.7, 211.8, 211.9, 348/211.11, 211.12, 211.13, 211.14
See application file for complete search history.

(56) References Cited

U.S. PATENT DOCUMENTS

| 5,861,918 | A  | * | 1/1999  | Anderson et al. | 348/231.9 |
| 6,067,624 | A  | * | 5/2000  | Kuno | 726/17 |
| 6,188,431 | B1 | * | 2/2001  | Oie | 348/211.5 |
| 6,204,877 | B1 |   | 3/2001  | Kiyokawa | |
| 6,463,215 | B1 |   | 10/2002 | O'Connolly et al. | |
| 6,670,933 | B1 | * | 12/2003 | Yamazaki | 345/1.1 |
| 6,670,984 | B1 | * | 12/2003 | Tanaka et al. | 348/159 |
| 6,774,935 | B1 | * | 8/2004  | Morimoto et al. | 348/211.5 |
| 6,819,355 | B1 | * | 11/2004 | Niikawa | 348/207.11 |
| 6,864,911 | B1 | * | 3/2005  | Zhang et al. | 348/42 |

(Continued)

FOREIGN PATENT DOCUMENTS

JP A 8-084282 3/1996

(Continued)

*Primary Examiner* — Albert Cutler
(74) *Attorney, Agent, or Firm* — Oliff & Berridge, PLC

(57) ABSTRACT

In a collaborating work, it is to provide a digital camera in which camera information about each camera is displayed on a monitor of a master camera and a memory status of each memory card in use is also displayed and further, when monitoring a video from a slave camera, a size of a display screen can be manually set and in a digital camera system at collaborating work, a first digital camera is provided with camera information about each digital camera, a total memory capacity, a total sum of shot-taken frame numbers, a total remaining memory capacity or a display device indicating a total sum of remaining frame numbers. Camera information is information that is required to be set when instructing a shooting work or a storage work or to specify a second digital camera.

4 Claims, 56 Drawing Sheets

U.S. PATENT DOCUMENTS

| | | |
|---|---|---|
| 6,965,399 B1 * | 11/2005 | Oka et al. .................. 348/211.99 |
| 7,042,500 B1 | 5/2006 | Niikawa |
| 7,046,292 B2 * | 5/2006 | Ziemkowski .................. 348/371 |
| 7,106,364 B1 * | 9/2006 | Noro et al. .................. 348/211.3 |
| 7,535,491 B1 * | 5/2009 | Kumagai et al. ............ 348/211.1 |
| 2002/0037711 A1 | 3/2002 | Mizutani |
| 2002/0118958 A1 | 8/2002 | Ishikawa et al. |
| 2003/0011683 A1 * | 1/2003 | Yamasaki et al. ........... 348/207.1 |
| 2003/0071912 A1 * | 4/2003 | Minakuti ....................... 348/372 |
| 2003/0160870 A1 * | 8/2003 | Ziemkowski ............. 348/207.99 |
| 2004/0201688 A1 * | 10/2004 | Wolf et al. .................. 348/207.1 |

FOREIGN PATENT DOCUMENTS

| | | |
|---|---|---|
| JP | A 08-140025 | 5/1996 |
| JP | A 9-284696 | 10/1997 |
| JP | A 2000-113166 | 4/2000 |
| JP | A 2000-134527 | 5/2000 |
| JP | A 2001-8089 | 1/2001 |
| JP | A 2001-024928 | 1/2001 |
| JP | A 2001-109037 | 4/2001 |
| JP | A 2001-111866 | 4/2001 |
| JP | A 2001-166374 | 6/2001 |
| JP | A 2001-169173 | 6/2001 |
| JP | A 2001-333365 | 11/2001 |
| JP | A 2002-101226 | 4/2002 |
| JP | A 2002-158906 | 5/2002 |
| JP | A 2002-330328 | 11/2002 |

* cited by examiner

```
┌─────────────────────────────────┬─────────────────────────────────┐
│          CAMERA A               │          CAMERA B               │
│                                 │                                 │
│  · CAMERA NAME                  │  · CAMERA NAME                  │
│  · MAKER                        │  · MAKER                        │
│  · SERIAL NUMBER                │  · SERIAL NUMBER                │
│  · CARD TYPE                    │  · CARD TYPE                    │
│  · CARD CAPACITY                │  · CARD CAPACITY                │
│  · RECORDED FRAME NUMBER        │  · RECORDED FRAME NUMBER        │
│  · REMAINING FRAME NUMBER       │  · REMAINING FRAME NUMBER       │
│         · · · · · ·             │         · · · · · ·             │
│         · · · · · ·             │         · · · · · ·             │
└─────────────────────────────────┴─────────────────────────────────┘

TTL R/F/N      OOO  FRAMES
            TRANSFER RATE  ×××  KBPS
```

FIG. 34

POWER OF CAMERA B RUNS SHORT.

PLEASE REPLACE SOON.

! ! !

CHARGE BUTTERY ?

No    Yes

SET CHANGE OF INCREMENT STEP

INCREMENT STEP : 1/3   2/3   1

CAMERA A   ■   ☐   ☐

CAMERA B   ☐   ☐   ■

BRACKET (SHOOTING DISTANCE) SETTING

· NORMAL BRACKET

· SHOOT AT PLURAL PEAK POSITIONS

· SHOOT AT ESTABLISHED PLURAL POSITIONS

FLASH AMOUNT SETTING

|  | 0 | | 50% | | 100% |
|---|---|---|---|---|---|
| CAMERA A | ☐ | ☐ | ■ | ☐ | ☐ |
| CAMERA B | ☐ | ■ | ☐ | ☐ | ☐ |
| CAMERA C | ☐ | ■ | ☐ | ☐ | ☐ |

SELECTION OF SHOOTING/STORAGE CONDITIONS SETTING METHOD

- DEFAULT (PREDETERMINED SETTING TO ALL CAMERAS)
- SLAVE'S SETTING IDENTICAL TO MASTER
- INDIVIDUAL SELECTION OF SETTING CAMERA
    - CAMERA A
    - CAMERA B
    - CAMERA C

RELATING OF SHOOTING DATA

FILE NAME     DSC002BAC

- MASTER CAMERA                      Nikon A

- SHOOTING CAMERA                    Nikon B

- ANOTHER COLLABORATING CAMERA       Nikon C

- CAMERA INFOR. FILE NAME            CAMERA INFOR. ABC

IMAGE DATA AREA

FIG. 65

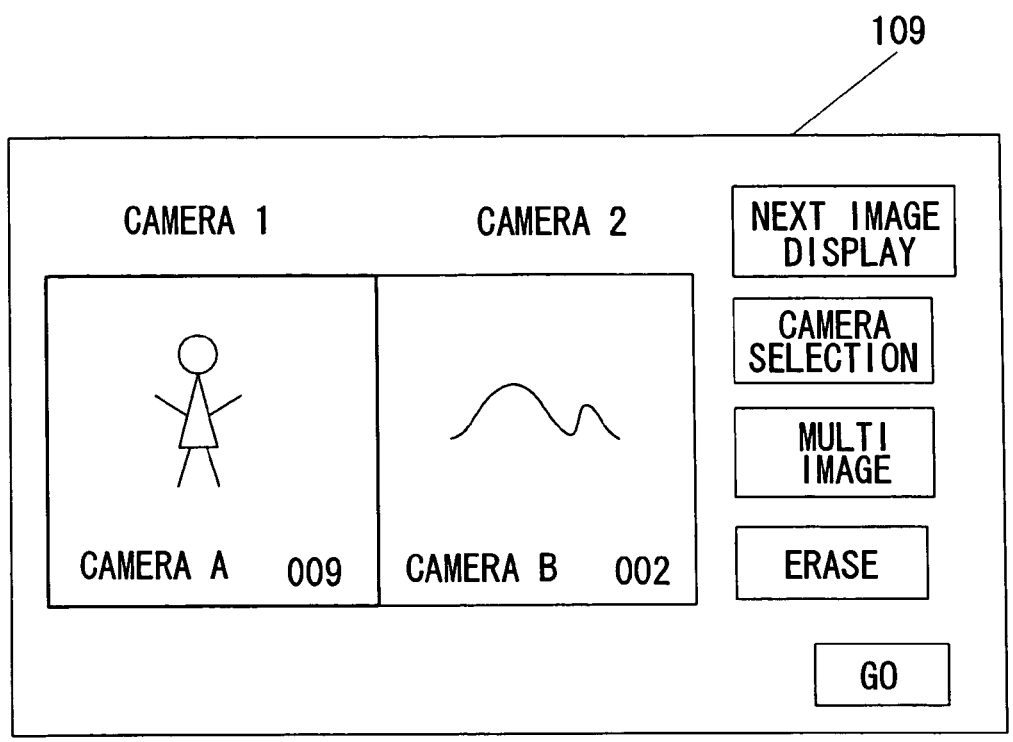
MULTI IMAGE CHECK
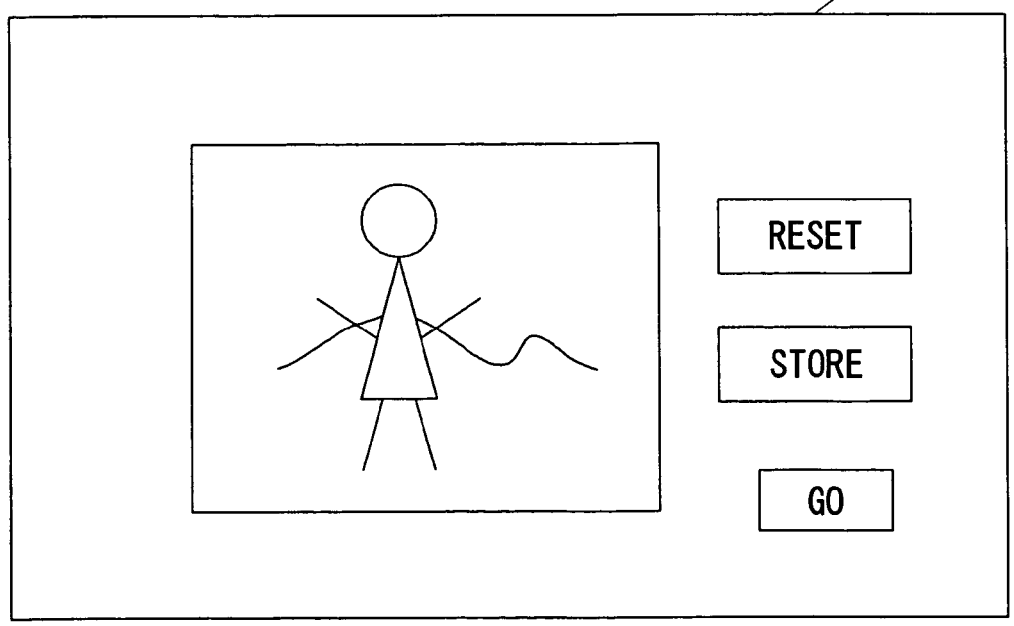
FIG. 67

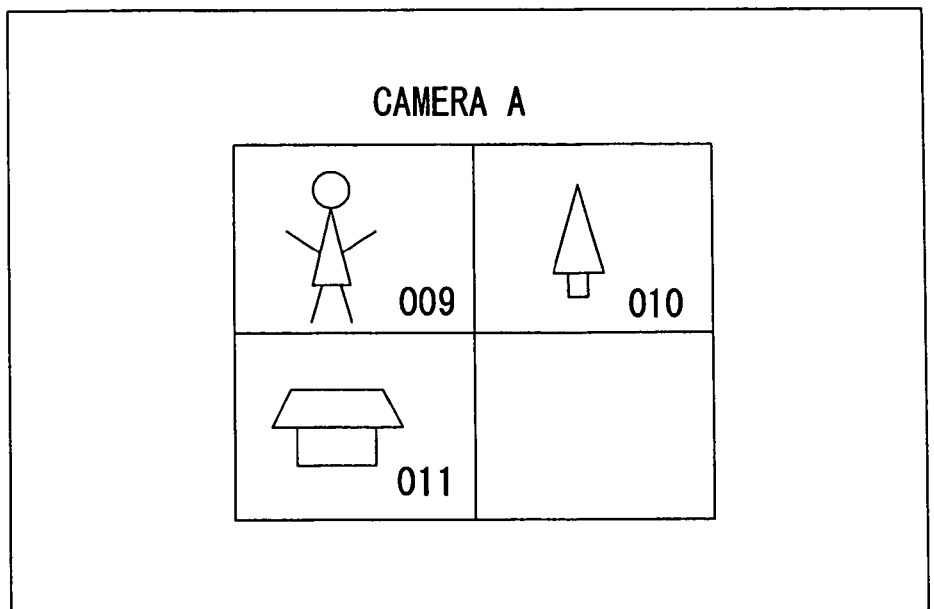
UP BUTTON
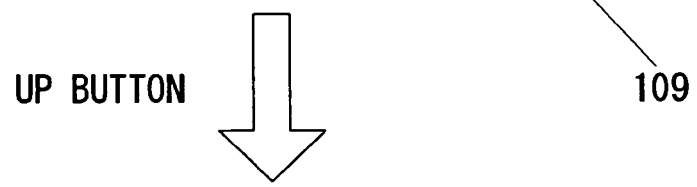
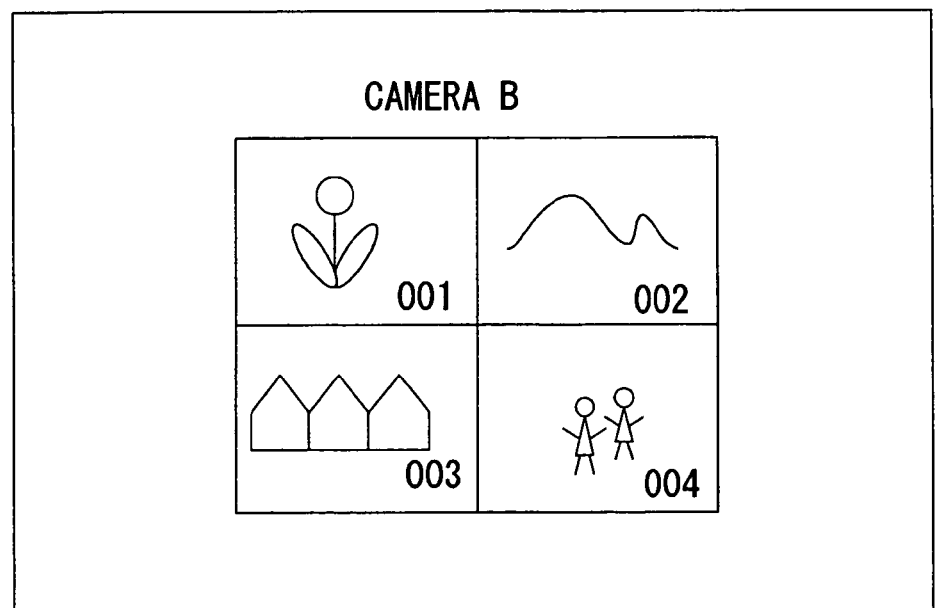
FIG. 68

DIGITAL CAMERA AND DIGITAL CAMERA SYSTEM

INCORPORATION BY REFERENCE

This application is based upon and claims priorities of Japanese Patent Applications No. 2003-019709 filed on Jan. 29, 2003,
No. 2003-019710 filed on Jan. 29, 2003,
No. 2003-019711 filed on Jan. 29, 2003,
No. 2003-019712 filed on Jan. 29, 2003,
No. 2003-019713 filed on Jan. 29, 2003,
No. 2003-019769 filed on Jan. 29, 2003,
No. 2003-019770 filed on Jan. 29, 2003,
No. 2003-019771 filed on Jan. 29, 2003,
No. 2003-019772 filed on Jan. 29, 2003 and
No. 2003-019773 filed on Jan. 29, 2003, the contents being incorporated herein by reference.

BACKGROUND OF THE INVENTION

1. Field of the Invention

The present invention relates to a digital camera system connecting plural units of digital cameras and letting the camera collaborate to work.

2. Description of Related Art

In this field of the art, there are the needs for making a hard copy of an image taken by a digital camera with a page printer directly, not through a personal computer, various systems have been introduced from many companies and some of them have been actually marketed as a commercial product. On top of that, as an interface standard, for example, in the field of USB (Universal Serial Bus) standard, USB On-The-Go standard that enables even a mobile apparatus only with simple functions to act as a host with a decreased load of a master but not using a large apparatus like personal computer and the like has been released as a additional standard to USB2.0. With this standard, even a mobile apparatus can be a host and also each role of a host and a peripheral apparatus can be replaced at any time when required.

As other standards sending/receiving a data to and from apparatus, various standards like Bluetooth standard, wireless LAN (IEEE802.11 and others), IEEE1394, IrDA (Infrared Data Association) and IrBurst (IrDA for a next generation version) have been proposed. With improvement of the data transfer infrastructure in this way, it is obvious that a data exchange between compact apparatus such as a digital camera, a printer, a PDA, a mobile cellular phone and a hard disk drive compatible with USB will be made more frequently regardless of makers and product models.

And, many companies have put a variety of digital cameras on the marketplace with a short product cycle, so a going price of a digital camera marketed just while ago goes down drastically and getting a camera becomes easy. Under this market situation, there are not few households that have plural digital cameras. Accordingly, a market environment enabling a consumer to have or easily obtain plural cameras becomes available for a consumer and then there are the needs that a consumer wants to try a new way of usage that has been impossible with a single camera by using several cameras.

Japanese Patent application (hereinafter referred to as JPA) 8-84282 introduces a system in which a master camera sends to a slave camera an operation data like a zooming and a focusing and the slave camera takes a shot and then sends a compressed image to the master camera where the taken compressed image is checked. JPA 9-284696 discloses a system in which connected electric cameras via a communication device lets a camera with a specific key being pressed act as a master camera and the master camera takes a picture, erase an image data of the salve camera through an operation of a slave camera and monitors an image of a slave camera. JPA 2000-113166 proposes a server for controlling a camera in order to cause several cameras to connect to work via a network.

In JPA 2000-134527 where a digital camera is connected to each other and one digital camera operates other digital camera, a reproduced image of a slave camera is transferred to a master camera with a frame number simultaneously and displayed. JPA2001-8089 proposes a system in which shooting information about a shutter speed, an aperture value, an exposure compensation value and so is transferred to a slave camera and a picture is taken based upon this information. Japan Patent Applications 2001-111866 and 2001-169173 propose a system in which a common image is taken connecting plural digital cameras with different functions. JPA2001-166374 proposes a trigger system in which each camera can take a higher speed shot than a burst shot is taken by each camera, controlling plural cameras. USP2002/0118958 discloses a video camera system in which a parent device and a child device take a picture in response to a synchronization signal sent from the parent device and this data is sent/received. JPA2002-101226 discloses an imaging device that changes a capacity of an image to be sent/received corresponding to a data transfer capacity.

The foregoing various standards define a data transfer method, but not a working role of each camera in connecting plural digital cameras. Although a digital camera loaded with Bluetooth is available now in the marketplace, its function is quite simple to transfer a data between cameras and instruct to release a shutter from other camera.

It is an object of this invention to provide a digital camera and a digital camera system having a new function that will be realized for the first time when letting plural cameras collaborate to work.

SUMMARY OF THE INVENTION

In order to achieve the object, according to a first aspect of this invention, there is provided a digital camera system includes a first digital camera and a second digital camera, wherein the first digital camera and the second digital camera are capable of communicating with each other and the first digital camera further includes a first input/output device that sends/receives a data to and from the second digital camera, a first plurality of operating devices and a first detector that detects an operation of any of the first plurality of operating devices and the second digital camera further includes a second input/output device that sends/receives a data to and from the first digital camera, a second plurality of operating devices, a second detector that detects an operation of any of the second plurality of operating devices, a judgment device that judges which detection result was first detected and, when the judgment device judges that the detection result of the second detector was first detected prior to the detection result of the first detector, a first controller that controls the first digital camera based upon an operation of any of the second plurality of operating devices. That's it, when connecting plural cameras and executing a collaborating work, it is required to establish a relationship between a master and a slave, but according to this invention, there is no need to take the trouble to especially set a master camera and a slave camera.

According to another aspect of this invention, when the judgment device judges that the detection result of the first detector was first detected prior to the detection result of the second detector, the first controller is prohibited from controlling the first digital camera. Thus, once a camera is set as a slave camera, this camera cannot control a master camera.

According to another aspect of this invention, the first digital camera further includes a second controller controlling the first digital camera based upon an operation of any of the first plurality of operating devices and the second controller is prohibited from controlling the first digital camera while the first digital camera is being controlled by the first controller, so the master camera does not accept any control from the operating device of the slave camera until the master camera's control over the salve camera is completed.

According to another aspect of this invention, the first digital camera further includes a second controller controlling the first digital camera based upon an operation of any of the first plurality of operating devices and the first controller is prohibited from controlling the first digital camera while the first digital camera is being controlled by the second controller, so the slave camera does not accept any control from the master camera until the operation by the operating device of the slave camera per se is completed.

According to another aspect of this invention, a digital camera includes a connector that connects to other digital camera via a communication line, a setting device that sets a given item or given value to take a photograph and a setting instructor that instructs the other digital camera via the connector so as to set the identical given item or given value simultaneously based upon a setting result of the setting instructor. Namely, as the identical and simultaneous settings to plural digital cameras are possible, a setting becomes easy.

According to another aspect of this invention, the given item or the given value is at least one of an exposure condition, a light metering, White Balance (WB) condition, a shooting lens position, a zoom lens position, a shutter speed, an aperture value, chromaticness, a shooting sensitivity, edge enhancement value, a compression ratio, a number of recording pixels and a time setting.

According to another aspect of this invention, the digital camera further includes a camera judgment device that judges a type of the other digital camera and the setting instructor sends out to the other digital camera a compensation value corresponding to the given item or the given value based upon a judgment result of the camera judgment device. Thus, variations in a product property depending upon a digital camera type can be corrected.

According to another aspect of this invention, the given item is at least one of White Balance, a shutter speed, an aperture value, chromaticness, edge enhancement value and a shooting sensitivity.

According to another aspect of this invention, a digital camera includes an input/output device that sends/receives a signal to and from other apparatus, a judgment device that judges a type of the other apparatus connected to the input/output device and a work mode changer that changes from a first work mode to a second work mode when the judgment device judges that the other apparatus is a digital camera. That's it, it is judged that a peripheral apparatus connected to a digital camera is a digital camera and then a different work mode gets in.

According to another aspect of this invention, the first work mode is a mode in which the digital camera works on a stand-alone basis and the second work mode is a mode in which the digital camera and the other digital camera collaborate to work.

According to another aspect of this invention, a digital camera includes a connector that connects to other digital camera via a communication line, a plurality of operating devices, a controller that controls the other digital camera in response to an operation of the plurality of operating devices via the communication line, an instructor that instructs to halt a part of plural functions to cause a camera to work and an releaser that releases a control over the other digital camera by the controller in response to an instruction of the instructor and then a setting set by the master camera is released in response to halting a part of functions.

According to another aspect of this invention, a digital camera includes a connector that connects to other digital camera via a communication line, a plurality of operating devices, a controller that controls the other digital camera in response to an operation of the plurality of operating devices via the communication line, a timer that counts a lapsed period of time after completion of a control based upon an operation of the plurality of operating devices and an releaser that releases a control over the other digital camera by the controller in response to an instruction of the timer. Namely, with an instruction of a timer after completion of a collaborating work, a setting set by the master camera is released.

According to another aspect of this invention, a digital camera includes a connector that connects to other digital camera via a communication line, a plurality of operating devices, a controller that controls the other digital camera in response to an operation of the plurality of operating devices via the connector, a timer that instructs to halt at least a part of functions and a storage device that stores so as to continue a control over the other digital camera by the controller in response to an instruction of the timer. Namely, the timer halts a part of functions of a digital camera and also a storage device stores a going setting set by the master camera so as to continue the going setting and then a relationship between the master and the slave is maintained even afterward.

According to another aspect of this invention, a digital camera includes a connector that connects to other digital camera via a communication line, a plurality of operating devices, a controller that controls the other digital camera in response to an operation of the plurality of operating devices via the connector, a disconnect detector that detects a disconnect to the other digital camera via the connector and a releaser that releases an control over the other digital camera by the controller corresponding to a detection result of the detector. Thus, when disconnecting to the other digital camera, a work of the master camera is released.

According to another aspect of this invention, a digital camera includes a connector that connects to other digital camera via a communication line, a plurality of operating devices, a controller that controls the other camera in response to an operation of the plurality of operating devices via the connector, a disconnect detector that detects a disconnect to the other digital camera via the connector, a re-connect detector that detects a re-connect to the other digital camera again via the connector after the disconnect detector detected the disconnect to the other digital camera and an instructor that instructs the controller to control the other digital camera after the re-connect detector detected the re-connect to the other digital camera again via the connector. That's it, even when disconnecting to the other digital camera, a going setting set by the master camera is maintained.

According to another aspect of this invention, a digital camera includes a connector that connects to other digital camera via a communication line, an input device that inputs camera information about the other digital camera via the connector and a display device that displays the camera information. Namely, as camera information about the other camera at collaborating work can be displayed simultaneously on a display device of a single camera, it becomes easier to check a shooting condition and the like.

According to another aspect of this invention, the camera information is information that the other digital camera requires so as to take and store a photograph of a subject.

According to another aspect of this invention, the information required for a shooting and storage includes information about at least one of items like an exposure condition, a light metering, White Balance, an auto focus (AF) area setting, a single or continuous auto focus (AF) setting, exposure compensation, edge enhancement, gradation compensation, chromaticness setting, a shooting sensitivity, a ranging method, a bracket shot setting, a consecutive shot setting, a strobe setting, a compression ratio setting including decompression and a number of recording pixels of other digital camera. Thus, further detailed settings that are set to other digital camera can be easily checked.

According to another aspect of this invention, the camera information is information in order for the digital camera to recognize a going status quo of the other digital camera.

According to another aspect of this invention, the information to recognize the going status quo includes information about at least one of camera type information, battery type information, battery capacity information, battery remaining capacity information, a memory-for-storage availability information, memory type information, remaining non-shot-taken frame number information and memory-full information.

According to another aspect of this invention, the digital camera further includes a calculator that calculates at least one of a total sum of a capacity, a total sum of photographed frame numbers, a total sum of a battery remaining memory capacity and a total sum of remaining non-shot-taken frame numbers of a storage medium that stores image data of the digital camera and the other digital camera based upon the camera information and causes a calculated one to be displayed on the display device. Thus, an amount of storage in cameras as a whole at collaborating work can be easily grasped.

According to another aspect of this invention, a digital camera includes a connector that connects to other digital camera via a communication line, a display device that displays an image data and a controller that controls so as to let a plurality of image data including an image data stored into the other digital camera appear in given order on the display device when connecting to the other digital camera via the connector. Therefore, a single display device of a digital camera at collaborating work enables to display stored image data including an image data of the other digital camera in given order.

According to another aspect of this invention, the digital camera further includes a display image changer that changes a display image on the display device and the controller displays the display image in the given order on the display device in response to an instruction of the display image changer. Namely, with an operation of an Up/Down button, for instance, contents of image data including an image data of the other digital camera to be displayed are changed in given order.

According to another aspect of this invention, the digital camera further includes a reproduction instructor that instructs to reproduce an image data and to display the image data on the display device and the controller changes the display image automatically in response to an instruction of the reproduction instructor and displays a display image. Accordingly, with an instruction of reproduction, an automatic change of reproduced image data to be displayed can be made like a "slide show" involving the other digital camera.

According to another aspect of this invention, the digital camera further includes a judgment device that judges a shot order of an image data to be displayed on the display device and the controller controls so as to set an order to be displayed on the display device in response to the shot order judged by the judgment device.

According to another aspect of this invention, the digital camera further includes a camera judgment device that judges a camera into which a reproduced image data to be displayed on the display device is stored, a specific image detector that detects that the reproduced image data displayed on the display device is a specific image of image data stored into the camera judged by the camera judgment device and a camera selector that selects a different camera having an image data unlike a camera reproducing so far when an image data displayed on the display device is detected as the specific image data by the specific image detector.

According to another aspect of this invention, the specific image data is any of a last image data of image data stored into a camera selected by the camera selector or a last image data of all selected image data stored into a camera selected by the camera selector.

According to another aspect of this invention, the display device uses any of a single screen display method that displays an image data equivalent to a single frame reproduced from the digital camera or the other digital camera on the display device or a multi screen display method that displays at one time image data equivalent to plural frames reproduced from the digital camera or the other digital camera on a single screen of the display device. Accordingly, not only a single frame reproduction but also a divided-frame reproduction is possible.

According to another aspect of this invention, a digital camera includes a connector that connects to other digital camera via a communication line, a display device that displays an image data when connecting to the other digital camera via the connector, a display instructor that instructs to display an image data stored into the other digital camera on the display device and a transfer instructor that instructs the other digital camera to transfer an image data used for a display having a given number of pixels. In other words, an image data only sufficient to display on the display device is transferred, so a transfer time can be shortened.

According to another aspect of this invention, the digital camera further includes a data detector that detects an amount of a data in an image data stored into the other digital camera, a comparison device that compares a detection result of the data detector to a given value and the transfer instructor instructs the other digital camera to transfer an image data used for a display having a given number of pixels in response to a comparison result of the comparison device. So, to an image data exceeding a given value, only an image data used for a display is transferred.

According to another aspect of this invention, a display image having the given number of pixels is a data equivalent to a number of pixels that corresponds to almost an entire screen of a display screen determined based upon a number of pixels of the display device or corresponds to each divided single screen in dividing the display screen into a given number of screens.

According to another aspect of this invention, a digital camera includes a connector that connects to other digital camera via a communication line, a shot instructor that instructs to shoot a subject, a first judgment device that judges whether shooting is possible in response to an instruction of the shot instructor, a second judgment device that judges whether the other digital camera can shoot a subject in response to an instruction of the shot instructor when connecting to the other digital camera via the connector and a camera selecting device that selects a single shooting digital camera for shooting a subject from possible-to-shoot digital cameras judged by the first and the second judgment devices. Accordingly, at a time of a collaborating work, pressing a shutter enables a possible-to-shoot camera to be selected and a picture to be taken.

According to another aspect of this invention, the digital camera further includes a first buffer memory that temporarily stores data of plural photographed images and, when the first buffer memory has a remaining memory capacity equivalent to an amount of a data in an image to be created in taking at least a single picture of a subject, the first judgment device judges that the digital camera can shoot.

According to another aspect of this invention, in the event that a buffer memory of the other digital camera has a remaining memory capacity equivalent to an amount of a data of an image to be created when the other digital camera takes at least a single shot of a subject via the connector, the second judgment device judges that the other digital camera can shoot.

According to another aspect of this invention, the shot instructor further includes a consecutive shot instructor that instructs to repeat a consecutive shot taking of a subject at plural times in response to an instruction of the shot instructor. Thus, when a picture taking becomes impossible with the same digital camera, immediately consecutive picture-takings can be continued with the other digital camera.

According to another aspect of this invention, a digital camera includes a connector that connects to other digital camera via a communication line, a shot start instructor that instructs to start shooting, a first consecutive shot instructor that instructs to repeat a consecutive taking shot of a subject at plural times in response to an instruction of the shot start instructor, a second consecutive shot instructor that instructs the other digital camera to repeat a consecutive shot taking of a subject at plural times via the connector in response to an instruction of the shot start instructor, a consecutive shot selector that select any of the first consecutive shot instructor or the second consecutive shot instructor, a counter that counts a number of consecutive shot frames, a frame number comparison device that compares a given number of frames to a number of consecutive shot frames taken by any of the first consecutive shot instructor or the second consecutive shot instructor selected by the consecutive shot selector in response to an instruction of the shot start instructor and a consecutive shot controller that controls the consecutive shot selector so as to select a different consecutive shot instructor from the selected going consecutive shot instructor when the frame number comparison device judges that the number of consecutive shot frames amounts to the given number of frames. Accordingly, at a time of a collaborating consecutive shot taking, a counter of the same digital camera counts a number of consecutive shot frames and when the number reaches the given number of the frames, the other digital camera continues the consecutive shot. Thus, a consecutive shot can be continuously succeeded to and from digital cameras smoothly.

According to another aspect of this invention, the digital camera further includes a storage device that stores a maximum number of possible-to-take consecutive shot frames and a maximum number of possible-to-take consecutive shot frames of the other digital camera respectively and the given number of frames is a maximum number of frames stored into the storage device of a shooting digital camera in response to any of the first consecutive shot instructor or the second consecutive shot instructor selected by the consecutive shot selector.

According to another aspect of this invention, a digital camera includes a connector that connects to other digital camera via a communication line, a shot start instructor that instructs to start shooting, a first consecutive shot instructor that instructs to repeat a consecutive shot taking of a subject at plural times in response to an instruction of the shot start instructor, a second consecutive shot instructor that instructs the other digital camera to repeat a consecutive shot taking of a subject at plural times via the connectors in response to an instruction of the shot start instructor, a consecutive shot selector that selects any of the first consecutive shot instructor or the second consecutive shot instructor, a first memory capacity detector that detects an amount of a remaining capacity in a memory into which a data of a photographed image is temporarily stored when the consecutive shot selector selects the first consecutive shot selector, a second memory capacity detector that detects an amount of a remaining capacity in a memory into which a data of a photographed image of the other digital camera is temporarily stored via the connector when the consecutive shot selector selects the second consecutive shot selector, a memory capacity comparison device that compares a given value to a result detected by any of the first memory capacity detector or the second memory capacity detector per each shot completion in a consecutive shot in response to any of the first consecutive shot instructor or the second consecutive shot instructor selected by the consecutive shot selector based upon an instruction of the shot instructor and a consecutive shot controller that controls the consecutive shot selector so as to select a different consecutive shot instructor from the selected consecutive shot instructor when the memory capacity comparison device judges that a result detected by any of the first memory capacity detector or the second memory capacity detector amounts to the given value. Namely, at a time of a collaborating consecutive shot taking, with detection of a remaining amount of a memory in a digital camera taking a consecutive shot, when the remaining amount reaches a given value, other digital camera unlike a going shooting digital camera succeeds the consecutive shot.

According to another aspect of this invention, the digital camera further includes an image data value storage device that stores a first value smaller than an image data equivalent to a single frame taken by the first consecutive shot instructor and a second value smaller than an image data equivalent to a single frame taken by the second consecutive shot instructor and the given value is any of the first value or the second value stored into the image data value storage device.

According to another aspect of this invention, a digital camera includes a connector that connects to other digital camera via a communication line, a first consecutive shot instructor that instructs to repeat a consecutive shot taking of a subject at plural times, a second consecutive shot instructor that instructs the other digital camera to take a shot via the connector after a given period of time elapses from each shooting time based upon the first consecutive shot instructor, a shot interval storage device that stores a minimum consecutive shot interval of the other digital camera input via the connector and a calculator that calculates the given period of time based upon a minimum consecutive shot interval stored into the shot interval storage device and a minimum consecutive shot interval of the digital camera per se. Accordingly, by instructing other digital camera to take a shot at a pause between consecutive shot takings taken by digital cameras, the consecutive shots can be taken alternatively. When comparing to a consecutive shot taken by a single digital camera, a faster consecutive shot can be attained and also, a calculating device is provided to calculate the given period of time based upon each minimum consecutive shot interval.

According to another aspect of this invention, the calculator calculates to let two-times the given period of time be a shot interval of a consecutive shot taken by the first consecutive shot instructor.

According to another aspect of this invention, a digital camera includes a connector that connects to other camera via a communication line, a first bracket shot controller that controls so as to execute a first bracket shot with several shots by shifting a first shooting condition in shooting a subject and a second bracket shot controller that controls the other digital camera via the connector so as to execute a second bracket shot with several shots by shifting a second shooting condition unlike the first shooting condition. Accordingly, at a time of a collaborating shot, a different bracket shot can be taken.

According to another aspect of this invention, the digital camera further includes a shot taking instructor that instructs the digital camera and the other digital camera to take a shot. The shot taking instructor instructs the digital camera and the other digital camera simultaneously or a different time to take a shot.

According to another aspect of this invention, the first shooting condition and the second shooting condition include at least one of shooting conditions like an exposure, White Balance, a focusing lens position, a zoom lens position, a gamma value, an exposure mode and a shooting sensitivity.

According to another aspect of this invention, a digital camera includes a connector that connects to other digital camera via a communication line, a first bracket shot controller that controls so as to execute a first bracket shot with several shots by shifting a shooting condition by a given compensation value in shooting a subject and a second bracket shot controller that controls so as to let the other digital camera executes a second shot with several shots with a compensation value unlike the given compensation value via the connector. Namely, cameras are controlled so as to take a bracket shot with a different increment step from each other between cameras.

According to another aspect of this invention, the digital camera further includes a shot taking instructor that instructs the digital camera and the other digital camera to take a shot. Thus, the shot taking instructor instructs the digital camera and the other digital camera simultaneously or a different time to take a shot.

According to another aspect of this invention, the shooting condition includes at least one of shooting conditions like an exposure, White Balance, a focusing lens position, a zoom lens position, a gamma value, an exposure mode and a shooting sensitivity.

According to another aspect of this invention, a digital camera includes a connector that connects to other digital camera via a communication line, a first shot executor that controls so as to decide a shooting condition and execute a shot and a second shot executor that controls the other digital camera so as to let the other digital camera execute a shot by shifting the shooting condition by a given compensation value via the connector. That's it, a different condition can be set by shifting from the correct condition by a given increment step.

According to another aspect of this invention, the digital camera further includes a simultaneous shot taking instructor that instructs the digital camera and the other digital camera to take a shot simultaneously. Therefore, a simultaneous bracket shot becomes possible.

According to another aspect of this invention, the shooting condition includes at least one of shooting conditions like an exposure, White Balance, a focusing lens position, a zoom lens position, a gamma value, an exposure mode and a shooting sensitivity.

According to another aspect of this invention, a digital camera includes a connector that connects to other digital camera via a communication line, a shot instructor that instructs to take a shot of a subject and a shooting camera setting device that sets a digital camera to take a shot of a subject in response to an instruction of the shot instructor. Accordingly, at a time of a collaborating shot, a master camera instructs to take a shot and then cameras including a slave camera can take a shot of a subject simultaneously.

According to another aspect of this invention, the digital camera further includes a display device that displays an image data taken by a digital camera set by the shooting camera setting device, so all image data taken with a collaborating shot are checked on a monitor display of a master camera.

According to another aspect of this invention, a digital camera includes a connector that connects to other digital camera via a communication line, a shot instructor that instructs to take a shot of a subject and a storage camera setting device that set a digital camera to store an image data of a taken subject in response to an instruction of the shot instructor. Accordingly, for instance, all image data taken by plural digital cameras can be stored into a master camera, so a reproduction check or a search of an image data taken with a collaborating shot becomes easy.

According to another aspect of this invention, a digital camera includes a connector that connects to other digital camera via a communication line, a shot instructor that instructs to take a shot of a subject and an output device that outputs to the other digital camera via the connector an image data of a taken subject in response to a shot instruction of the shot instructor and a storage instruction signal to store the image data into the other digital camera. Namely, a master camera instructs a slave camera to store a taken image data in response to a shot instruction of a master camera.

According to another aspect of this invention, a digital camera includes a connector that connects to other digital camera via a communication line, a shot instructor that instructs to take a shot of a subject and an output device that outputs to the other digital camera via the connector a shot instruction signal created by the shot instructor and an image data sending instruction signal to send an image data of a subject taken by the other digital camera in response to the shot instruction signal. Namely, a master camera instructs a slave camera to send an image data taken by a slave camera in response to a shot instruction of a master camera.

According to another aspect of this invention, a digital camera includes a connector that connects to other digital camera via a communication line and an receiving device that receives via the connector an image data taken in response to a shot instruction instructing to take a shot of a subject and a storage instruction instructing to store the image data. Namely, a slave camera receives an image data taken by a master camera and stores the image data into the slave camera.

According to another aspect of this invention, a digital camera includes a memory storage device that stores an image data taken and created by shooting of a subject into a memory, a prohibiting device that prohibits a shooting of a subject from being taken when the memory is not provided or a remaining capacity of the memory runs short, a connector that connects to other digital camera via a communication line and a releasing device that releases a shot prohibit setting taken by the prohibiting device when connecting to the other digital camera via the connector. Accordingly, when a memory card is not loaded, a blank shot prohibit setting is released at a time of a collaborating work in digital cameras prohibiting the blank shot.

According to another aspect of this invention, a digital camera includes a connector that connects to other digital camera having a memory storage device that stores an image data taken and created by shooting of a subject and an prohibiting device that prohibits shooting of a subject from being taken when the memory is not provided or a remaining capacity of the memory runs short via a communication line and a releasing instruction device that instructs the other digital camera via the connector to release the shooting prohibit setting taken by the prohibiting device. Accordingly, other digital camera prohibiting a blank shot when a memory card is not loaded is instructed to release this blank shot prohibit setting at a time of a collaborating work.

According to another aspect of this invention, a digital camera includes a connector that connects to other digital camera via a communication line and a third camera information creator that creates a third camera information integrating a first camera information about the digital camera and a second camera information about the other digital camera when connecting to the other digital camera via the connector. Accordingly, all information about cameras at collaborating work can be easily grasped.

According to another aspect of this invention, the digital camera further includes a manager that manages so as to link the third camera information to an image data to be stored when connecting to the other digital camera via the connector, so all image data stored at a time of a collaborating work are linked to all information about cameras at collaborating work and then all the image data linked to all the information are managed.

According to another aspect of this invention, the digital camera further includes a storing device that stores the third camera information and the image data linked by the manager and a storage controller that controls so as to put into a folder and store into the storing device the third camera information and the image data linked by the manager.

According to another aspect of this invention, the digital camera further includes an instruction device that instructs the other digital camera to manage by linking the third camera information to an image data stored into the other digital camera when connecting to the other digital camera via the connector and a transmitting device that transmits to the other digital camera an instruction signal of the instructing device and the third camera information. Accordingly, integrated camera information and a taken image data that are linked to each other are also stored into a slave camera in the same way.

According to another aspect of this invention, a digital camera includes a connector that connects to other digital camera via a communication line, a receiving device that receives via the connector a third camera information integrating a first camera information about the digital camera and a second camera information about the other digital camera and an instruction signal instructing to manage by linking the third camera information to an image data, a managing device that manages by linking an image data to the third camera information received by the receiving device based upon the instruction signal received by the receiving device, an image storage device that stores the image data and a storing controller that controls so as to store the third camera information and the image data linked by the managing device into the image storage device. Namely, image information and a third camera information sent from other digital camera are stored by linking to each other.

According to another aspect of this invention, a digital camera includes a connector that connects to other camera via a communication line and a file name info creator that creates information to name a file of an image data after a first camera information and a second camera information about the other digital camera when connecting to other digital camera via the connector. Accordingly, a search for a stored image becomes easy.

According to another aspect of this invention, the digital camera further includes a file name transmitting device that transmits to the other digital camera the file name information created by the file name info creator. Accordingly, other digital camera can differentiate an image data stored at a time of a collaborating work from an image data stored rather than at a time of a collaborating work.

According to another aspect of this invention, a digital camera includes a connector that connects to other digital camera via a communication line and a folder name info creator that creates information to name a folder storing an image data after a first camera information about the digital camera and a second camera information about the other digital camera when connecting to the digital camera other digital camera via the connector, so a search for an image afterward becomes easy.

According to another aspect of this invention, the digital camera further includes a folder name transmitting device that transmits to the other digital camera the folder name information created by the folder name info creator.

According to another aspect of this invention, the first camera information or the second camera information includes at least one of a maker name, a product name, a product model, a serial number and a version number of a software program.

According to another aspect of this invention, a digital camera includes a first timer that instructs to start counting after a camera work is finished and halt at least a part of functions after a first given period of time elapses, a collaborator that collaborates to work by connecting to other digital camera having a second timer instructing to start counting after a camera work of the other digital camera is finished and halt at least a part of functions after a second given period of time elapses, an override instruction signal creator that instructs to override a work of the second timer while a camera is actually being working at a time of a collaborating work and during the first given period of time and an outputting device that outputs to the other digital camera an instruction signal created by the override instruction signal creator. Accordingly, while a camera collaborates to work and a power of a master camera is on, a power of a slave camera also stays on, not off.

According to another aspect of this invention, the digital camera further includes a last camera detector that detects a camera last finishing a work from the digital camera and the other digital camera and an off-signal creator that instructs to halt at least a part of functions of both of the digital camera and the other digital camera after any of the first given period of time or the second given period of time set to the camera detected by the last camera detector elapses. Accordingly, a timer of a digital camera that last worked turns off all digital cameras.

According to another aspect of this invention, a digital camera includes a first timer that instructs to start counting after a camera work is finished and halt at least a part of functions after a first given period of time elapses, a collaborator that collaborates to work by connecting to other digital camera having a second timer instructing to start counting after a camera work of the other digital camera is finished and halt at least a part of functions after a second given period of time elapses, a timer override instruction that overrides works of the first timer and the second timer in a collaborating work, a time detecting device that detects a work completion time of a digital camera last finishing a collaborating work and a third timer that instructs to start counting based upon a detection result of the time detecting device and halt at least a part of functions after a third given period of time elapses. Accordingly, a timer used for a collaborating work in the collaborating work turns off all digital cameras.

According to another aspect of this invention, a digital camera includes a connector that connects to other digital camera via a communication line, a fail detector that detects a failure of sending/receiving an image data to and from the other digital camera via the connector and a warning device that warns a failure of sending/receiving the image data in response to the fail detector.

According to another aspect of this invention, a digital camera includes a connector that connects to other digital camera via a communication line, a fail detector that detects a failure of sending/receiving an image data to and from the other digital camera via the connector and a re-transmit instruction that instructs the other digital camera to send/receive again the image data based upon a detection result of the fail detector, so it becomes possible to send/receive again when failed.

According to another aspect of this invention, the digital camera further includes a counter to count a number of re-send/re-receive transmission based upon the re-transmit instruction and a re-setting device that resets the digital camera sending/receiving when a count result of the counter amounts to a given number. Accordingly, sending/receiving to do is insured.

According to another aspect of this invention, a digital camera includes a connector that connects to other digital camera via a communication line, a data transmit detector that detects whether the other digital camera is being sending/receiving a data via the connector and a warning instructor that instructs to warn in response to a detection result of the data transmit detector. Therefore, it is effective to identify a digital camera that is actually sending/receiving a data especially in a case of several slave cameras available.

According to another aspect of this invention, a digital camera includes a connector that connects to other digital camera via a communication line, a data transfer storage device that stores plural data transfer methods to send/receive a data to and from the other digital camera when connecting to the other digital camera via the connector, a transfer method setting device that set a predetermined data transfer method to send/receive a data to and from the other digital camera out of the data transfer methods stored into the data transfer storage device and a judgment device that judges whether the predetermined data transfer method set by the transfer method setting device is capable of sending/receiving a data to and from the other digital camera. Namely, a given transfer method is pre-set when a collaborating work is started and a transfer is to be immediately started, judging whether this given transfer method can run.

According to another aspect of this invention, the judgment device further includes a selecting device that, when judging that sending/receiving to do is impossible by use of the pre-determined data transfer method, judges respectively whether each of the plural data transfer methods other than the predetermined data transfer method stored into the data transfer storage device is capable of sending/receiving a data to and from the other digital camera and selects a data transfer method capable of sending/receiving a data from the plural data transfer methods.

According to another aspect of this invention, the selecting device selects a data transfer method of a highest data transfer rate.

According to another aspect of this invention, the selecting device selects a data transfer method of a highest line quality.

BRIEF DESCRIPTION OF THE DRAWINGS

FIG. 34 is an example of a monitor display about camera information.

FIG. 35 is an example of a monitor display for warning a power shortage of a battery remaining capacity.

FIG. 49 is an example of a monitor display for setting a compensation increment step per each camera in a bracket shot.

FIG. 50 is an example of a menu display for setting a bracket of a shooting distance.

FIG. 56 is an example of a menu display for setting an amount of a strobe flash.

FIG. 57 is an example of a menu display for selecting a setting method in a shooting/storage condition.

FIG. 65 is a diagram explaining a folder and a file in a collaborating storage.

FIG. 67 is an example of a menu display for selecting a storage screen.

FIG. 68 is an example of a monitor display when changing a multi display screen continuously.

DETAILED DESCRIPTION OF THE PREFERRED EMBODIMENTS

Referring to drawings, an embodiment of this invention will be explained as follows.

Figure 1:
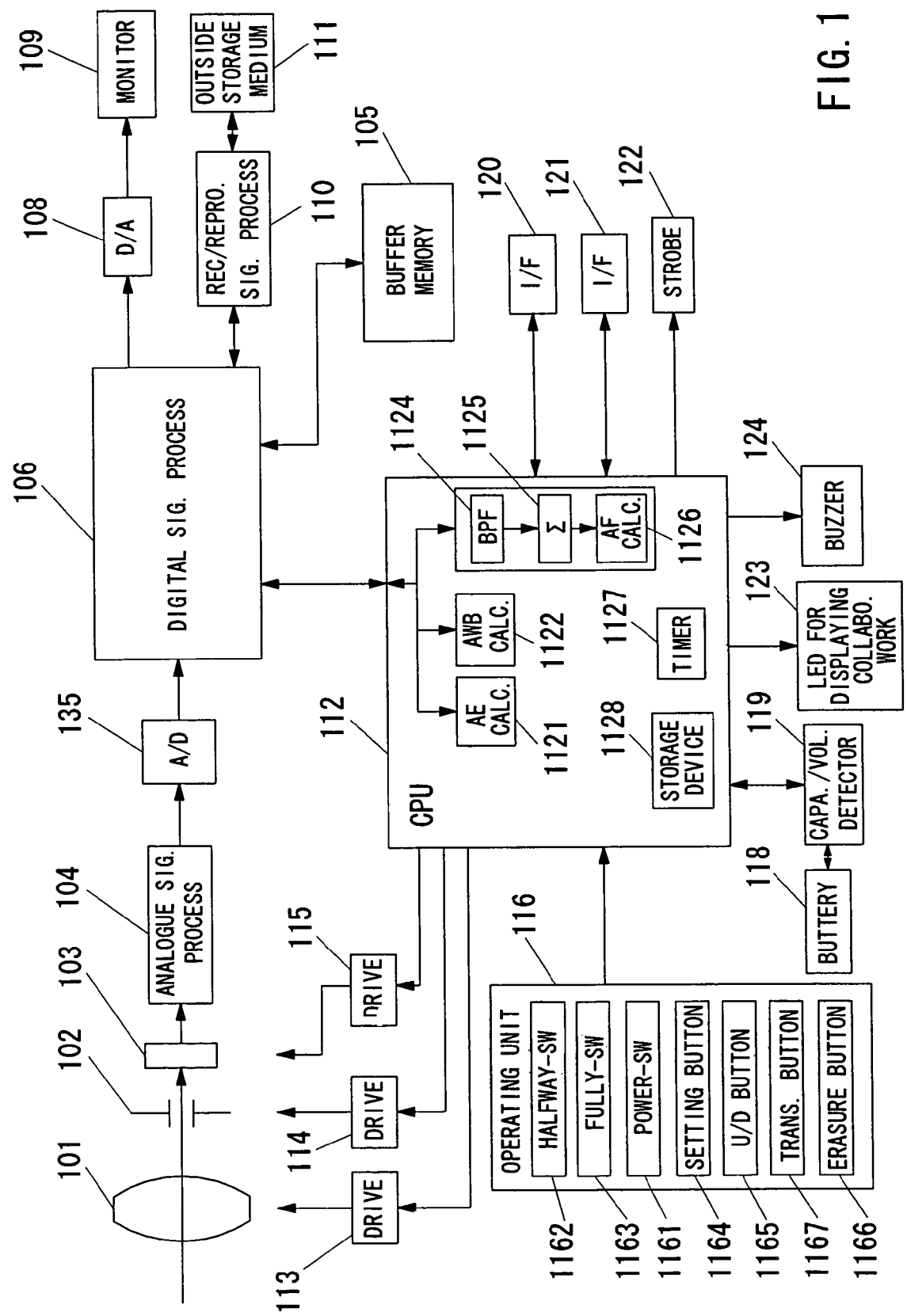
FIG. 1 represents a block diagram illustrating a configuration of a digital camera in a digital camera system in accordance with this invention.

FIG. 1 is a function block diagram describing major functions of a digital camera used for a digital camera system of this invention.

Taking lens 101 is a zoom lens and is driven towards a light axis by driver 113. Driver 113 has a zooming mechanism and its zooming circuit of a zooming lens and a focusing mechanism and its focusing circuit of a focusing lens and they are controlled respectively by CPU 112.

Taking lens 101 focuses an object image on an image plane of imaging element 103. Imaging element 103 is a photoelectric conversion-imaging element that outputs an electric signal corresponding to light intensity of an object image focused on an image plane and a solid-state imaging element such as CCD or MOS (Metal-Oxide Semiconductor) is used. Imaging element 103 is driven by driver 115 that controls a signal-extract timing. Diaphragm 102 is arranged between taking lens 101 and imaging element 103. Diaphragm 102 is driven by driver 114 that has a diaphragm mechanism and its drive circuit. An imaging signal from imaging element 103 is input into analog signal processing circuit 104, where processing of a correlated dual sampling (CDS) and so is performed. The imaging signal processed by analog signal processing circuit 104 is converted into a digital signal from an analog signal.

At digital signal processing circuit 106, several image processing such as contour compensation, gamma control and so on are performed on the digital signal converted from the analog signal. Digital signal processing circuit 106 includes brightness/color difference creation circuit and the like for storing. Buffer memory 105 is a frame memory capable of storing data equivalent to plural frames photographed by taking lens 103 and the digital signal converted from the analog signal is temporarily stored onto buffer memory 105. Digital signal processing circuit 106 reads out data stored onto buffer memory 105 and performs the foregoing several image processing and processed data is again stored onto buffer memory 105. CPU 112 is connected to digital signal processing circuit 106 and drivers 113~115 and performs sequence control over camera workings. Auto exposure (AE) calculation unit 1121 of CPU 112 performs an automatic exposure calculation based upon an image signal from an imaging element and Auto white balance (AWB) calculation unit 1122 performs a calculation of a white balance adjustment. Band pass filter (thereinafter referred to as BPS) 1124 extracts a high-frequency component of a given frequency band based upon an imaging signal within a focus detection area provided in a taking-image area.

Output from BPF 1124 is input into evaluation value calculation unit 1125 where an absolute value of a high-frequency component is integrated and a focus evaluation value is calculated. Auto focus (AF) calculation unit 1126 performs AF calculation based upon these focus evaluation values by a contrast method. CPU 112 adjusts the focusing lens of taking lens 101 using a calculation result of AF calculation unit 1126 and drives the focusing lens to obtain an in-focus position. Operating unit 116 connected to CPU 112 includes power switch 1161 that turns on or off a camera, halfway-depress switch 1162 and fully-depress switch 1163 that switch on or off in coupling with a release button, setting button 1164 that selects any of various contents of a shooting mode, Up/Down button (U/D) 1165 that updates a reproduction image and the like, erasure button 1166, transmit button 1167 and so. Power switch 1161 is coupled with a select dial (see FIG. 3 to be explained later on) that changes a camera function to a shooting mode, a reproduction mode or a collaborating mode. When these switches or buttons are operated, a signal corresponding to an operation is input onto CPU 112.

118 is a nickel metal hydride (NiMH) or lithium-ion batteries and a voltage or a capacity of any of the batteries is detected by capacity/voltage detection unit 119 and detected capacity or voltage is sent out to CPU 112. At a time of charging, capacity/voltage detection unit 119 detects the voltage or the capacity of battery 118 as needed. In a case of low subject brightness, CPU 112 lets strobe 122 flash. \In the event that a camera collaborates to transmit data, display LED 123 lights up during data transmission. 124 is warning buzzer when it is something wrong with a camera.

In addition, CPU 112 includes storage unit 1128 that stores various kinds of data and timer 1127. A peak value of the foregoing evaluation value, a corresponding lens position and so are stored onto storage unit 1128. Timer 1127 is used at a time of calculating an elapsed time of a halfway-depress timer. An image data on which various processing were performed at record/reproduction signal processing circuit 110 is temporarily stored onto buffer memory 105 and thereafter via record/reproduction signal processing circuit 110, an image data is stored onto outside storage medium 111 such as a memory card and like. When an image data is stored onto storage medium 111, generally an image data is compressed in a given compressed file, for example, a JPEG file. Storage/reproduction signal processing circuit 110 performs data compression (ex. JPEG) when storing an image data into outside storage medium 111 and extension of the compressed image data transferred from outside storage medium 111 or other camera. 120 and 121 are respectively interface circuits that perform a data communication with outside devices such as a digital camera and so via wireless or wired hook-up.

Further, a plurality of each of these interface circuits may be added.

Monitor 109 is a liquid crystal display unit that displays a photographed subject image and several kinds of setting menus at shooting and reproduction or collaborating work and also monitor 109 is used to display reproduction of an image data stored into storage medium 111 or transferred from other cameras. In a case where an image is displayed on monitor 109, an image data stored onto buffer memory 105 is read out and D/A converter 108 converts the image data from digital image data to analog video signals. Then, the image is displayed on monitor 109 via these analog video signals.

A contrast method of an auto focus (AF) control system employed in this camera will be explained. This method obtains a focusing position utilizing that there is a correlation between a degree of a blurred focus point of an image and a contrast and that the contrast of the image becomes at the maximum when the image comes into focus. A size of a contrast can be evaluated by a size of a high-frequency component of an imaging signal. That is, BPF 1124 extracts a high-frequency component of an imaging signal and let what an absolute value of a high-frequency component is integrated in evaluation value calculation unit 1125 be a focus evaluation value. As explained before, AF calculation unit 1126 performs an AF calculation based upon this focus evaluation value.

CPU 112 adjusts a focusing lens position of taking lens 101 using a calculation result of AF calculation unit 1126 and lets the focusing lens obtain an in-focus position.

Figure 2:
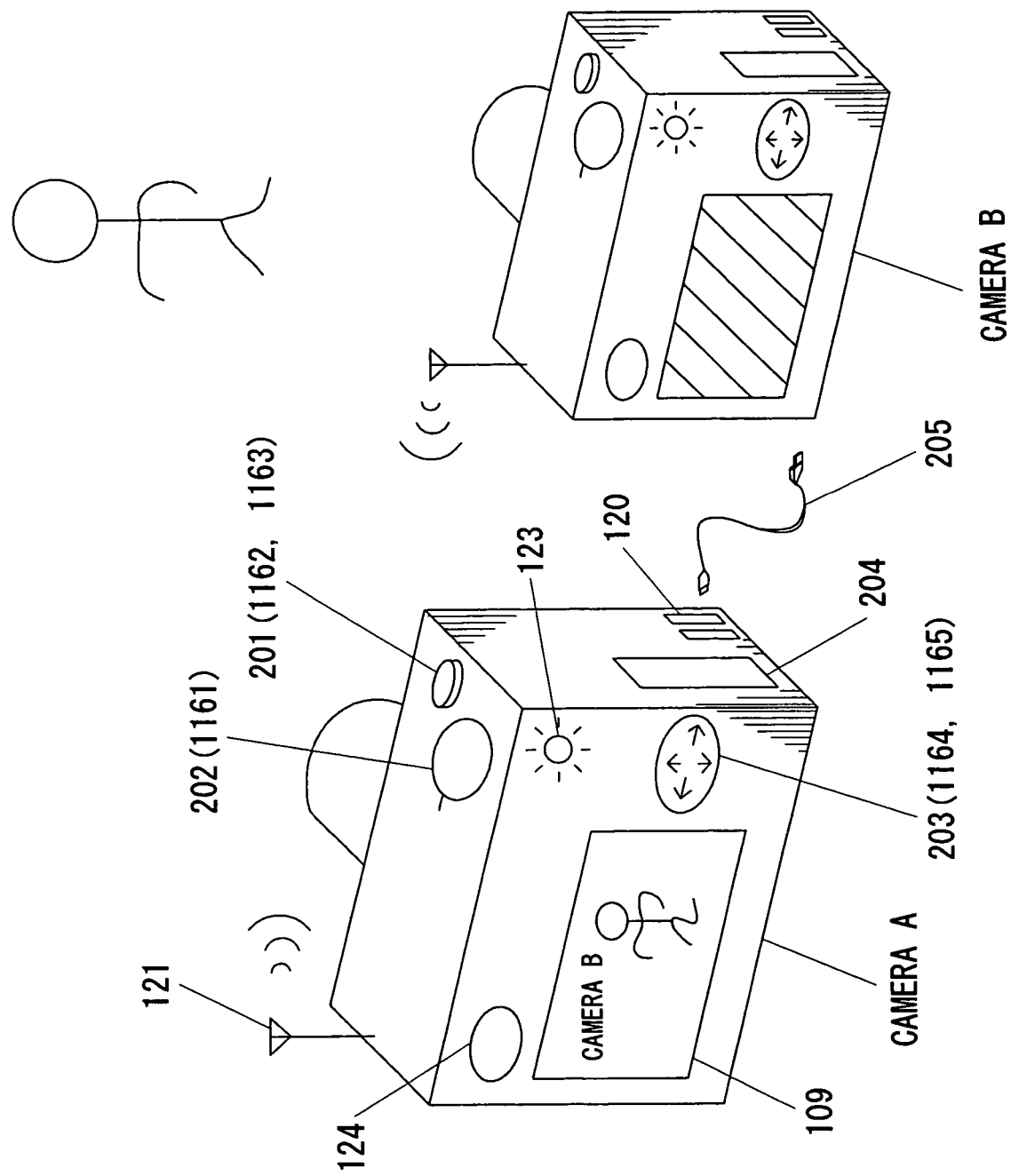
FIG. 2 represents an example of shooting of a subject in a collaborating work.
Figure 3:
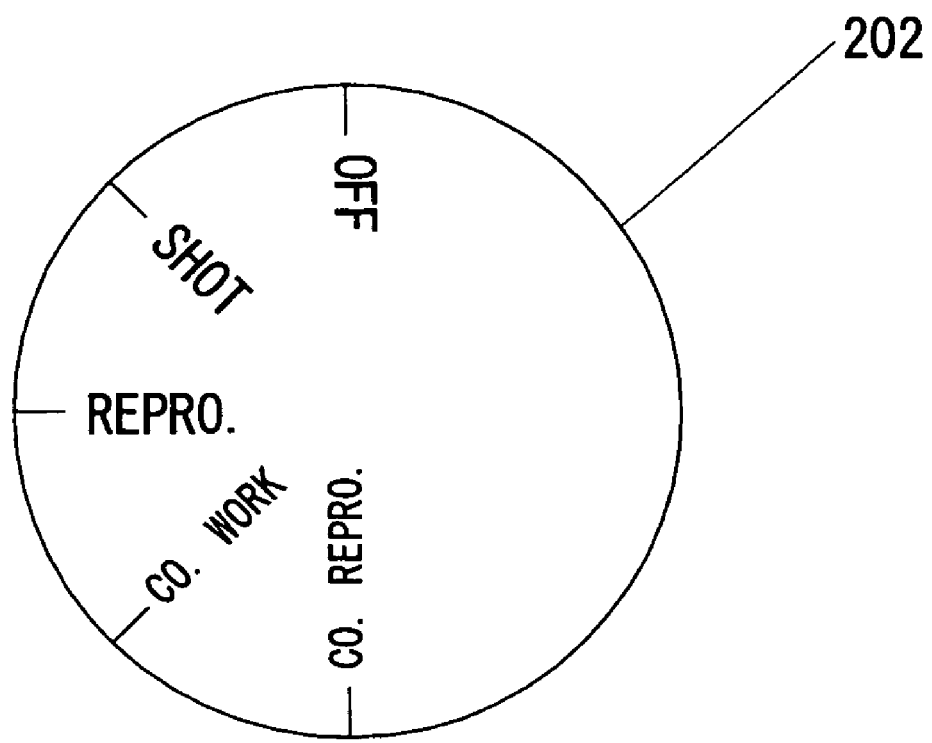
FIG. 3 represents an example of a display of a select dial.

FIG. 2 represents a case where two digital cameras are caused to collaborate to work and are about to take a photograph of the same subject. In this case, an actually operating camera is called a master camera and let this master camera be digital camera A and a camera that collaborates to work based upon an operation of the master camera is called a slave camera and let this slave camera be digital camera B. More specifically, FIG. 2 represents a case where an image data of digital camera B is transferred to digital camera A via wireless interface 121 or USB cable 205. A same function as in FIG. 1 is represented by an identical numeral figure in FIG. 2. 201 is a release button and corresponds to halfway-depress switch 1162 and fully-depress switch 1163. 202 is a select dial and is configured to be integral with power switch 1161. FIG. 3 shows a display example of this select dial. In this example, each mode such as a power OFF of a camera, normal shooting, normal reproduction, collaborating shooting, collaborating reproduction can be chosen. When a following explanation thereinafter refers to a collaborating work, let's assume that a master and slave cameras are set to a mode of any of collaborating shooting or collaborating reproduction. 203 is a multiple select switch and corresponds to setting button 1164 and U/D button 1165. 204 is an insertion opening for an outside storage medium such as a compact flash and the like. 120 is a connector for USB, IEEE 1394 and so and is configured in such a way that two channel wired connections are possible. 121 is an I/F portion for a wireless connection like Bluetooth and the like. 109 is a LCD monitor and during a collaborating work, a LCD monitor of camera A is only working. More specifically, the LCD monitor of camera A displays not only an image or reproduction of the image photographed by camera A but also an image or reproduction of the image photographed by camera B. A LCD monitor of camera B is turned off due to a power saving. In this case, via blinking LED 123, it is displayed that data is in transit in a collaborating work. At this time, a LED of camera B also blinks. In a case where more than two cameras collaborate to work, only the LED of camera A and a LED of a partner to be collaborated to work are caused to blink.

Figure 4:
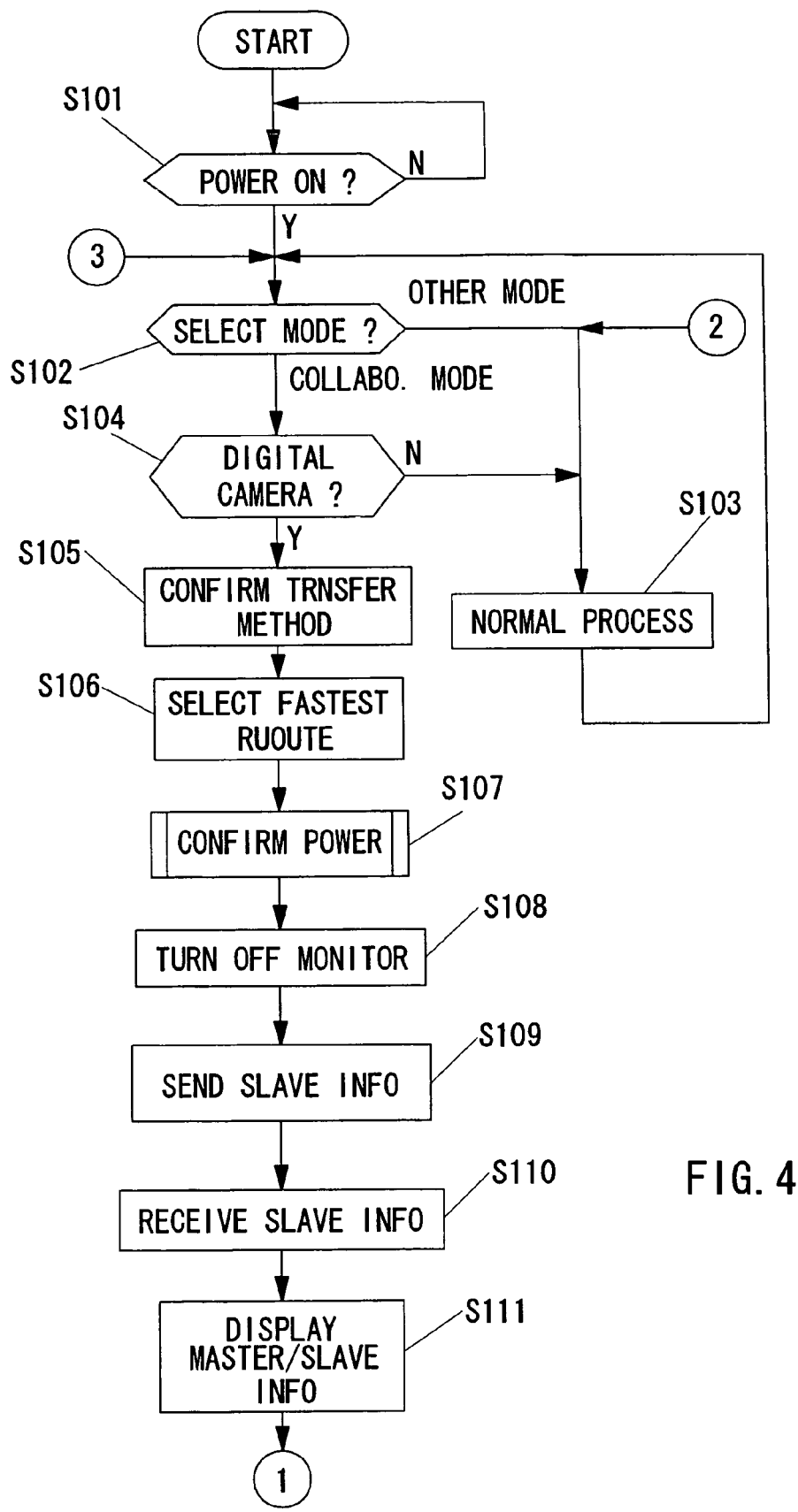
FIG. 4 is a flow chart illustrating a camera sequence in a collaborating work.
Figure 5:
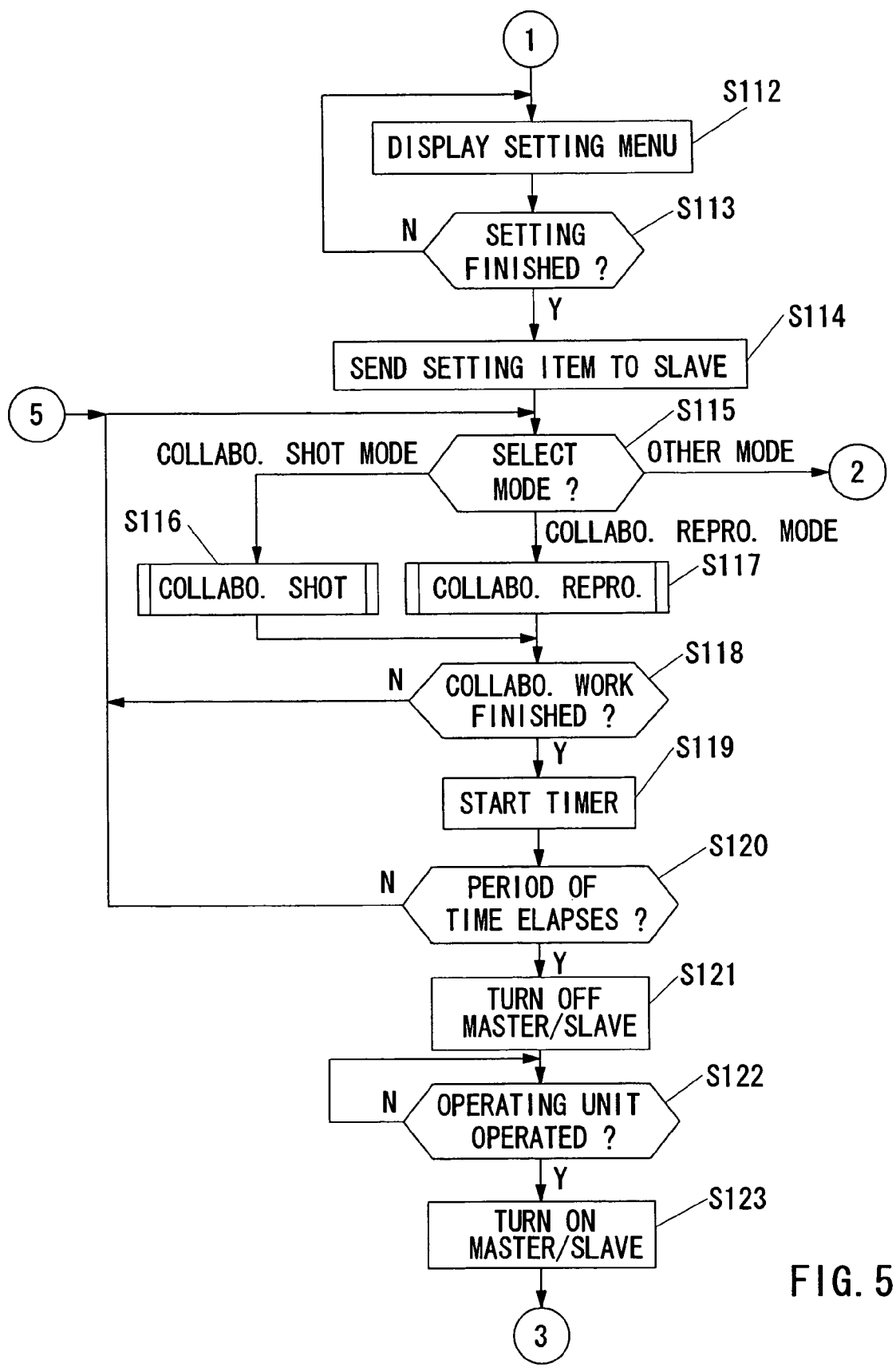
FIG. 5 is a flow chart illustrating a camera sequence in a collaborating work.
Figure 6:
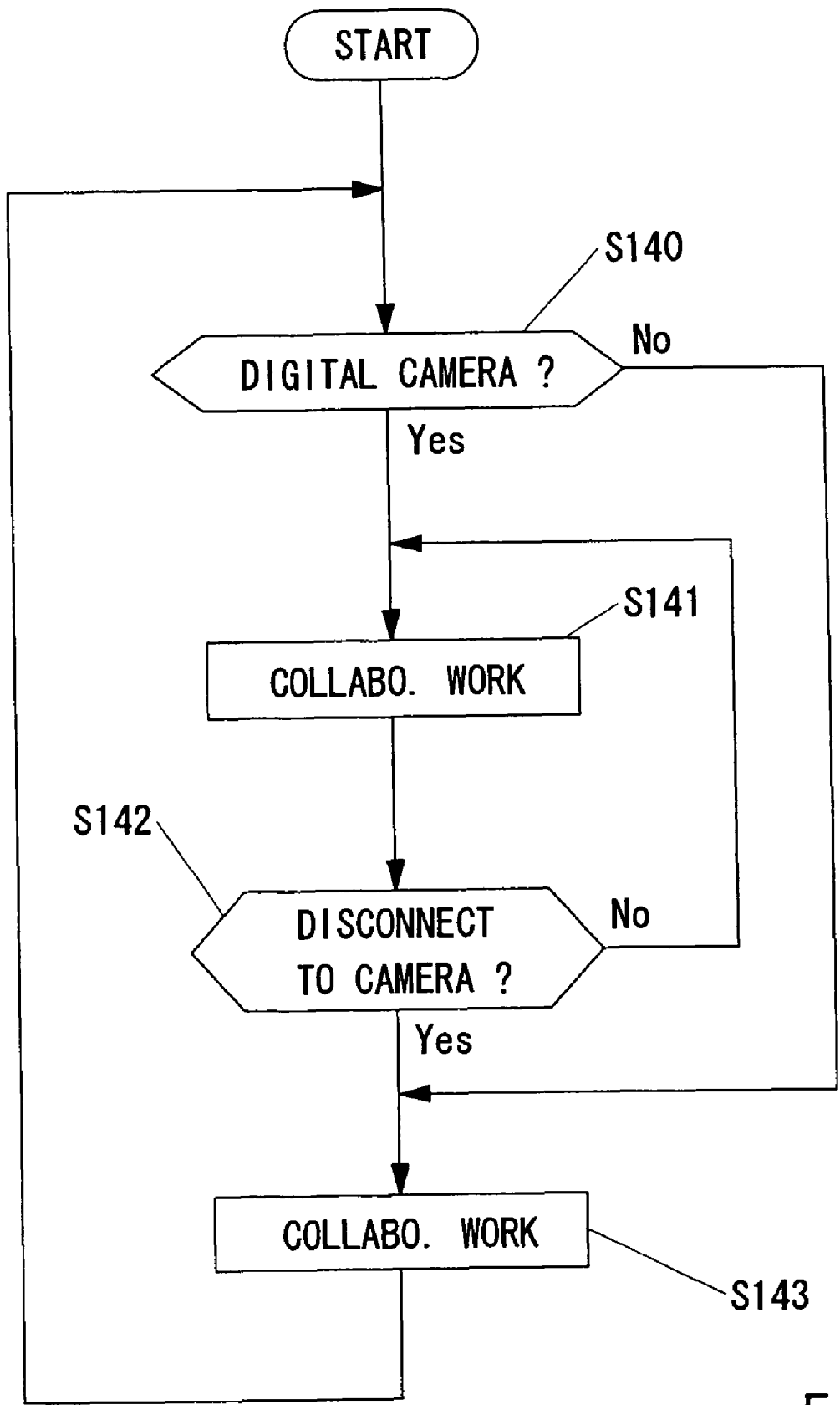
FIG. 6 is a flow chart illustrating a camera sequence in a collaborating work.

Referring to FIGS. 4 to 6, workings of master camera A at a time of a collaborating work when these plural cameras are connected to each other will be explained. Firstly, in step S101 of FIG. 4, it is checked that power switches of master camera A and slave camera B are turned on. From now on, CPU 112 controls master camera A or slave camera B based upon a flow in accordance with a program to be explained later on. Now, a relationship between a master and a slave will be explained beforehand. As explained before, USB or Bluetooth standard requires to set the master and the slave in order for camera A to control camera B. In the On-The-Go standard of USB as explained before, by a shape of a connecting connector, a relationship between the master and the slave is first set. Namely, when a Mini-A plug of a connecting cable for a USB connection is connected to camera A and a Mini-B plug is connected to camera B, camera A is set as the master and camera B as the slave.

Once the relationship between the master and the slave is set in this way, following work forms are taken between these cameras in accordance with this invention. (1) Master camera A is controllable over camera B, but not slave camera B controllable over master camera A. (2) Even if slave camera B is set to a collaborating work mode, camera B can perform individually its own normal camera operation, provided that, when a collaboration is at work, camera B cannot perform its own normal operation even if the normal operation has been instructed and the normal operation will be started after the collaborating work is completed. (3) In the event that slave camera B is instructed by master camera A when slave camera B performs the normal camera operation, slave camera B stores the instruction and makes it a rule to execute the instruction from master camera A after completion of the normal camera operation. (4) This relationship between the master and the slave will continue until master camera A instructs to terminate its relationship or a predetermined period of time elapses after completion of the collaborating work.

When a power is turned on in step S101 of FIG. 1, it is checked in step S102 what select dial A of master camera A is set to rather than OFF of a power. If select dial A of master camera A is set to normal shooting or normal reproduction, a flow proceeds to step S103 and individual normal camera operations are performed as usual. If select dial A of master camera A is set to collaborate shooting or collaborate reproduction, a flow proceeds to step S104 to check whether or not a connected camera is a digital camera. When the camera is not the digital camera, a flow proceeds to step S103 and normal shooting or normal reproduction is performed. When it is checked that a connected peripheral device is a digital camera, in step S105, data transfer method transferable between master camera A and slave camera B is checked. When it is checked that a plurality of connectable transfer methods are available, in step S106, a transfer method with the fastest transfer rate is chosen from these transfer methods. In step S106, instead of an automatic choice of the transfer method with the fastest transfer rate, a transfer method that is the lowest error rate and a good line quality may be chosen. Of course, a manual choice system about a transfer method may be accepted. Further, when there are plural transferable methods, let a first transfer method be preset to avoid user confusion and if this transfer method is impossible, other transfer method may be set automatically or manually.

In step S107, a state of a power supply of every connected cameras including master camera A is checked. A detailed flow of this power supply check will be described later on. After a completion of the power supply check of every cameras, in step S108, a signal instructing slave camera B to turn off a monitor of camera B is sent out to slave camera B. This is due to a reason that in a collaborating work mode, slave camera B is operated via master camera A and a LCD monitor of slave camera B cannot be viewed, so it is economical to turn off camera B. Even when collaboration is at work, it might be surely good for the LED monitor to work depending on a situation. Thus, an operation of the LED monitor of camera B may be selectable when required. In step s109, master camera A sends out to slave camera B a signal instructing that information about a camera status of slave camera B is sent to master camera A.

Information about a camera status is largely divided into items that need to be set at least for shooting and storing and others that describe details of identification of a camera at collaborating work, a camera performance and miscellaneous and so. The former includes an exposure condition, an exposure metering system, White Balance, auto focus (AF) information, exposure compensation, edge enhancement, gradation compensation, a chromaticness setting, shooting sensitivity, a focusing method, bracketing, a consecutive shot setting, a strobe setting, a multi image confirmation setting, a compression ratio setting including non compression, a number of recording pixels and so on. And the latter includes camera information such as a maker's name, a camera model name, a model number, a product serial number and so, a version number of program software, a type and a capacity of a memory card, a shot-taken frame number, a remaining capacity, a remaining non-shot-taken frame number, a shooting time interval at a single shot/a consecutive shot, a number of maximum consecutive shooting frames at a consecutive mode, with or without a strobe, a strobe guide number, battery information about a type, capacity and a remaining capacity of a battery and the like, setting rage and settable setting interval of a shutter and an aperture, judgment of reproduction/storing mode of slave camera B, with or without a flag indicating that slave camera B is connected to collaborate and data is in transit and so on. These contents of camera information vary from a camera to a camera. The multi image confirmation setting will be explained later on. The flag indicative of data in transit is a flag that distinguishes other camera at collaborating work with master camera A from an individually operating slave camera B. With data transmission flag indicative of data in transit, master camera A and slave camera B light up display LED 123 representing data in transit as shown in FIG. 2. A user do not feel inconvenient particularly even if this LED is not lit up at master camera A, however, the lit-up LED of camera B becomes very effective when the LCD monitor of camera B at collaborating work is turned off. When equal or more than two slave cameras are connected to collaborate, there might be a case where only one out of slave cameras performs shooting, storing or data transmission at collaborating work with master camera A. In this case, by checking the flag indicative of data in transit and turning off the LED used for a display of the data-in-transit of a slave camera that is not at collaborating work, then a user can check which slave camera actually collaborates to work. In the event that data is in transit between two slave cameras, it is preferable to let a LED of master camera A light up rather than letting LEDs of two slave cameras light up. Accordingly, a LED is lit up only during an actual data transmission, so power consumption of entire cameras can be cut down even in comparison to a case where the LED keeps on lighting up throughout a collaborating work.

In step S110, master camera A receives these information and in step S111, received camera information about slave camera B is displayed on LCD monitor 109 with camera information about master camera A. Individual information about each camera may be display. A transmission instruction of step S109 is performed on a regular basis during a collaborating work and latest information about slave camera B is received by master camera A at all times and then, the latest information will be displayed when necessary. At this display, based upon camera information sent from slave camera B, total remaining non-shot-taken frames of all connected cameras and the transmission speed of image data and so will be also displayed. FIG. 34 represents an example of a display that has been explained so far.

In step S112 of FIG. 5, menus to be set relating to a collaborating work in general are displayed and in step S113, any of settings can be checked when required. After completion of a setting is checked, set items are sent out to salve camera B in step S114. What are set here are a day/time of a setting, folder name information, file name information for storing by slave camera B at a time of a collaborating work, information instructing whether or not a file at a time of collaborating storage is made different from a folder at a normal operation, information instructing a recording pixel number in a case where a camera is different a switchover of collaborating shooting/collaborating reproduction modes of slave camera B, a setting of detailed items in these modes and a setting of a number of re-tries at a transmission failure and the like. Of these settings, CPU 112 automatically sets, displays and sends out folder name information and file name information to slave camera B based upon received camera information so far, a detail of which will be explained later on. Of these items, items that can be set in steps of collaborating shooting and collaborating reproduction to be later explained will be explained in the steps. And, regarding a method of changing over modes of collaborating shooting/collaborating reproduction of slave camera B, instead of a control of changing over via master camera A, slave camera B may be configured to perform individually a changeover. Also, it may be set here to display a multi shot screen/reproduction screen of master camera A and slave camera B on LCD monitor 109 of master camera A or individually display each of these screens on an individual display monitor.

Figure 36:
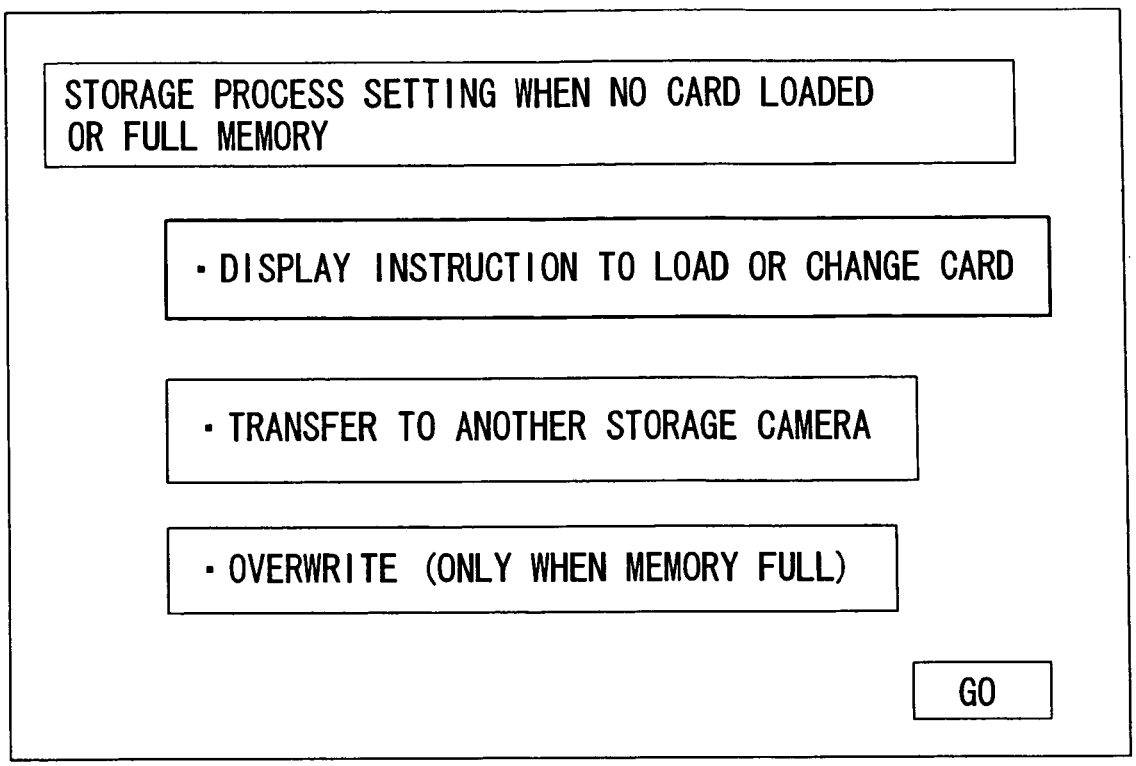
FIG. 36 is an example of a menu display for setting when a card is not loaded or the card gets full.

In this step S112, further a menu about a processing method in a case where a memory card is not inserted into a camera set as a storing camera to actually store a shooting image data into a memory card, an inserted memory card has been full of data from the beginning or gets full of data halfway through storing is also displayed. FIG. 36 represents an example of a display screen of these cases. As the processing method, there are three choices of (1) Insert or replace a card, (2) Transfer to other storing camera and (3) Update old data (only when a card is full of data). But, a setting in FIG. 36 is not necessarily required. If nothing is set at all, a display of an insertion of a card or an instruction of replacement of a card in thickly boxed (1) is supposed to be only a default setting. A choice of (2) will be made in the even that a plurality of storing cameras are set and an image data is transferred to other storing camera when a remaining capacity of a memory card inserted into any of set storing cameras runs out. As for (3) choice, the choice will be made in a case where there is no need to store old data and only the latest shooting data of a number of given frames are to be stored. An actual card confirmation sequence based upon these settings will be explained later in FIG. 30.

In step S115, a setting of select dial 202 is checked again before collaborating shooting or collaborating reproduction actually starts. If any mode rather than collaborating shooting or collaborating reproduction is set, a flow gets back to step S103 of FIG. 4. If a setting is collaboration shooting, a flow proceeds to step S116 of collaborating shooting. Details of collaborating shooting will be explained later on. When a setting is collaborating reproduction, a flow proceeds to step S117 of collaborating reproduction. Also details of collaborating reproduction will be explained later on. In step S118, completion of each collaborating work mode in steps S116 and S117 is checked. In order to judge whether or not this collaborating work is completed, the data-in-transit flag is used. The data-in-transit flags of all cameras at collaborating work are checked and when collaborating works of all cameras have not been completed yet, a flow gets back to step S115. When collaborating works of all cameras have been completed, in step S119, a timer is caused to start and in step S120, when an elapsed period of time is within a predetermined period of time, a flow gets back to step S115. When a period of time elapses the predetermined period of time, in step S121, a power of master camera A is turned off and all slave cameras are instructed to turn off their powers.

Like this, a slave camera cannot anticipate when an instruction comes from master camera A, so it may be effective to configure in such a way that a halfway-depress timer of each slave camera gets nullified with a setting of collaborating work and a camera last completing a camera work is judged and, when a period of time set by the halfway-depress timer of the camera elapses the predetermined period of time from this judgment, powers of all cameras are turned off. Or there is a case that collaborating work might require a halfway-depress time different from the one for individual camera work, so a halfway-depress timer workable for collaborating work is newly provided and via the halfway-depress timer, a halfway-depress time used for collaborating work may be set. In the event that a plurality of slave cameras are connected, it may be configured in such a way that, in step S118, completion of collaborating work is detected every each slave camera, in step S119, a timer corresponding to each slave camera is caused to start respectively and, when a predetermined period of time elapses, a power of the slave cameras is turned off.

If it is judged that any of an operating unit of the master camera is operated in step S122, the power of the master camera is turned on in step S123 and a power-on is instructed to all slave cameras and then a flow gets back to step S101. A state of the power-off that has been described so far is not to turn off a power of a camera completely but is to enter into a standby or sleep so as to let a camera enable to re-start work immediately based upon any operation or a signal through an outside. In step S121, instead of such a standby, it may turn off the master and slave cameras completely. In this case, in order to turn on each camera again, the power of each camera may be manually switched on in place of step S122 or S121.

According to the explanation up to here, a status of select dial 202 a user sets has been checked in step S102 as a way to check whether or not a camera is set to a collaborating work mode. Other than this way, other way is to set to the collaborating work mode automatically judging a type of a peripheral device connected to I/F unit 120. Referring to FIG. 6, an explanation that is limited to parts of ways to set and release a collaborating work mode will be followed. In step S140 of FIG. 6, CPU 112 identifies whether or not a peripheral device connected to I/F unit 120 is a digital camera. When connected peripherals are a printer, a personal computer and the like, a flow proceeds to step S143 and a camera work is performed on a normal work mode. If it is judged that a connected peripheral is a digital camera, a flow proceeds to step S141 and thereafter the camera work will be performed on a collaborating work mode. The collaborating work mode will be at work until a disconnection of the digital camera is checked in step S142 and when the digital camera is disconnected, a flow proceeds to step S143 and thereafter the camera work will be performed on a normal work mode. Even while the digital camera is connected, the collaborating work mode may be cleared manually when the collaborating work is not wanted.

Next, a power check will be explained. In a power check at a time of collaborating work, not only a battery voltage and so of a camera at collaborating work are just checked but also a power can be charged to a camera with a low remaining battery power from a camera with a sufficient battery power. This is to avoid a possible power cut of any of connected cameras halfway through collaborating work in a case where a power source voltage and a remaining battery power among the connected cameras become so different. In a case where battery conditions among cameras vary greatly, a simplest way to avoid the power cut is to supply a battery power of a camera with a sufficient battery power to other camera intact. However, in a case of USB O-T-G standard, a guaranteed supply is up to 8 mA only and this 8 mA is insufficient to operate a camera directly. As a specific charging way, a battery power is charged to a camera with a less power from a camera with much of a remaining power using a connector pin for a power source (Vbus terminal) complying with USB O-T-G standard. Referring to a flow represented in FIG. 20 and a display example in FIG. 35, a flow of the power check will be explained.

Figure 20:
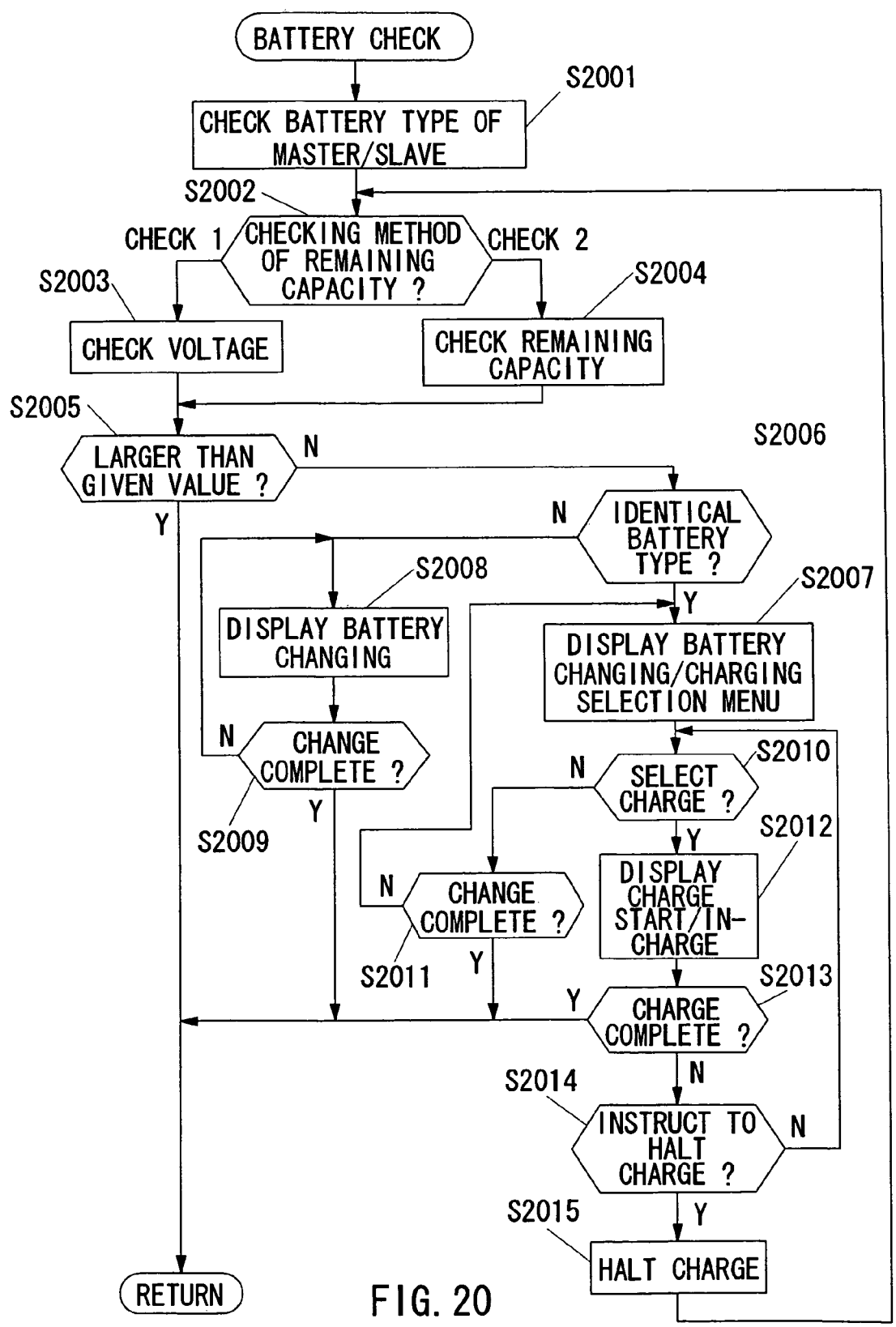
FIG. 20 is a flow chart illustrating a sequence of a battery power check.

In step S2001 of FIG. 20, a type of batteries loaded into the master camera and the slave camera are checked. In step S2002, in accordance with the checked type, one out of two check methods is chosen. When a type of a battery is a battery that detects a remaining amount by a voltage of a nickel metal hydride (NiMH) battery, a flow proceeds to step S2003 of a first check method where a battery voltage is checked. When a type of a battery is a battery that detects a remaining amount of a lithium ion, a flow proceeds to step S2004 of a second check method where the remaining amount of a battery is checked. In step s2005, the checked voltage or remaining amount is compared to each of given values corresponding to a voltage and a remaining amount respectively. When comparison results in all cameras are larger than the given values, this flow of the power check is ended. When there is a camera with a comparison result being smaller than the given value, a flow proceeds to step S2006 where it is checked whether or not a type of a battery among cameras is identical. In a case where the type is identical, a flow proceeds to step S2007 and if not identical, a flow proceeds to step S2008 and a camera name with a low remaining amount of a power and it's a battery replacement of this camera corresponding to each of the cases are displayed. A warning display example is represented in FIG. 35. In step S2008, a selection menu parenthesized at a bottom of FIG. 35 is not displayed. In step S2009, the warning display goes on until a battery is replaced and a flow is ended when a completion of the battery replacement is judged. In step S2007, the warning menu is displayed with the selection menu parenthesized at a bottom of FIG. 35. In this warning display, a default is set to No and in this case, a flow waits for the battery replacement in step S2011 and when the completion of the replacement is checked, this flow is ended. In FIG. 35, when Yes is clicked in step S2010, a flow proceeds to step S2012 and a charging is started while displaying that the battery is being charged. For charging a battery therein, the foregoing Vbus pin is used. A display that a battery is being charged uses LCD monitor 109 of master camera A or LED 123 for display of the foregoing data-in-transit. However, it is preferable to switch off LCD monitor 109 of master camera A for energy conservation after a given period of time.

In step S2013, a completion of a power charging is checked. When the completion is detected, this flow is ended or when it is judged that a power is being charged, a flow proceeds to step S2014 and it is checked whether or not a charging halt is instructed. As for a method for setting the instruction of the charging halt, the halt instruction may be selected with the display of charging being performed on a screen of LCD monitor 109 (not shown). In step S2014, when it is judged that the charging halt is not instructed yet, a flow proceeds to step S2010 and when it is judged that the charging halt is instructed, the charging is halted in step S2015 and a flow gets back to step S2002. Accordingly, a selection of a battery charging enables to level out the remaining amount of the batteries between cameras.

<<Collaborating Shooting Sequence>>

Figure 7:
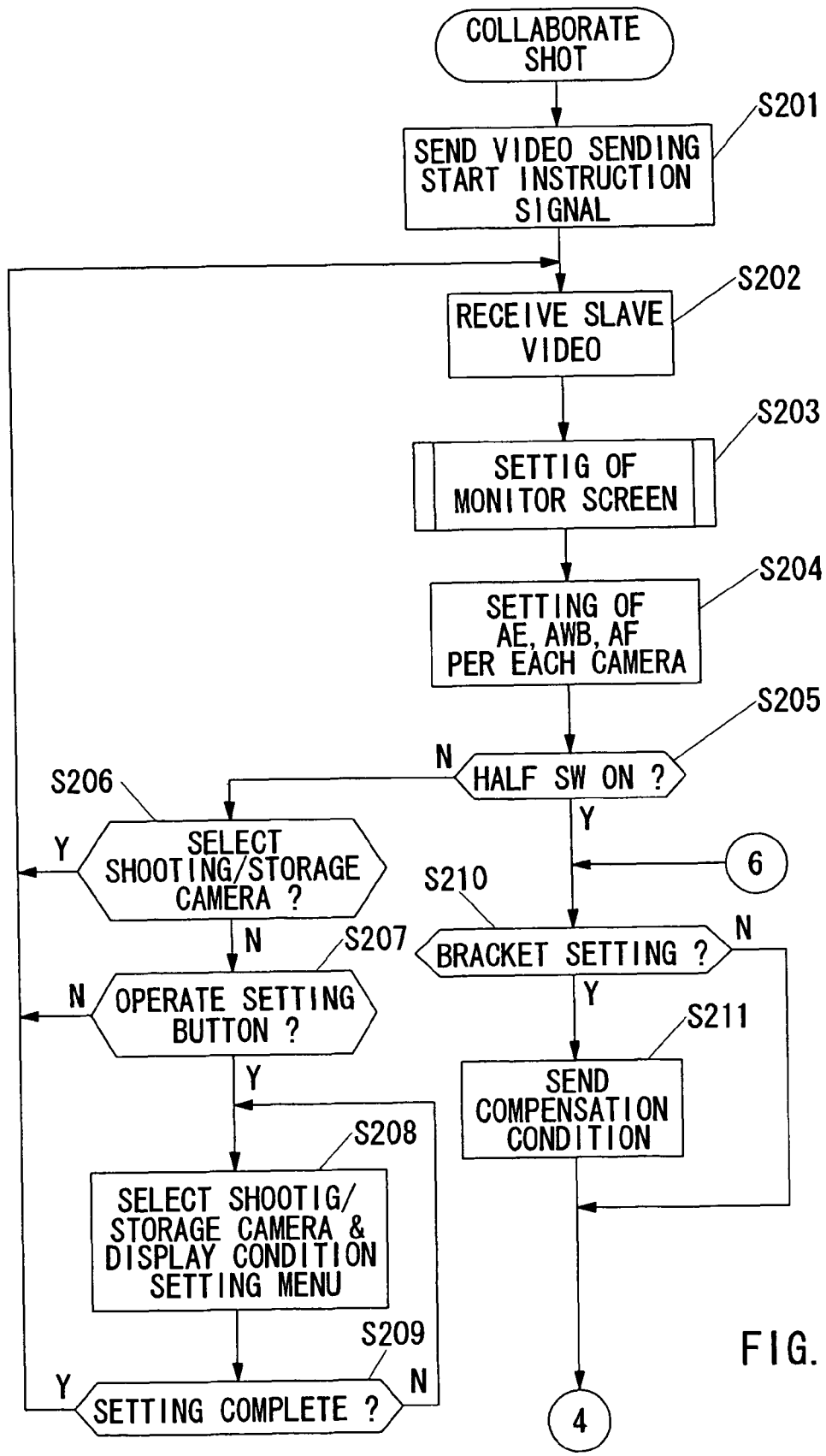
FIG. 7 is a flow chart illustrating a sequence in a collaborating shot.
Figure 8:
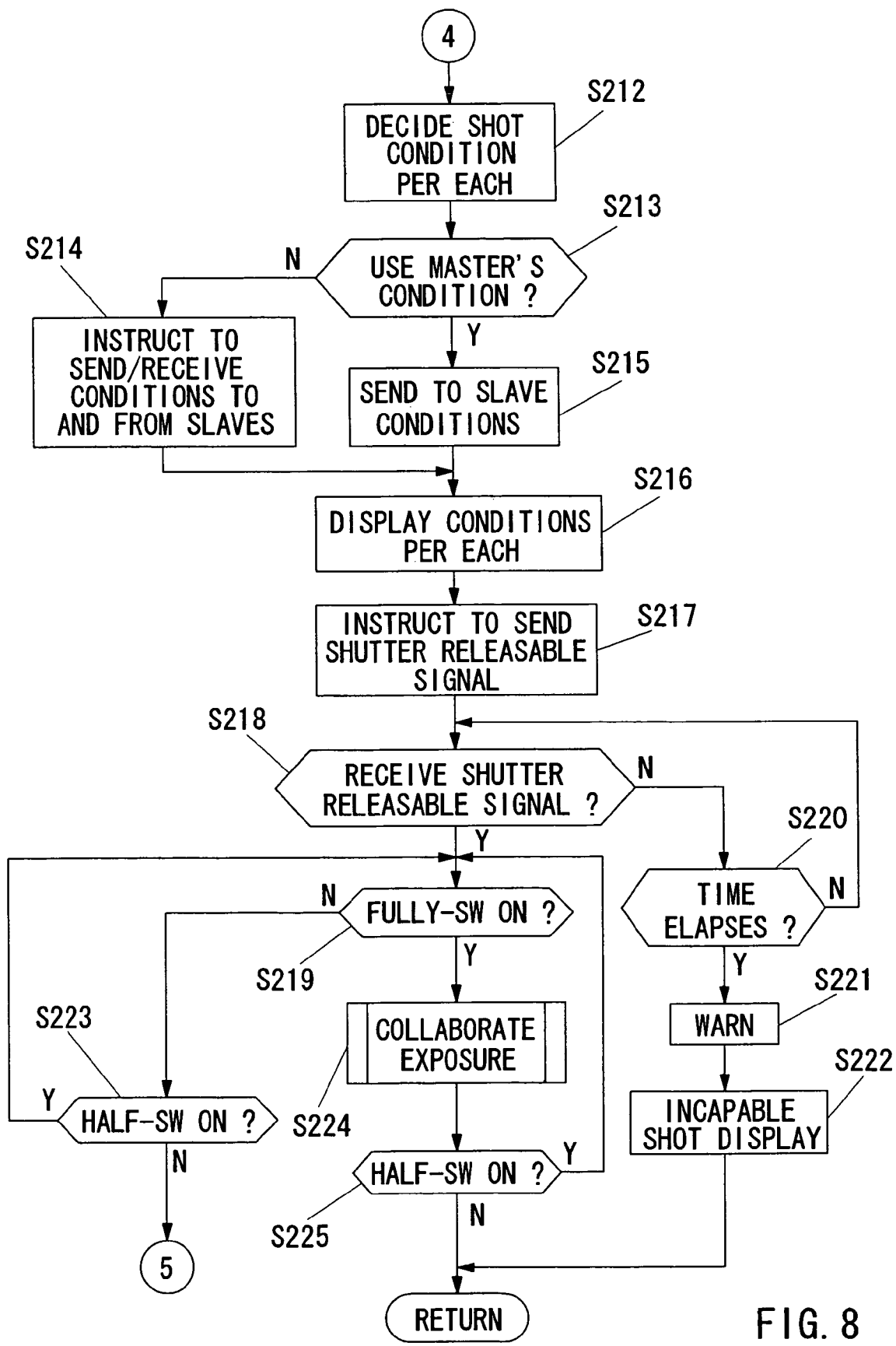
FIG. 8 is a flow chart illustrating a camera sequence in a collaborating shot.

Referring to FIGS. 7 and 8, a sequence of collaborating shooting and recording will be explained. When it is checked that master camera A and slave camera B are set to collaborating shooting mode, master camera A sends out to slave camera B a signal instructing slave camera B to transmit a video image photographed by slave camera B to master camera A. In step S202, master camera A receives the video image data sent from slave camera B and the video image data is displayed with a way a monitor screen is set in step S203. In this step S203, the monitor screen is set so as to let a user enable to monitor the video image with a most appropriate screen size corresponding to transfer rate of a communication line just like a simultaneous multi display of video images of master camera A and slave camera B or a single screen display of a video image of any of master camera A or slave camera B. A change of a display setting can be made at any time while displaying. A detailed flow of step S203 will be specifically explained by referring to a flow of FIGS. 21 and 22 and display examples of FIGS. 37-39.

Figure 21:
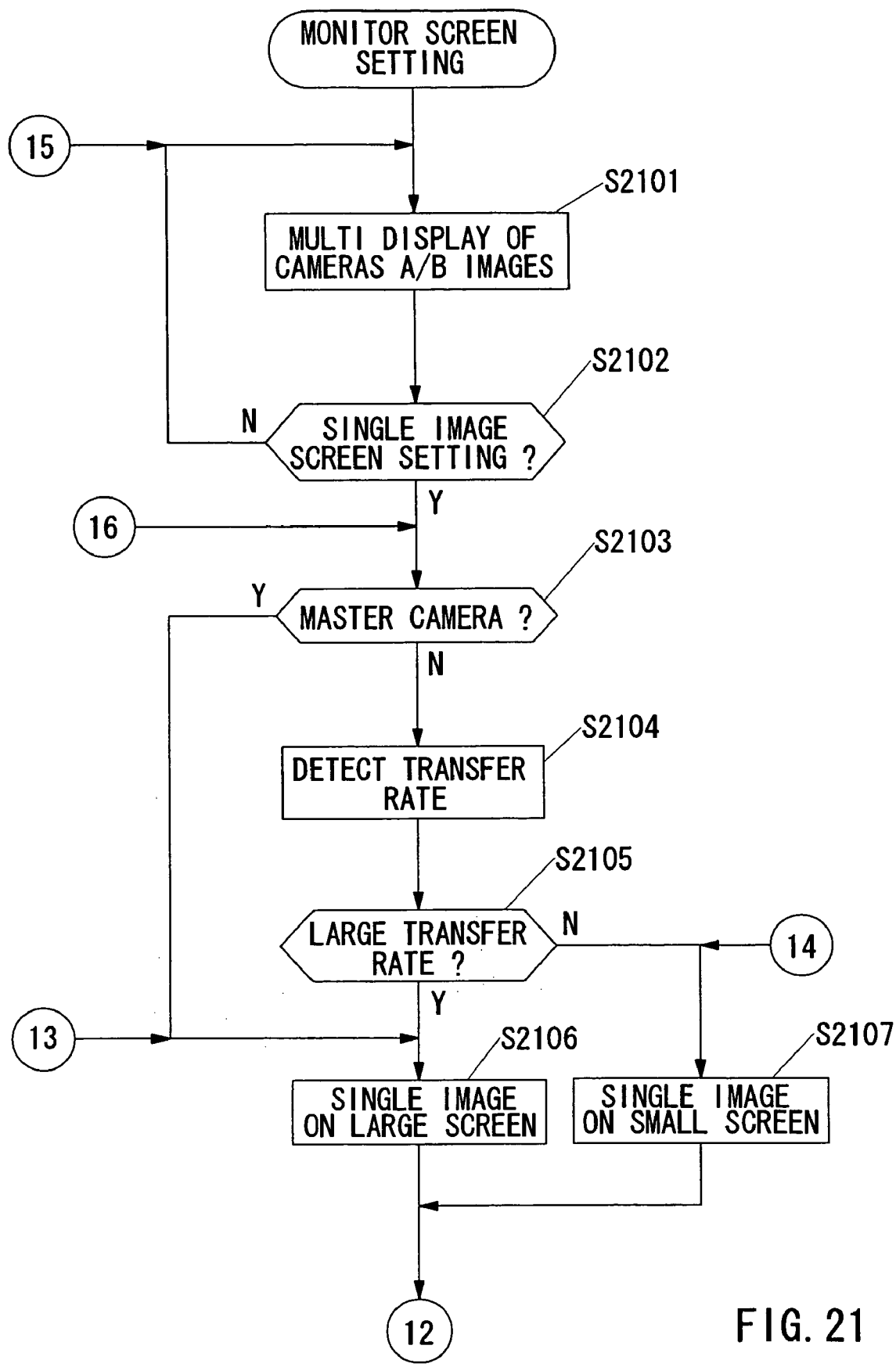
FIG. 21 is a flow chart illustrating a sequence of a monitor screen setting.
Figure 22:
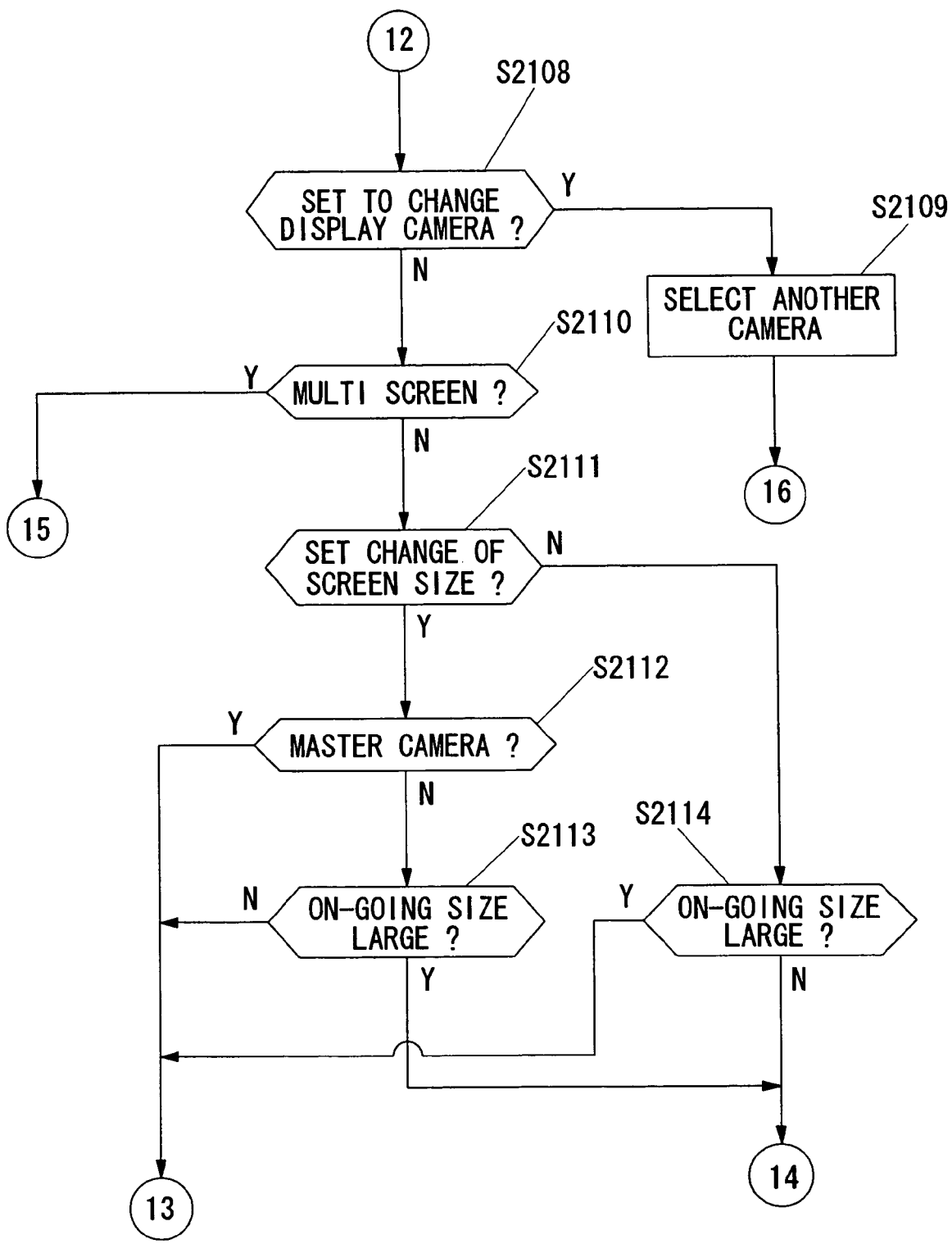
FIG. 22 is a flow chart illustrating a sequence of a monitor screen setting.
Figure 37:
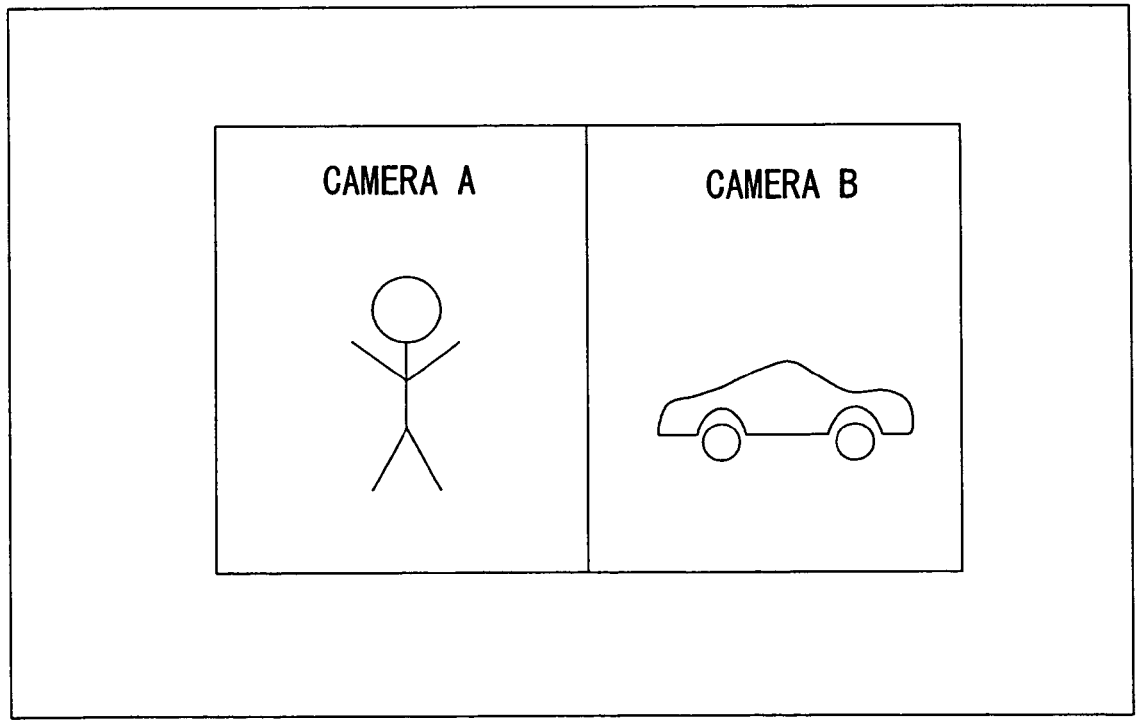
FIG. 37 is an example of a monitor display for setting a monitor screen.
Figure 38:
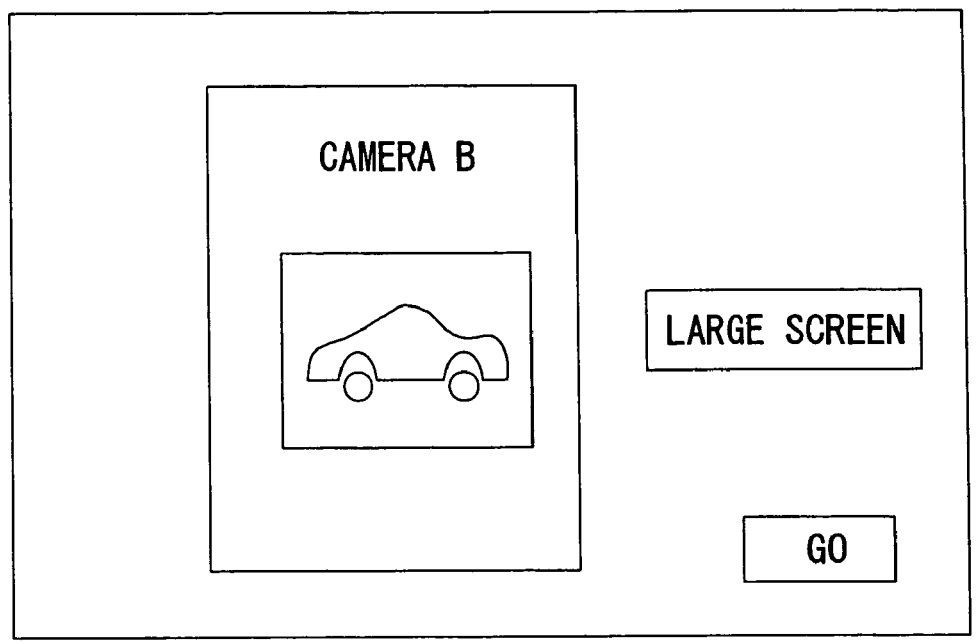
FIG. 38 is an example of a monitor display for setting a monitor screen.

In step S2101 of FIG. 21, a multiple screen shown in FIG. 37 is displayed. Video images from master camera A and slave camera B that are at collaborating work are displayed as a multiple screen on LCD monitor 109 of master camera A. In step S2102, it is checked whether or not a single screen display is set by setting button 1164. When the single screen display is not set, a flow gets back to step S2101 and a multiple screen display is continued. When the single screen display is set, a flow proceeds to step S2103 where it is checked whether a camera that displays a single screen is master camera A or slave camera B. If an image of master camera A is not set to the single display, a flow proceeds to step S2106 and the video image data of master camera A is displayed with a large screen size corresponding to a nearly entire screen size of LCD monitor 109. When an image from slave camera B is set to the single display, a flow proceeds to step S2104 and transfer rate of the image data to and from slave camera B is detected. In step S2105, detected transfer rate is checked and when transfer rate is sufficient to transfer a data, a flow proceeds to step S2106 and a video image data from a selected slave camera is displayed with a large screen size corresponding to a nearly entire screen size of LCD monitor 109. In a case where transfer rate is lower than a predetermined rate, a flow proceeds to step S2107 and an image data is displayed with a small screen size ranging from half to one tenth of a screen of LCD monitor 109. A display example of this case is shown in FIG. 38. This example shows a case where a video image from slave camera B is displayed. Thereafter the single screen is display, a flow proceeds to step S2108 and it is checked whether or not a setting is changed from a going image currently on display to an image from a different camera.

When a camera is set to change an image of a camera to be displayed, a flow proceeds to step S2109, a set other camera is selected and a flow gets back to step S2103. In the event that nothing is set to change a displaying camera, a flow proceeds to step S2110 and it is checked whether or not a return to the multi screen display is set. When the return to the multi screen display is set, a flow gets back to step S2101 and the multi screen is displayed. If the multi screen is not displayed, a flow proceeds to step S2111 and it is checked whether or not a change of a display screen size is set.

Figure 39:
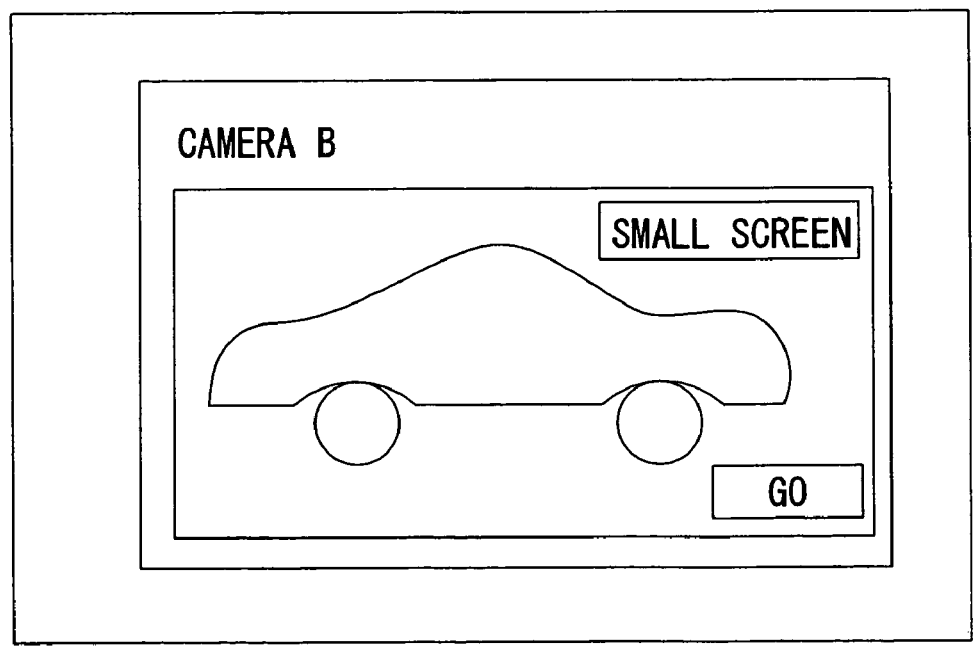
FIG. 39 is an example of a monitor display for setting a monitor screen.

As for a method for a screen change, a user selects a menu for setting a screen size from several setting menus (not shown) via setting button 1164 and then, for example, when a small screen size is on display as shown in FIG. 38, a text "Change to a large screen ?" appears on the video image screen. Then, when "Yes" is clicked, in step S2111, an image is displayed on a large screen as shown FIG. 39. FIG. 39 represents a case where a selection menu to change to a small screen when the large screen size is on display appears. A reason for selecting the large or small screen is as follows. When transfer rate of video image data is high, it does not matter whichever screen size is used, but in a case where transfer rate is low, a screen update cycle gets low if an image is displayed on a large screen with a full display screen size. When a subject is still, a screen size does not affect the screen update cycle is not so affected, but if the cycle gets low when the subject is in motion, the motion of the subject looks strange. In this case, a reduced display screen size makes the motion of the subject look smooth even when transfer rate is low. Unless a screen size (dimension) is modified in this step S2111, a flow proceeds to step S2114 and the screen size currently on display is checked and, when a large screen is displayed, a flow gets back to step S2106 and the large screen is continued. When a small screen is displayed, a flow gets back to step S2107 and the small screen is continued. In step S2111, when the screen size is modified, a flow proceeds to step S2112 and it is checked whether or not a displayed single frame screen is from master camera A. If the displayed image is from master camera A, a flow proceeds to S2106 as there is no reason for modifying a display screen and the image is displayed on a large screen without a modification setting. In step S2112, when it is checked that an image of the slave camera is displayed singly and a flow proceeds to step S2113 and then, a screen size currently on display is checked. If a large screen size appears, a flow gets back to step S2107, modifying to the small display screen size and thereafter the small display screen is continued. When the small display screen appears, a flow gets back to step S2106, modifying to the large display screen and thereafter the large display screen is continued.

A case where a display screen size is automatically changed with judgment of transfer rate has been explained so far, but the display screen size may be changed manually. That is, a user can select any of a small or large display screen size corresponding to a subject, not responding to transfer rate while any of the small or large screen size appears on a LCD monitor. In this case, as explained before, a display screen size can be changed via setting button 1164. When a user wants to speed up an update cycle with a low update rate, the same configuration as the one of a streaming method in which received image data is reproduced simultaneously while the compressed image data via MPEG or so is being received may be employed. So far, a display example using a single slave camera has been explained, but the foregoing applies to a case of equal or more than two slave cameras.

Figure 40:
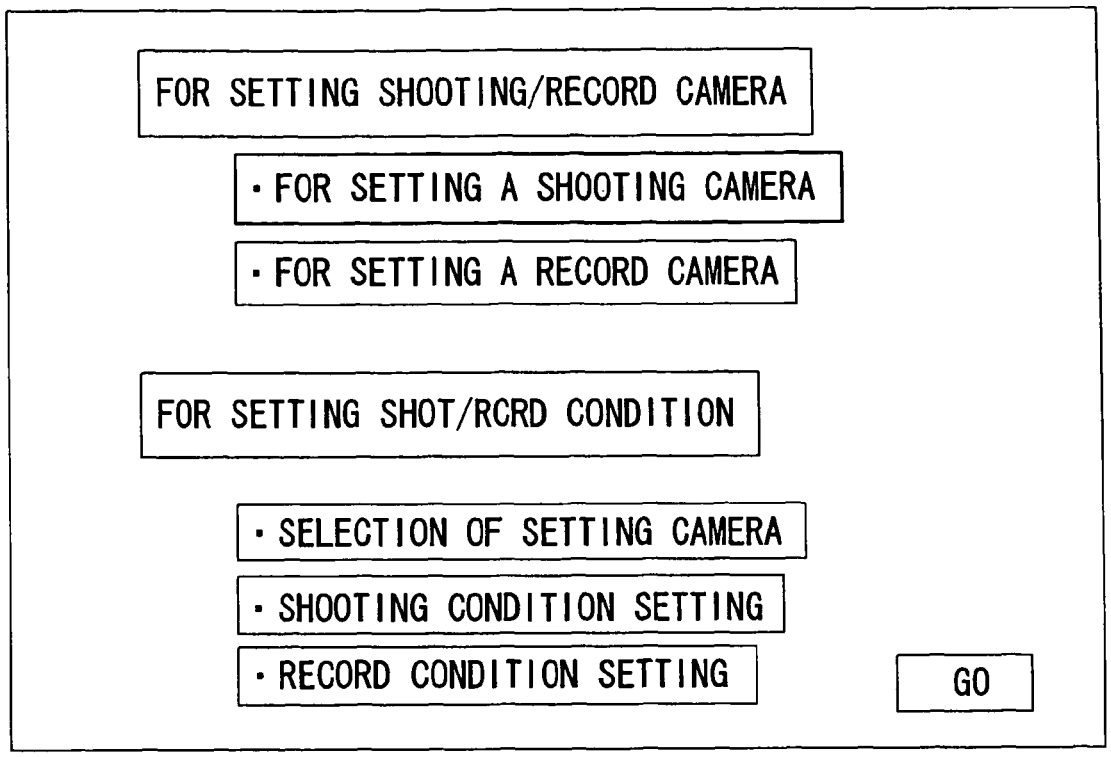
FIG. 40 is an example of a menu display for setting a shooting/storage camera and a shooting/storage condition.

Here, an explanation about a step for setting a monitor screen in step S203 of FIG. 7 is completed and next, the explanation starting from step S204 will be followed. In step S204, an exposure calculation (AE), a focus calculation (AF) and a white balance calculation (AWB) are performed every each camera and these results reflect a video image viewed on LCD monitor 109. In step S205, a shutter button is halfway depressed and it is checked whether or not halfway-depress switch 1162 is switched on. When switch 1162 is not switched on, in step S206, it is judged whether or not a camera used for shooting (or a shooting camera) and a camera used for storing (or a storage camera) are selected respectively. When they are selected, a flow gets back to step S202 and a video image display is continued. In a case where they are not selected or a user wants to change their settings, a flow proceeds to step S207 and it is judged whether or not setting button 1164 is operated. If button 1164 is not operated, a flow gets back to step S202. When setting button 1164 is operated, a flow proceeds to step S208 and a menu for setting a selection of a shooting camera and a storage camera, a shooting condition and a storing condition are displayed. FIG. 40 represents a display example of this menu.

From this menu display screen, firstly, in order to make sure that a shooting camera and a storage camera storing onto a memory are actually set, an item of "Set shooting/storage cameras" is selected. A shooting camera therein indicates a camera that stores an image data of an actually exposed and photographed subject onto a buffer memory and a storage camera indicates a camera that stores the image data taken by the shooting camera onto an external storage medium such as a memory card and the like to keep it for a long period of time. In place of the memory card, the storage camera may be configured to be a camera that stores the image data onto a internal memory for a long period of time.

Figure 41:
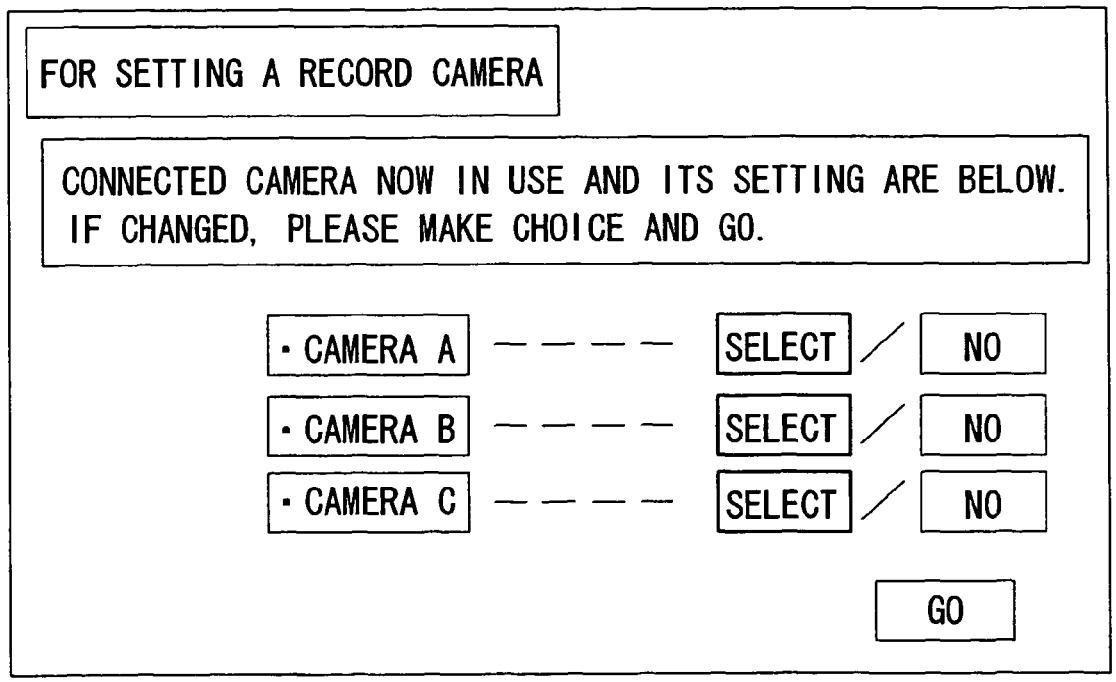
FIG. 41 is an example of a monitor display for setting a shooting camera.

As for a display screen example, an item of "Set shooting/storage conditions" (details of which will be explained later) is also displayed therein. An item boxed with a bold line represents an item that has been already set or selected. When an item of "Set a shooting camera", a setting menu to set the shooting camera as shown in FIG. 41 is displayed. As seen from FIG. 41, there are three collaborating cameras including master camera A and with a default setting, three cameras have been set as shooting cameras. When an item of "Not select" is selected via setting button 1164, cameras including master camera A that are set to "Not select" cannot shoot even if fully-depress switch 1163 of master camera A is fully depressed. And even a camera selected as a shooting camera cannot shoot in the event that reading out image data from an imaging element is in progress shortly after shooting. In this case, CPU 112 selects other camera that is selected as a shooting camera and is capable of shooting and instructs this camera to shoot.

Figure 10:
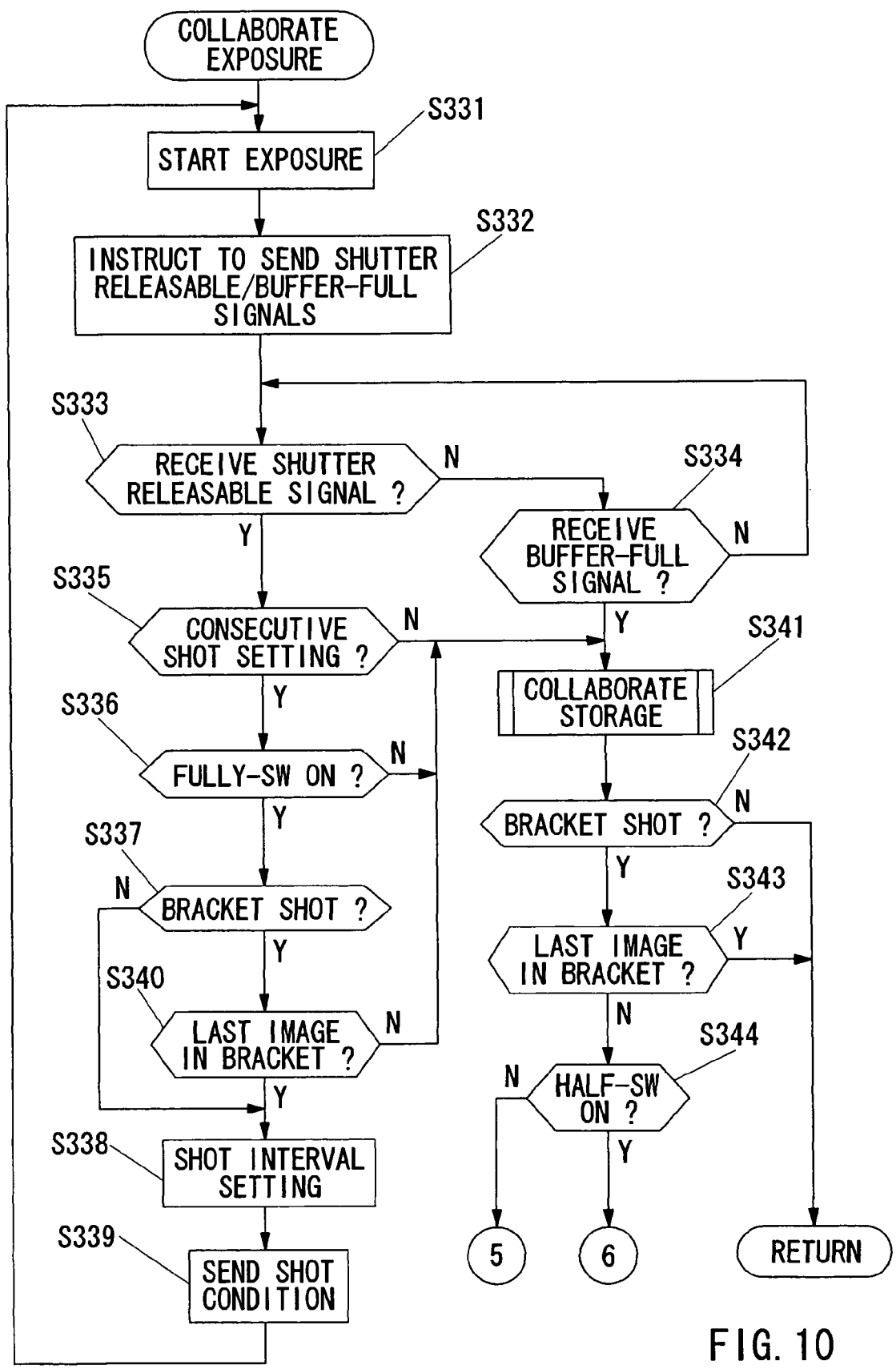
FIG. 10 is a flow chart illustrating a camera sequence in a collaborating exposure.

In accordance with the foregoing setting, other camera selected as a shooting camera can take a next shot immediately without a wait for shooting completion by a single camera. So, a shooting interval as an overall system can be shortened. In this case, a camera name may be preferable to be displayed on LCD monitor 109 so as to let a photographer enable to identify an actual shooting camera (not shown). To make this judgment of which camera is operable to shoot, a shutter release permit signal or a buffer-full signal which will be explained in step S215 and step S332 of FIG. 10 is used.

Figure 42:
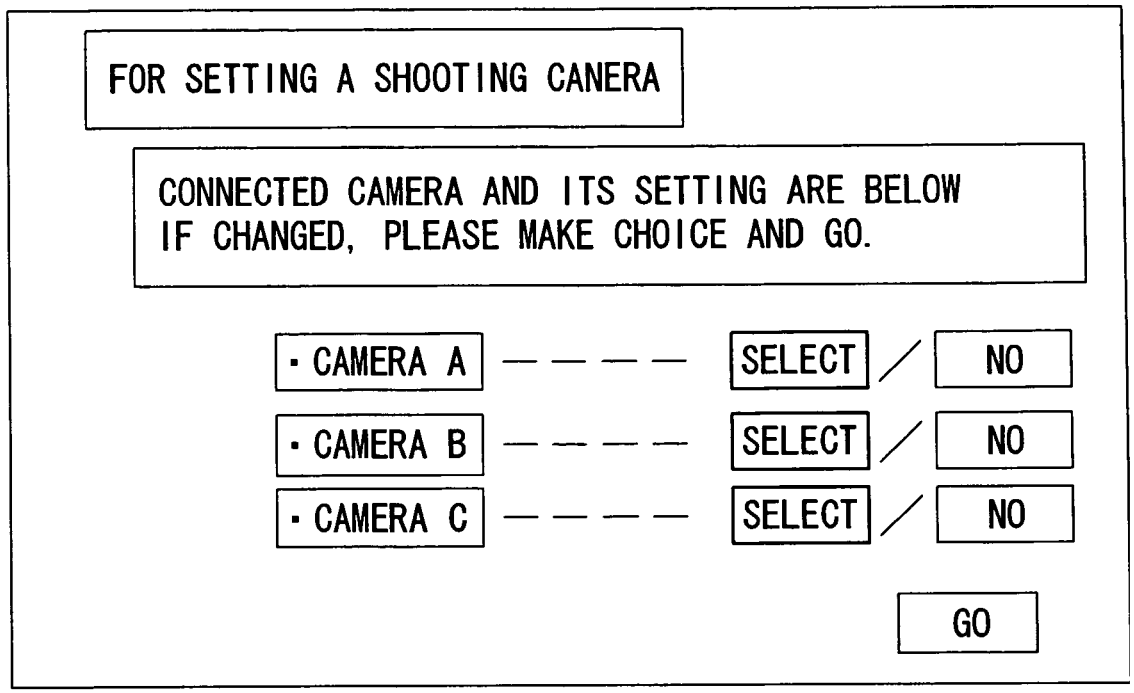
FIG. 42 is an example of a monitor display for setting a storage camera.

FIG. 42 represents a menu display example when a storage camera is set. In the same way as with a shooting camera, collaborating cameras and each setting status are displayed. With a default setting, all cameras are set to store. With regard to storing by a storage camera, there are some cases where a storage camera set to store cannot actually store just like the shooting camera when an image data is being written into a memory card, a memory card is not inserted inside or a memory of the inserted memory card is full of data. Therefore, in this case, CPU 112 selects any of cameras that are set as storage camera and are capable of storing and instructs this camera to store. In this case, a camera name or a storing status may be preferable to be displayed on LCD monitor 109 so as to let a photographer enable to see the storing status (not shown). In steps S401 and S404 of FIG. 12 to be explained later, this storage capability status will be checked.

A way of a combination when selecting a camera to actually shoot and a camera to actually store, which has been explained so far, is a free choice. For instance, assuming that cameras A and B are selected as a shooting camera, camera B is selected as a storage camera and both of cameras A and B shoot simultaneously. In this case, in principle, a shot image data transferred from camera A is stored into a memory card of camera B as soon as an image data taken by camera B is stored into the memory card of camera B. Namely, when a shot image data of camera A is being received by camera B, camera B, in parallel, stores a shot image data of camera B. So, an overall storing time at a time of storing two shot image data onto camera B can be shortened. When cameras A and B are selected as a shooting camera, camera C is set as a storage camera, and both of cameras A and B shoot simultaneously, a storing order in storing shot image data of camera A and camera B onto camera C is at random, not fixed. On the one hand, in a case where camera A is selected as a shooting camera and cameras B and C are selected as a storage camera, only any of cameras B and C stores continuously and, at a time when a memory card of this camera gets full of data, other storage camera will begin storing. This storing flow will be explained in detail in steps of collaborating storage of FIGS. 12 and 13.

Figure 29:
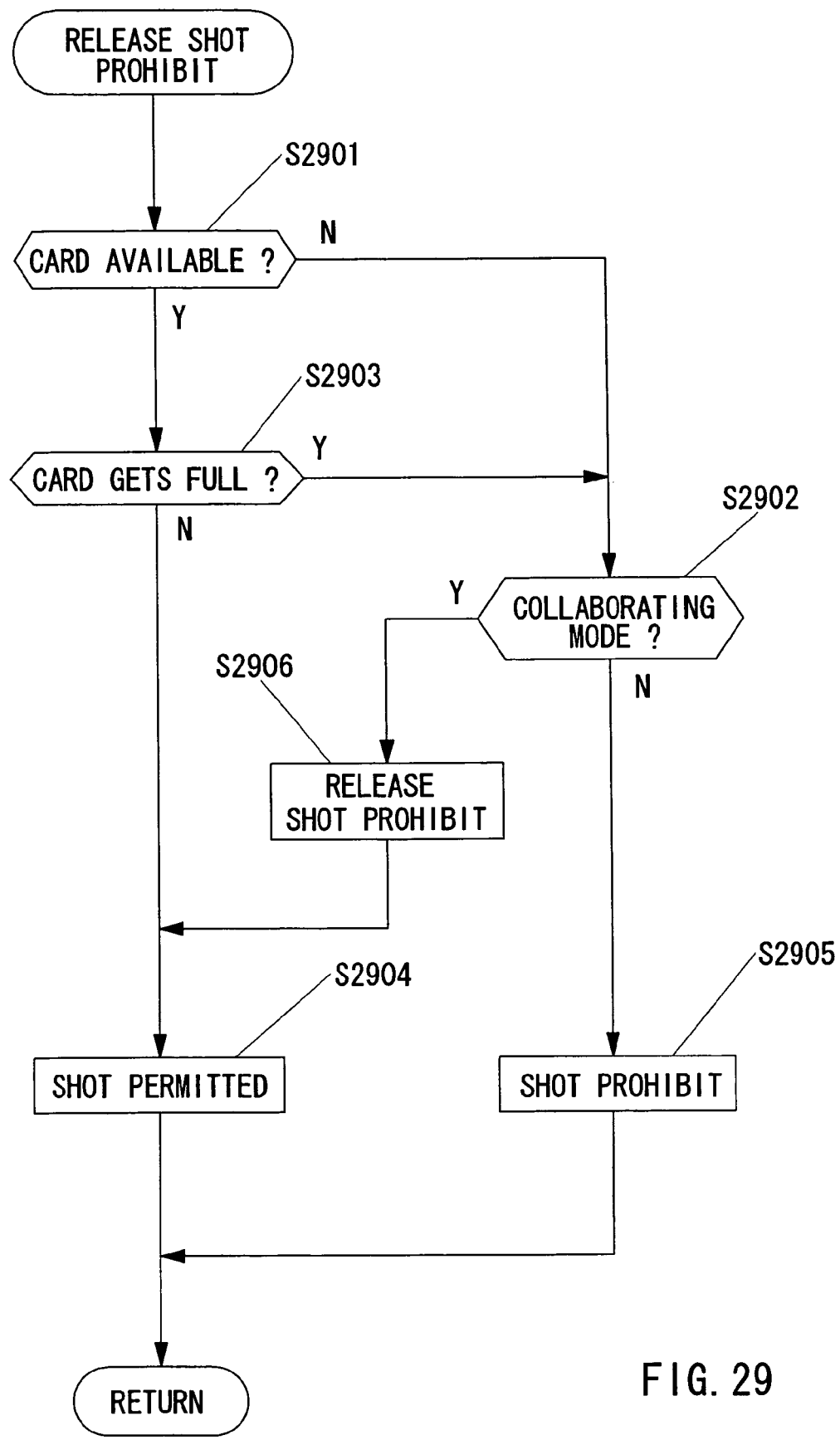
FIG. 29 is a flow chart illustrating a sequence of releasing a shot prohibit.

As seen from what has been explained so far, one of major characteristics of this collaborating camera work system is that it is not necessary for a shooting camera and a storage camera to be always identical. Accordingly, even if a camera has been set in a way that shooting is basically prohibited when a memory card is not inserted, the camera can shoot normally by canceling a shooting prohibit setting at a collaborating work mode. FIG. 29 shows a flow chart to cancel this shooting prohibit.

In step S2901 of FIG. 29, it is checked whether a memory card is inserted into a camera. When the card is not inserted, a flow proceeds to step S2902 and when the card is inserted, a flow proceeds to step S2903 and a remaining capacity is checked. When the remaining capacity is adequate, in step S2904, the camera is permitted to shoot. If the remaining capacity is not adequate, a flow proceeds to step S2902. In step S2902, it is judged whether or not the camera is set to a collaborating work mode and if the camera is not set to the collaborating work mode, in step S2905, the camera is prohibited from shooting. When the camera is set to the collaborating work mode, in step S2906, a shooting prohibit setting of this camera is cancelled and a flow proceeds to step S2904 where the camera is permitted to shoot. Accordingly, even when the camera becomes capable for shooting, a warning that a memory card is not inserted or a remaining capacity becomes zero is given via LCD monitor 109.

Figure 43:
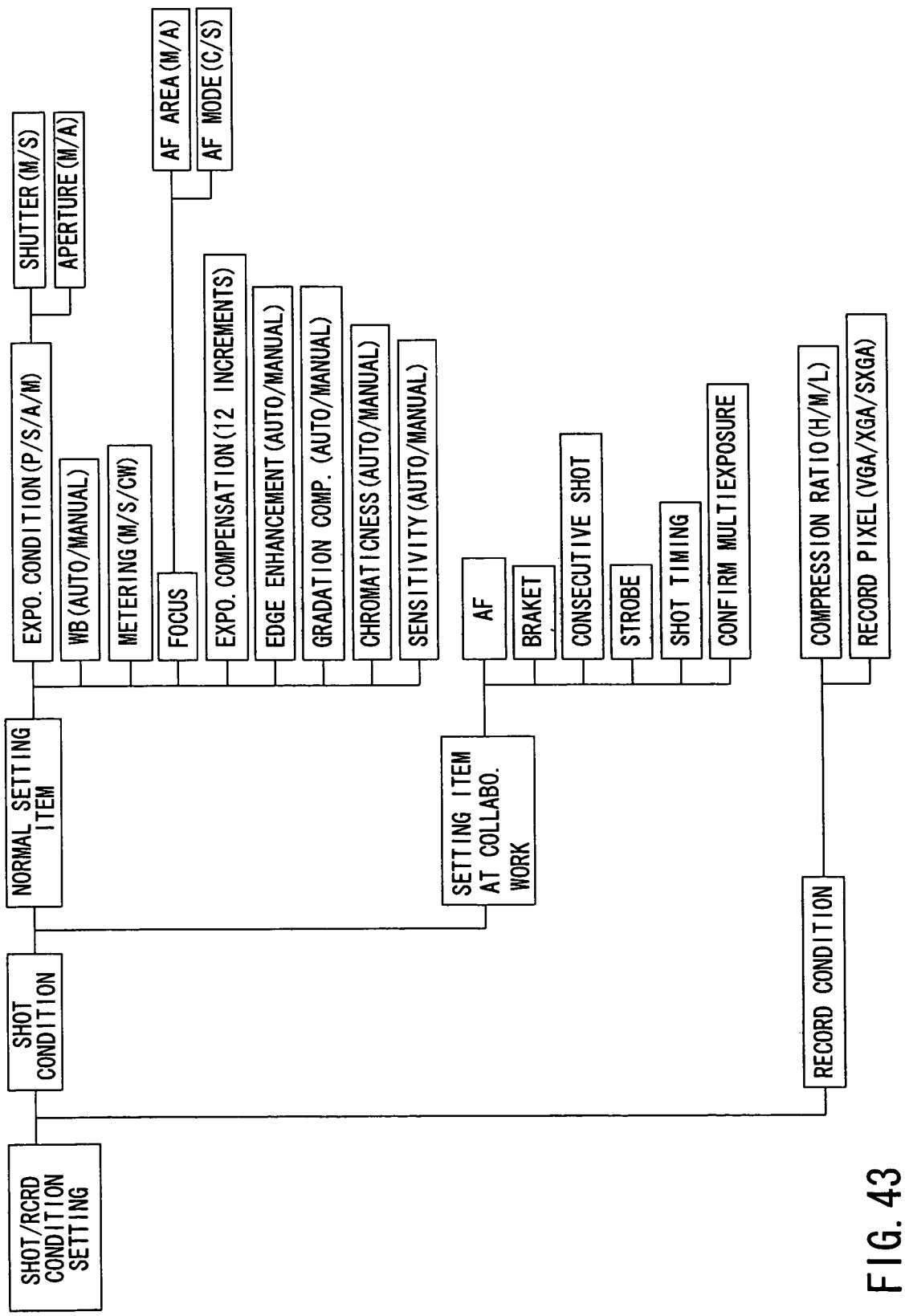
FIG. 43 represents a list of setting items in a setting menu of a shooting/storage condition.

In step S208 of FIG. 7, as shown in FIG. 40, with the menu to set the shooting/storage cameras, the menu for setting various shooting/storage conditions to the set cameras is displayed. When the item "Set shooting/storage cameras" is selected, a screen for selecting a camera to set shooting/storage conditions as shown in FIG. 57 comes up. In this diagram, in order to lessen the intricacies of setting procedures to be performed by a user, an item that enables a master camera and a slave camera to have all identical settings has been set as a default. When this item is clicked, all settings are what the master camera pre-sets. A second item is to set the same settings to a slave camera as those to a master camera simultaneously. If a user wants to set any setting per each camera, the user clicks a third item and individually selects any of cameras that the user wants to set. Based upon FIG. 40, a shooting condition and a storage condition will be set to each of cameras that are set through selection of the second and third items, and then, a detailed screen of setting contents varying with a menu setting to be displayed at this time is represented in FIG. 43 as a chart just for explanation purpose.

As seen from this diagram, there are too many setting items, so it becomes intricate to set all items when the second and the third items of FIG. 57 are selected. Or a user does not set or forgets to set a certain setting. Therefore, in this case, just like the first item of FIG. 57, given setting items of the shooting/storage conditions are caused to be pre-set by all cameras as a default. More specifically, for instance, a setting item is set so as to let an exposure control be set to a program mode (P), an exposure metering system be set to a center-weighted metering, a white balance be set to an auto white balance, a compression ration be set to a middle level, a recording pixel number be set to VGA and an exposure compensation be set to 0. When a time setting rather than shooting/storage conditions is performed, for example, by making settings of the master camera and the slave camera identical, time difference between cameras can be avoided. An identical time can be set in this step S208, but also may be set in step S112 of FIG. 5.

When a different type of a camera is connected and the camera is caused to collaborate, as functions vary from a camera to a camera, contents of setting items set as the default as explained before or identical setting items set to master camera A are not always settable to slave camera B. In a case where any setting is performed to such camera, CPU 112 identifies a settable value by slave camera B from camera information about slave camera B and lets slave camera B automatically select a value closest to a predetermined value, and then this value be set to slave camera B. Or, a user may select a setting value as close as possible to a setting value of master camera A from camera information about slave camera B displayed on LCD monitor 109 and may set this value to slave camera B.

Among items of an exposure condition, regarding items of a program mode, a shutter priority, an aperture priority and a manual mode, when slave camera B has no identical item, a shutter speed and aperture values decided according to items set to master camera A may be set to slave camera B. Or, a user checks with LCD monitor 109 of master camera A and can set a shooting condition settable by both cameras. As seen from the foregoing, there is a case where a setting unlike an original setting might be performed to slave camera B, so an actual setting value is displayed on LCD monitor 109 to make sure of the actual value.

Further, when a camera of a different maker collaborates to shoot, a finished picture looks different depending upon a camera maker. In this case, at a time of selection of items such as a light metering system, a white balance, chromaticness and edge enhancement, let a compensation value to correct any difference between cameras be sent out to slave camera B simultaneously. Accordingly, as the same setting of master camera A cannot be always made on slave camera B, a warning is displayed on LCD monitor 109 in this case.

Figure 28:
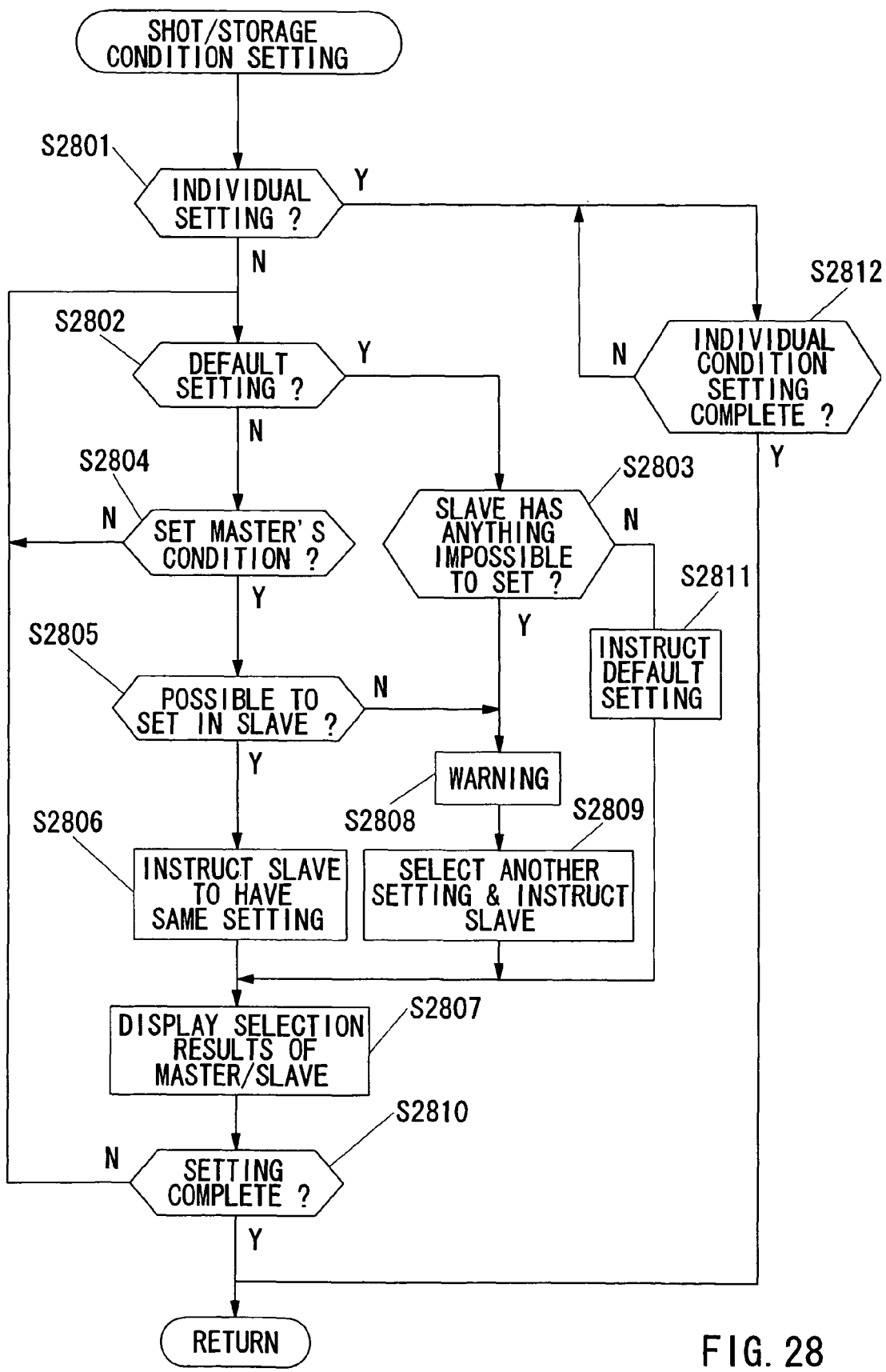
FIG. 28 is a flow chart illustrating a sequence of setting a shooting/storage condition.

Of what has been explained so far in step S208, an action flow to set a shooting and storage conditions will be explained based upon FIG. 28. In step S2801, it is judged whether or not a setting is individually made on each camera. If the individual setting is selected, a flow proceeds to S2802 where it is judged whether or not a default setting effective for all cameras is selected. If the default setting is selected (the first item of FIG. 57), a flow proceeds to S2803 and when a setting of slave camera B is selected to conform to a setting of master camera A (the second item of FIG. 57), a flow proceeds to step S2804. In step S2804, it is judged whether or not any of setting items described in FIG. 43 is selected by master camera A. When nothing has been selected, a flow waits for a selection and when any of the setting items or values is selected, a flow proceeds to step S2805. In step S2805, it is judged whether or not the same setting selected by master camera A is settable on slave camera B based upon camera information about slave camera B.

Figure 58:
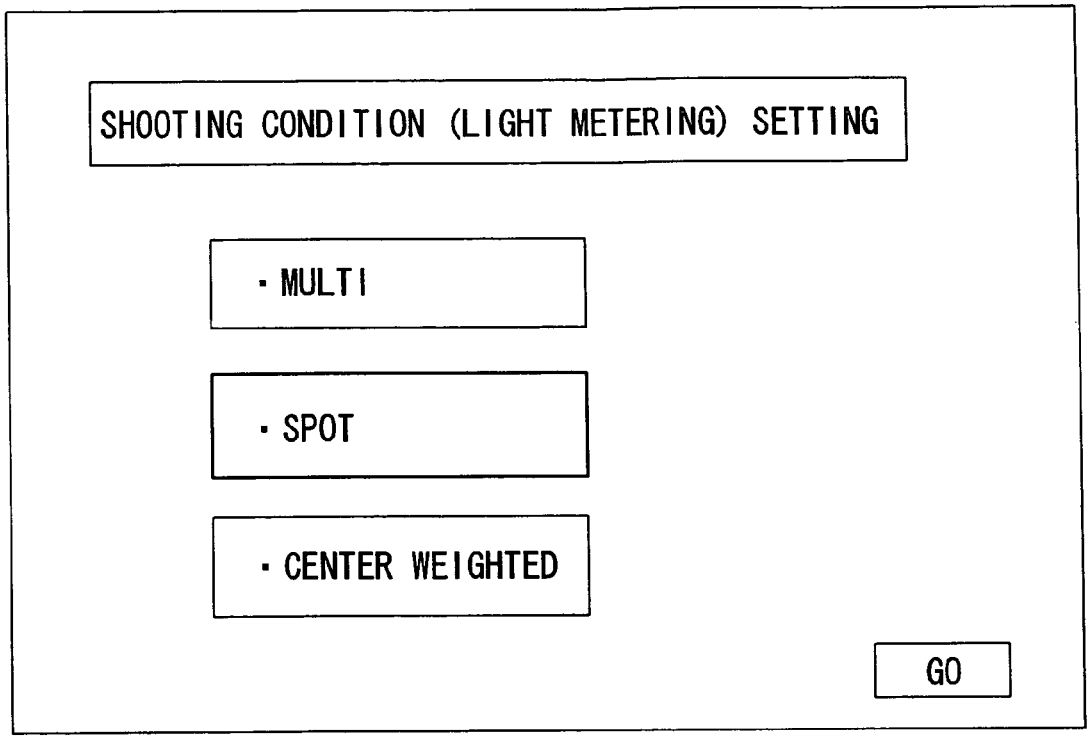
FIG. 58 is an example of a menu display for selecting a setting method in a light metering.

In FIG. 58, a display example when selecting a light metering is shown. When a spot metering is selected herein, the spot metering is set on both of master camera A and slave camera B. If there are plural slave cameras, it is judged whether or not the spot metering is settable on all slave cameras. When it is judged that the same setting of master camera A is settable on slave camera B, a flow proceeds to step S2806 where slave camera B is instructed to conform to the same setting selected by master camera A and in step S2807, LCD monitor 109 displays setting results of master camera A and slave camera B. In this case, as explained before, when any compensation value is required because a camera type is different, in step S2806, the compensation value is also sent out simultaneously. In step S2805, if it is judged that a setting to slave camera B is impossible, a flow proceeds to step S2808 where LCD monitor 109 displays a warning that the setting is impossible and in step S2809, other setting is selected and slave camera B is instructed to set the selected setting.

Figure 59:
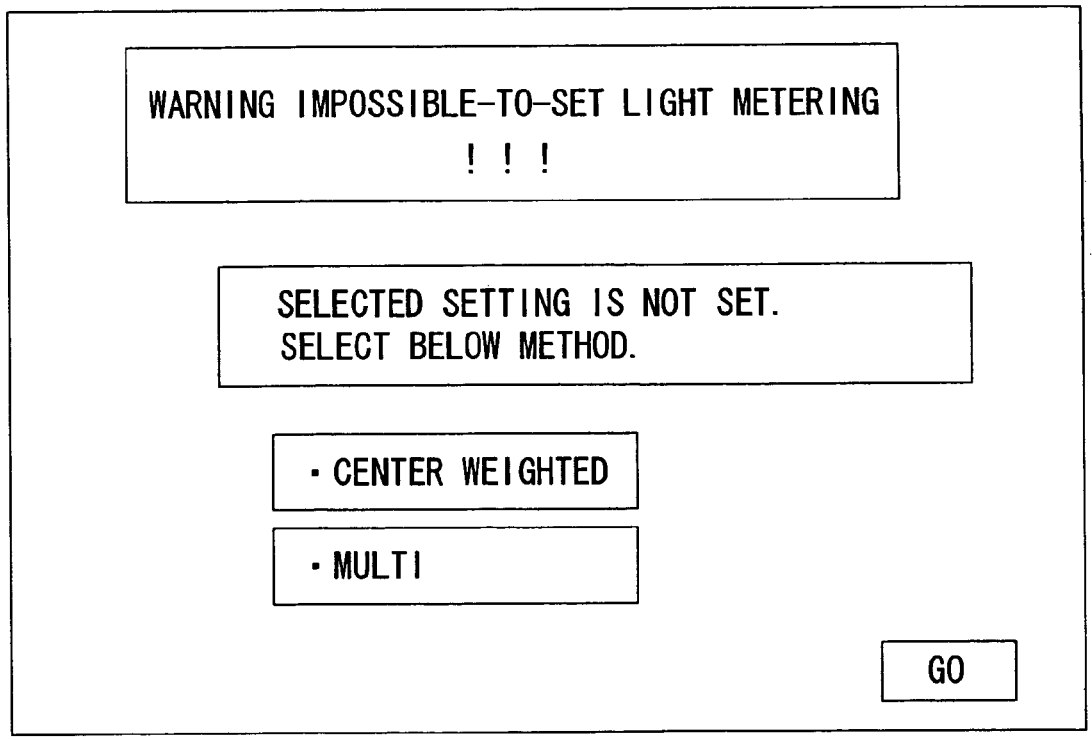
FIG. 59 is an example of a menu display indicating a warning when setting a light metering.

In FIG. 59, an example of a display screen to warn and change a setting is shown. According to this display screen, a spot metering is selected in the FIG. 58, but a center-weighted metering and a multiple metering only are available for slave camera B. Thus, this screen displays that a user selects any of these two metering. However, master camera A may select automatically. In step S2807, a setting result is displayed. If there are plural slave cameras, step S2806 or step S2809 is selected per each slave camera with regard to a single setting item and its selection result is displayed. After completion of an item setting or its checkout, a flow proceeds to step S2810, and when other setting is selected, a flow gets back to step S2802 and when other setting is not selected, the setting of the shooting and storage conditions is finished.

When a default is set on all the cameras in step S2802 and thus a flow proceeds to step S2803, it is judged whether or not items of an exposure condition and so or values of a shutter speed-setting and the like pre-selected in step S2803 can be set by slave camera B based upon camera information about slave camera B. If every item or value can be set by slave camera B, a flow proceeds to step S2811 and slave camera B is instructed to set the default, and LCD monitor 109 displays setting values of master camera A and slave camera B in step S2807. If there is any of items or values that slave camera B cannot set in step S2803, a flow proceeds to step S2808 and after warning, other value or item is selected. In step S2803, if there are plural slave cameras, step S2806 or step S2809 is also selected per each slave camera with regard to a single setting item and its selection result is displayed. An example of a display screen is identical to the one of FIG. 59. When an individual selection is selected in step S2801, a flow proceeds to step S2812 and waits for setting completion per each camera.

Details of a shooting/storage condition that has been explained so far will be explained based upon FIG. 43. When a setting item of a shooting condition as explained before is selected in FIG. 40, a selection screen of a normal setting item and a setting item at collaborating work shown in FIG. 43 appears. When the normal setting item is selected, items such as an exposure control, a light metering, white balance, exposure compensation, a focusing method, edge enhancement, gradation compensation, chromaticness and sensitivity are displayed, and if each item is selected individually, then a screen to set its detail comes up.

In items of an exposure control, next comes a screen to set a program mode (P), a shutter priority mode (S), an aperture priority mode (A) and a manual mode (M). When S or M is set, a setting screen for the shutter speed is further displayed, and when A and M are selected, a screen for setting an aperture value is further displayed. With regard to the light metering, a screen for selecting any of the multiple metering, spot metering or center-weighted metering appears. When it comes to white balance, an automatic setting screen and a manual setting screen for selecting any of individual color temperatures such as sun, a light bulb, a fluorescent and the like. In a case of exposure compensation, a user selects from compensation values made up of total twelve-increments by ±one-third step. The focusing has a screen for selecting any of an automatic selection or manual selection of an AF (auto focus) area and a screen for selecting any of a C-AF mode that runs an AF action consecutively or a S-AF mode that does not run the AF action consecutively. Edge enhancement, gradation compensation and shooting sensitivity have automatic and manual selection screens respectively while a chromaticness setting has a screen for selecting any of a manual setting of chromaticness and monochrome setting.

The setting item at collaborating work is a particular setting item when a camera is set to collaborating work. At a normal shooting rather than a collaborating shooting, of these setting items at collaborating work, an item for setting a part relevant to the normal work is only displayed and can be set. Except for a setting of a continuous consecutive shot to be explained later, when fully-depress switch 1163 of a master camera is fully depressed, basically each camera takes an individual shot simultaneously based upon the normal setting items that have been set.

When a storage condition is selected, settings of a compression ratio and a number of a storing pixel are performed. The compression ratio is selected from any of high, middle or low and the number of a storing pixel is also selected from any of VGA, XGA or SXGA. If cameras using different imaging elements with different pixel numbers are involved, the storing pixel number can be set so as to become identical.

A screen of the normal setting item is omitted here because this screen is known with a conventional camera and a case where the setting item at collaborating work is selected will be detailed as follow. In a camera having the setting item at collaborating work set, various interesting shots become possible.

—AF Setting—

Figure 44:
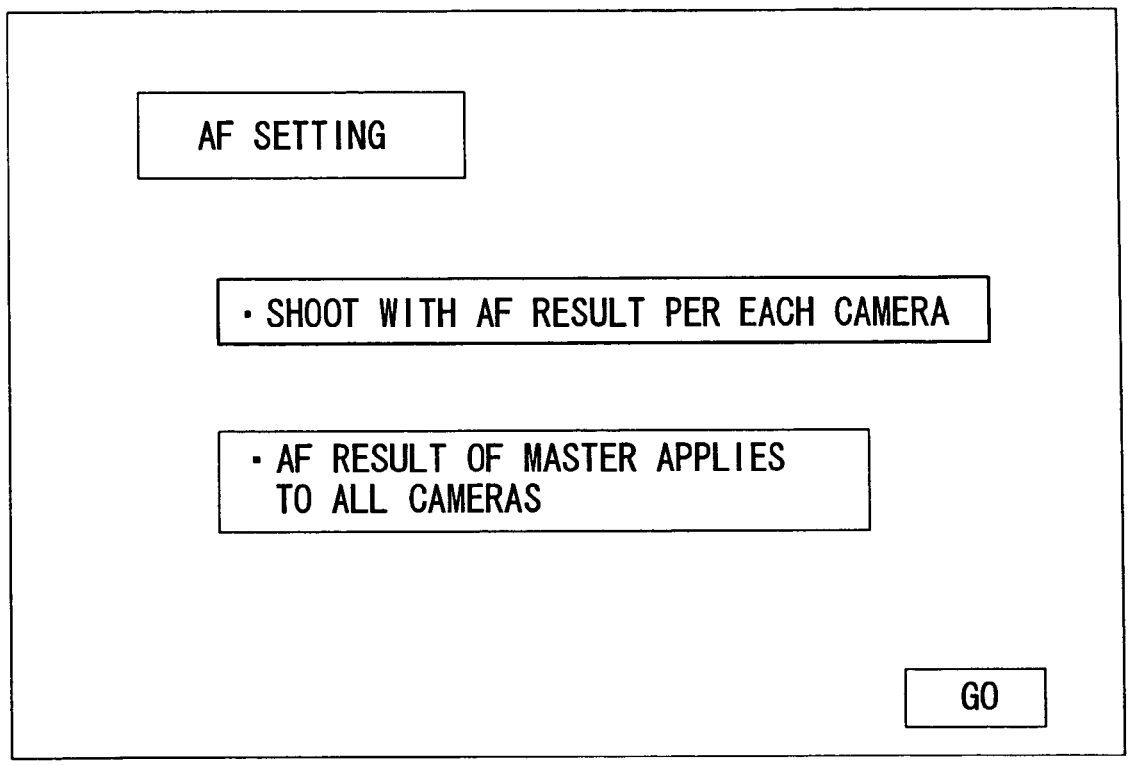
FIG. 44 is an example of a menu display for setting a camera that uses an AF result.

An AF setting will be explained. In ordinary cases, it is common that, in a collaborating shooting, an AF calculation is performed per each camera and then, a shooting is performed in accordance with each calculation result. On the contrary, when cameras at collaborating work are different types, AF working principle and focusing algorithm are different. That is, even with the same shooting subject, a focusing precision and a focusing time becoming different depending upon a camera causes inconvenience. In this case, this inconvenience can be solved by setting a shooting distance obtained by a master camera to every slave camera right way. An example of a display screen for setting this is shown in FIG. 44.

—Shot Timing—

Figure 45:
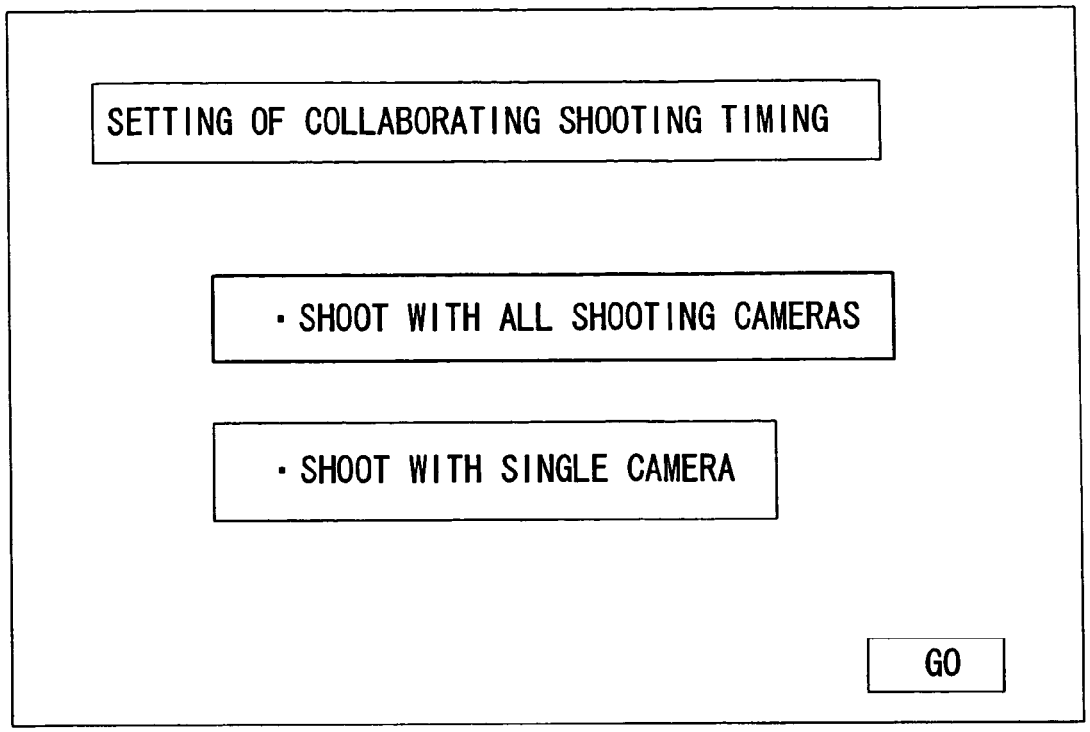
FIG. 45 is an example of a menu display for setting timing in a collaborating shot.

A case where an item to set shot timings of a master camera and a slave camera is selected will be explained. A display example of a selection screen in this case is shown in FIG. 45. According to a default setting, a shot is taken by every camera and, when fully-depress switch 1163 is fully depressed, a shooting is performed simultaneously by all shooting cameras. On the other hand, when selecting an item that a shot is taken by a single camera only, only a single shutter releasable camera is automatically checked out from cameras at collaborating work after a shutter of the master camera is released and a shot is taken by this camera.

A shooting pattern corresponding to a setting result of the item of a shot timing and setting results of the shooting and storage cameras set respectively in FIGS. 41 and 42 will be explained about a case of a single shot in accordance with a flow of FIG. 23. In step S2301, it is checked whether or not fully-depress switch 1163 of master camera A is switched on. When fully-depress switch is OFF, a flow proceeds to step S2302 where it is checked whether or not halfway-depress switch 1162 is ON. When switch 1162 is OFF, a flow is finished, but when switch 1162 is ON, a flow gets back to step S2301. If it is judged that switch 1163 is ON, it is checked in step S2303 what is set as the shot timing. When a setting is to take a shot by a single camera, a flow proceeds to step S2304 and when a setting is to take a shot by every shooting camera, a flow proceeds to step S2305. In this step S2305, it is checked whether or not every set-up shooting camera can take a shot and when it is checked that every shooting camera can take, a flow proceeds to step S2306 and every set-up shooting camera is instructed to expose. After completion of the exposure with a given shutter speed time, in step S2307, a given storage camera is instructed to store. A detail about this given storage camera will be explained in a section of collaborating storage.

After completion of the storage instruction, a flow gets back to step S2302 where it is checked whether or not halfway-depress switch 1162 is ON. A sequence of a simultaneous shot taken and stored by every set-up shooting camera is finished. In step S2305, instead of waiting for shutter releasing permission of every shooting camera, when fully-depress switch 1163 is switched on, an exposure instruction may be performed in order of a shutter releasable camera from the set-up shooting cameras.

When a single camera shooting is set in step S2303, a flow proceeds to step S2304 where it is checked that master camera A is set as a shooting camera. The reason is that, when plural shooting cameras including master camera A are capable of releasing a shutter, priority is given to a shutter release by master camera A. When master camera A is not set as a shooting camera, a flow proceeds to step S2308. In step S2308, it is checked whether or not master camera A is in a state of being able to release a shutter and when master camera is not capable of releasing a shutter, a flow proceeds to step S2309. When camera A is capable of releasing a shutter, a flow proceeds to step S2310 and master camera A is instructed to expose.

After completion of the exposure, a flow proceeds to step S2307. When it is judged in step S2308 that master camera A is not capable of releasing a shutter, a flow proceeds to step S2309 where it is checked whether or not a shutter release permit signal from slave camera B set as a shooting camera is received by master camera A. If the shutter release permit signal is not received, a flow gets back to step S2304 and when the permit signal is received, a flow proceeds to step S2311. In step S2311, it is checked whether or not a slave camera receiving the shutter release permit signal is a slave camera that stored before this shooting. If a shooting is a first collaborating shooting work for the slave camera or when the slave camera is different from a slave camera that stored a result of a previous shooting work, a flow proceeds to step S2307. In step S2311, if master camera A receives a shutter release permit signal even from the same slave camera that stored the previous shooting result, a flow proceeds to step S2312 where this same slave camera is instructed again to expose and then, a flow proceeds to step S2307.

As seen from this shooting pattern, when a shutter release of master camera A is impossible and there are plural shutter releasable slave cameras, a shooting order among the slave cameras is in no particular order. But, if storage onto a totally different camera is performed randomly, a sort-out afterward becomes cumbersome. In order to avert to transfer to other camera although a shooting camera can also store, when a shooting is performed again after a shot is taken and stored by a slave camera, if a camera having taken a previous shot is capable of shooting, a shot is taken again by this camera. A sate that a camera set as a shooting camera cannot release a shutter is a case where the shooting camera cannot receive its next shutter release permit signal until a storage work is completed because the shooting camera is being storing onto a buffer memory. Like this, if fully-depress switch 1163 is depressed and immediately switch 1163 is depressed again, it becomes possible for other camera to continue a shooting immediately.

Figure 23:
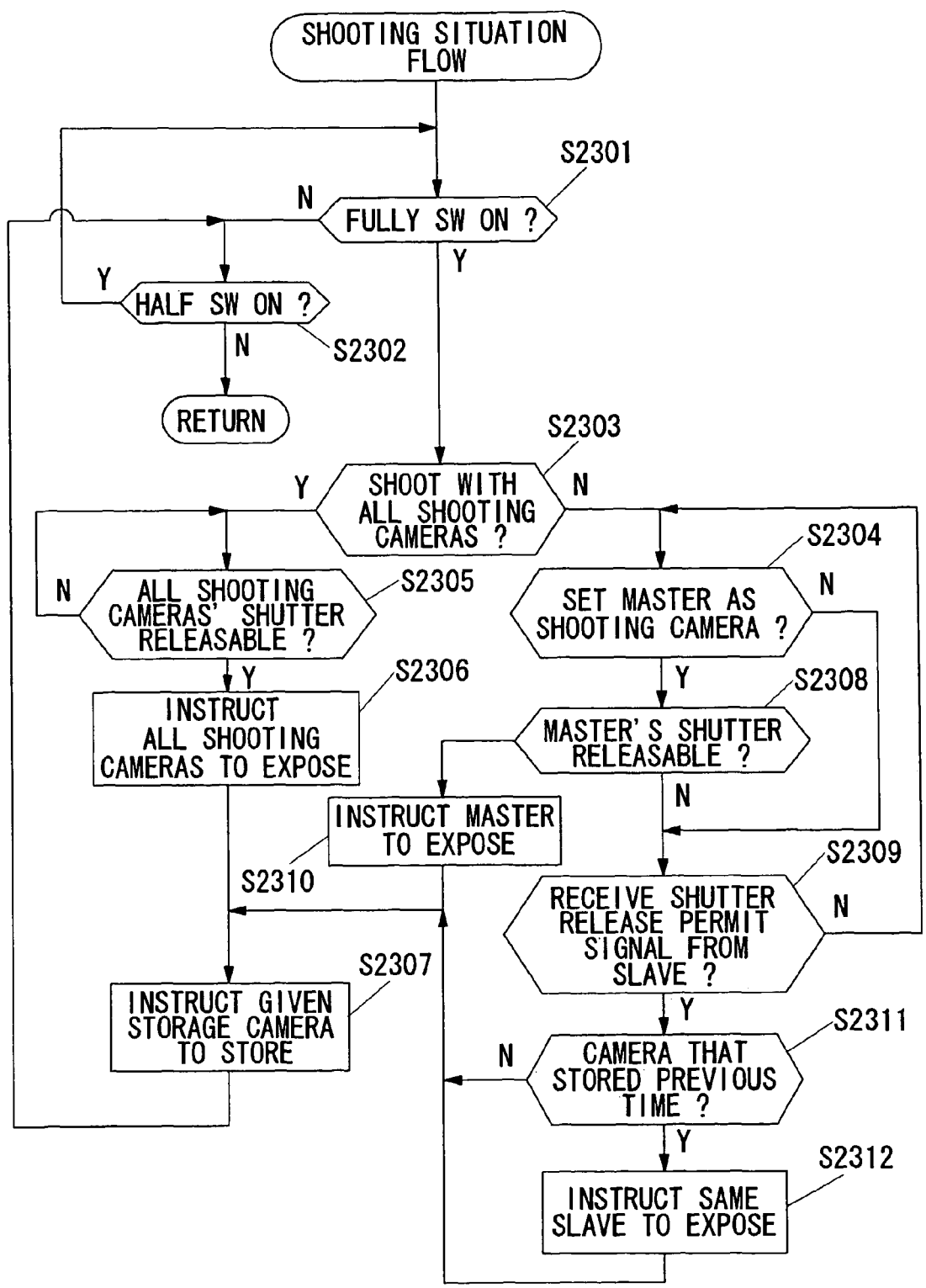
FIG. 23 is a flow chart illustrating a shooting situation.

A case of a single shot has been explained so far based upon the flow of FIG. 23. Even in a case of a consecutive shot, basically a selection method of a shooting camera or a storage camera is same. Namely, regardless of a single shot or a consecutive shot, an interval from switching off fully-depress switch 1163 to fully depressing switch 1163 again can be shortened. A timing of this consecutive shot will be explained later based upon FIG. 11. And, even when a shot cannot be taken by a camera having taken a previous shot due to other reason rather than being storing onto the buffer memory, immediately other camera can continue to take a shot and thus, a shutter chance is not missed.

—Bracket Setting—

Figure 46:
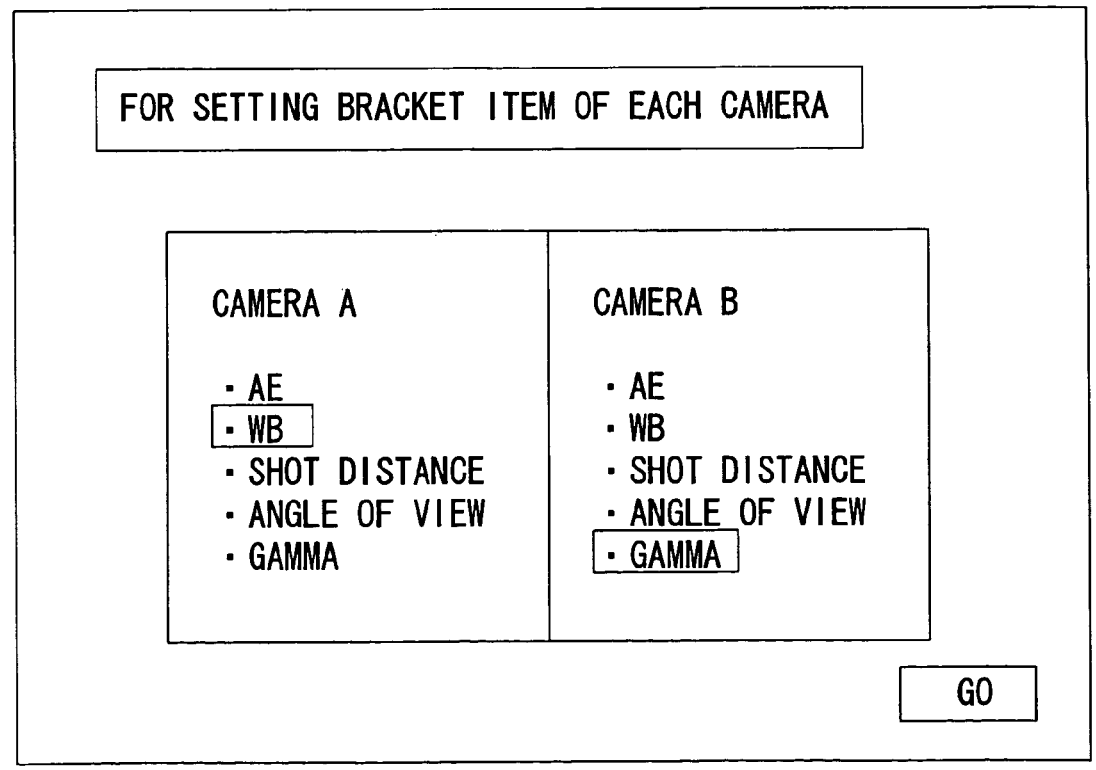
FIG. 46 is an example of a menu display for setting a bracket item of each camera.

Referring to flows of FIGS. 24-26 and display examples of FIGS. 45-49, a bracket setting and a bracket shot method will be explained. FIG. 46 shows an example of a setting screen at a time of setting a bracket. As shown in FIG. 46, any item is selected per each camera from bracket shooting items such as an exposure, white balance (WB), a shooting distance, a zoom position (an angle of view) and gamma. A shooting distance bracket is a shooting method in which several shots are taken while moving a taking lens forwards and/or backwards to a focus position obtained through an AF calculation little by little. FIG. 46 represents a case where a WB bracket is set to master camera A and a gamma bracket is set to slave camera B.

Figure 24:
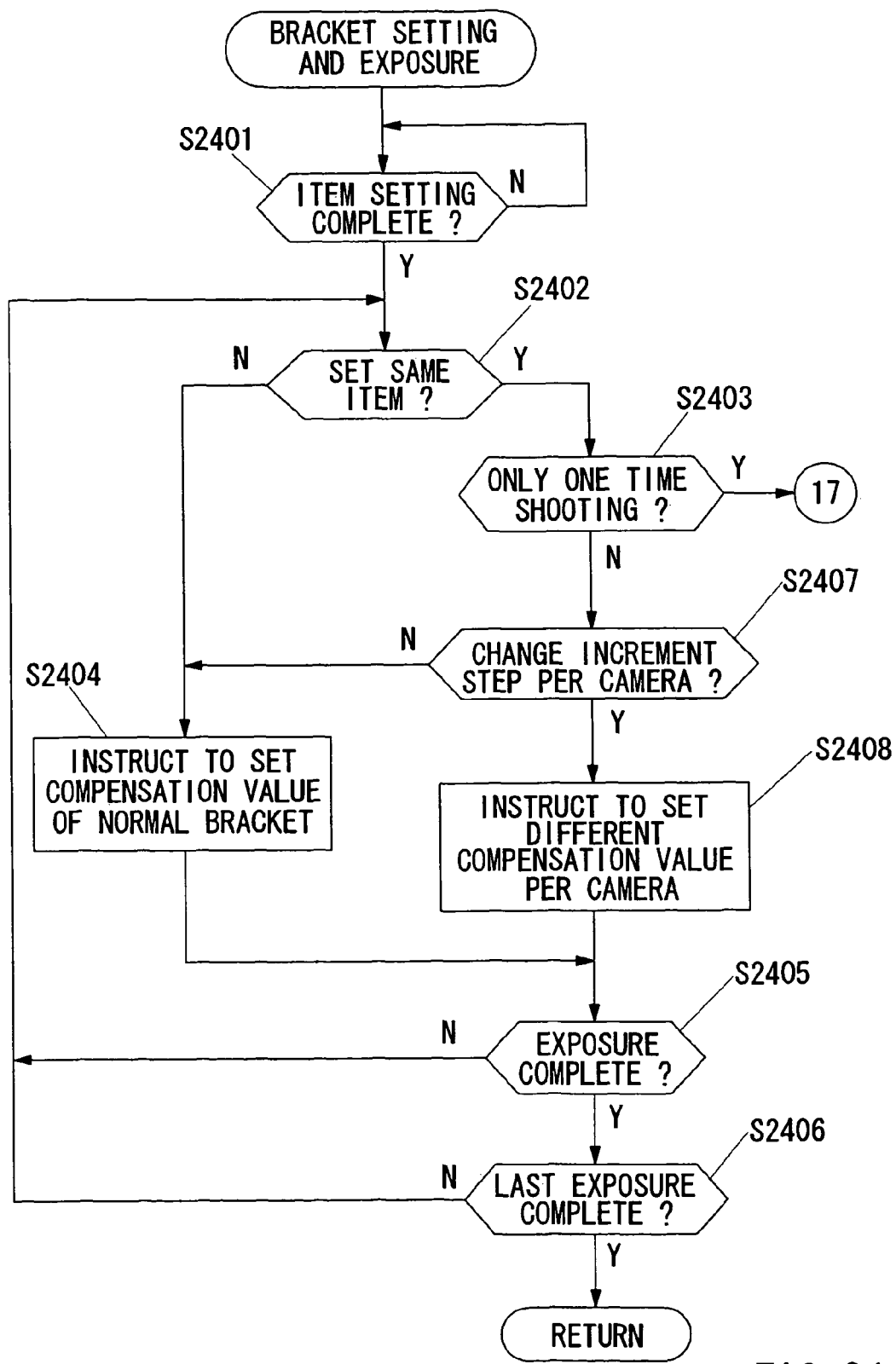
FIG. 24 is a flow chart illustrating a sequence of a setting and exposure of a bracket.

Referring to FIG. 24, a setting and an exposure at a time of a bracket shot will be explained. In step S2401, when it is checked that a setting of a bracket item displayed on a setting screen of FIG. 46 is completed, a flow proceeds to step S2402 and it is judged whether or not a bracket item selected per each camera is same. If the item is same, a flow proceeds to step S2403, and if the item is not same, a flow proceeds to step S2404. In step S2404, a compensation value in a case of a bracket shot by each camera is selected and each camera is instructed to set the value. It is possible that not by instructing to set a value directly to each camera, an increment step of compensation to the bracket item or a total number of shot frames is only instructed per each camera and a bracket shot is taken by each camera corresponding to this instruction. In step S2405, it is judged whether or not an exposure per each camera is completed based upon a switch-on of fully-depress switch 1163. When fully-depress switch 1163 is not depressed, a flow gets back to step S2402 and stands by a case of a setting change, etc. If it is checked in step S2405 that an exposure per each camera is completed, a flow proceeds to step S2406, where it is judged whether or not a completed exposure is a last exposure set as the bracket shot. If the completed shot is not the last exposure, a flow gets back to step S2402 where a bracket shot is continued and when a subsequent shot becomes a last exposure, the bracket shot is finished. Like this, as a different bracket setting can be set per each camera, image data under many shooting conditions can be obtained simultaneously by a single shooting.

Figure 47:
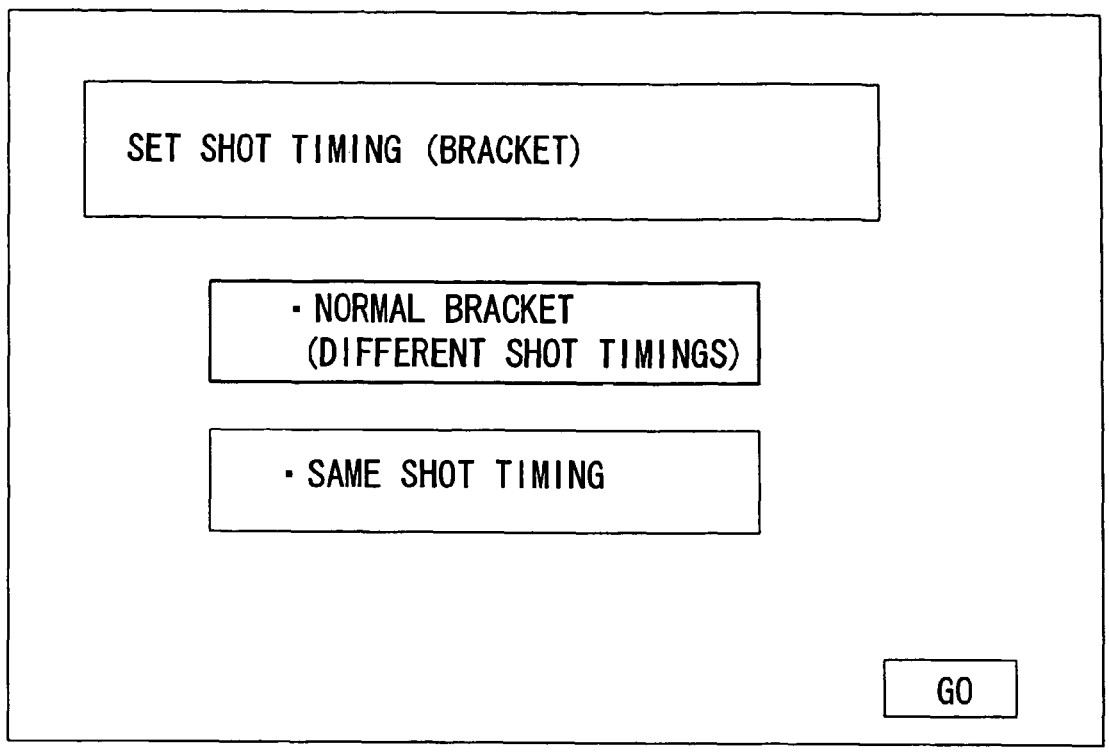
FIG. 47 is an example of a menu display for setting bracket timing.
Figure 48:
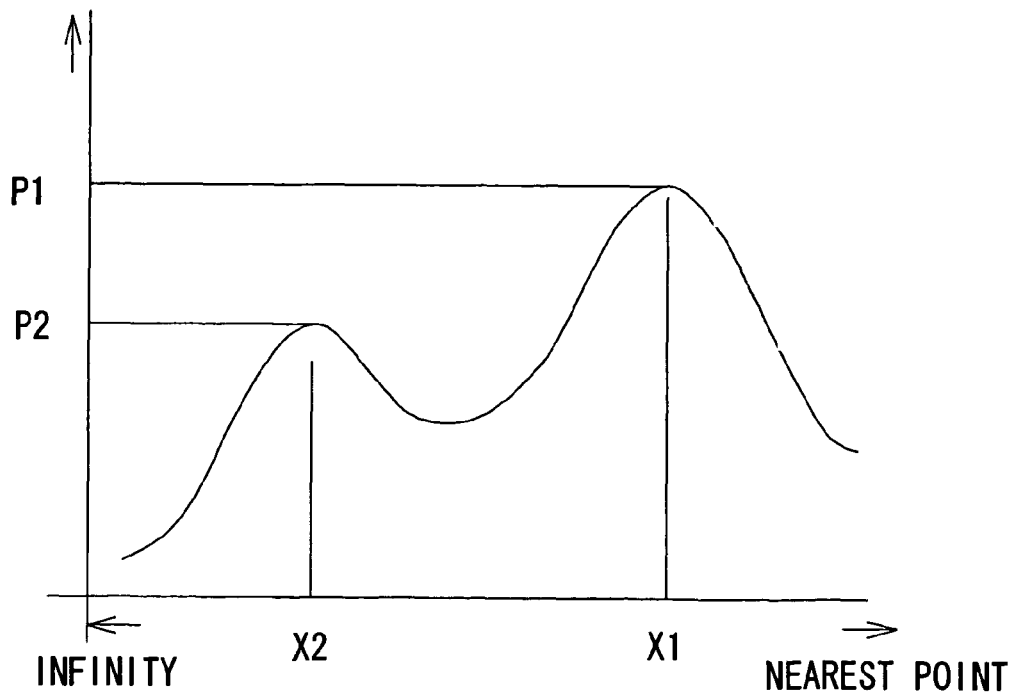
FIG. 48 is an example of changes of an evaluation value in AF contrast.

When it is judged in step S2402 that the same bracket item is selected, a flow proceeds to step S2403 where it is judged whether or not a number of a bracket shot is one shot only. When a single camera takes a normal bracket shot, each shooting time becomes different little by little. On the contrary, at a time of a collaborating shooting, in addition to this bracket shot, plural cameras at collaborating work set different compensation values each other and the number of the bracket shot images equivalent to the number of cameras at collaborating work at the same time can be obtained. FIG. 47 represents an example of a setting screen to be displayed after a same item is set. A default is set so as to take a normal bracket shot. In step s2403, when it is judged that a bracket shot at a same time as shown in FIG. 47 is selected, a flow proceeds to step S2409. When it is judged that the normal bracket shot is set, a flow proceeds to step S2407. In step S2407, it is judged whether or not a change of an increment step among cameras against the selected same bracket item is set.

An example of a selection screen in this case is shown in FIG. 49. The diagram indicates respectively that camera A selects a step by one-third increment and a step by one increment is selected by camera B. As a default, no change of an increment step is set. In step S2404, when it is judged that a setting is the default, a flow proceeds to step S2404 and each single camera selects a compensation value for a bracket shot, and each camera is instructed to set this value. A flow proceeds to step S2405 and waits for exposure completion. In step S2407, when it is judged that a change of the increment step per each camera is set, a flow proceeds to step S2408 where each camera is instructed to select and set the selected compensation value based upon the selection result as shown in FIG. 49. A flow proceeds to step S2404 and waits for exposure completion.

Figure 25:
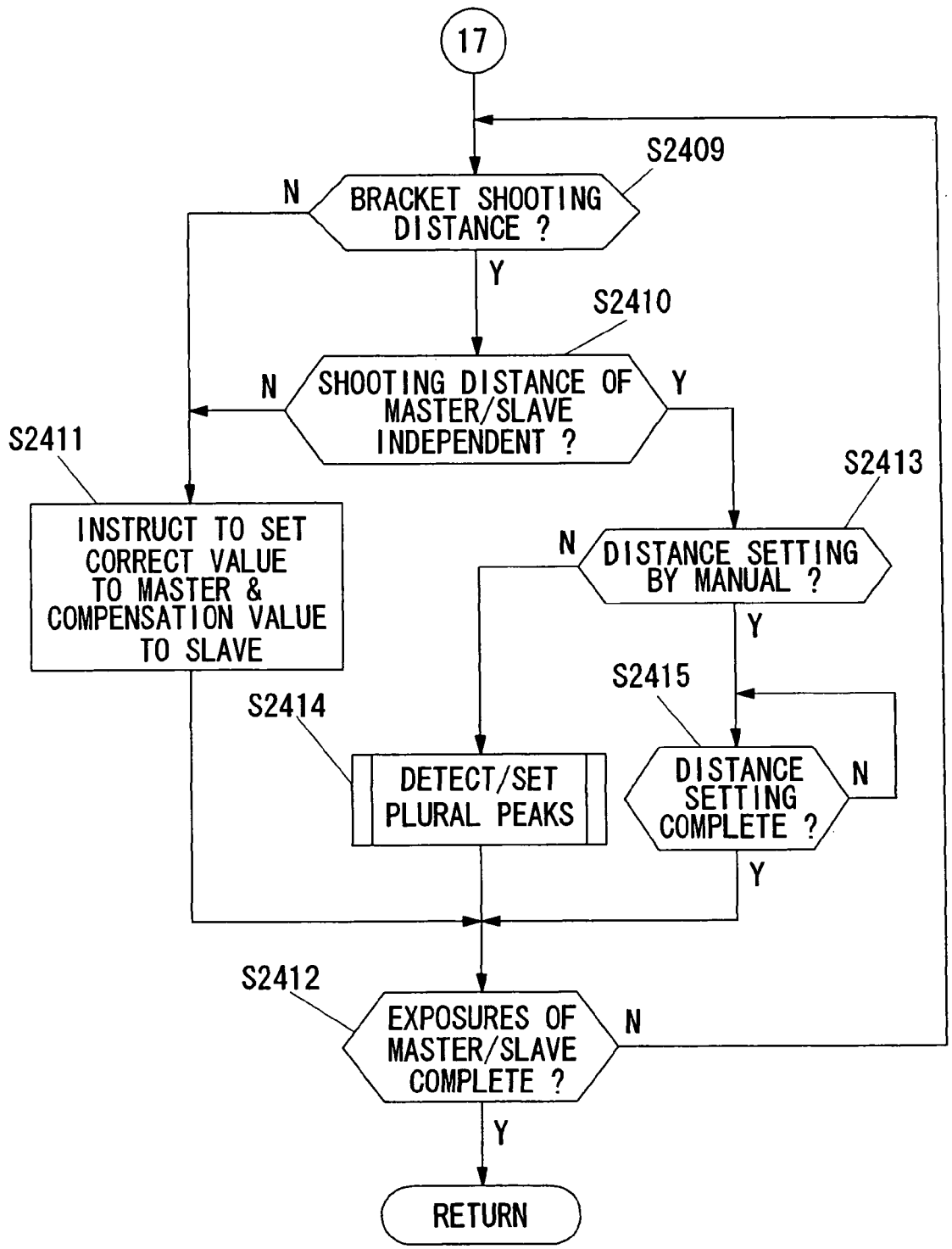
FIG. 25 is a flow chart illustrating a sequence of a bracket setting and a bracket exposure.

When an item of a second same time bracket shot of FIG. 47 is selected, a flow proceeds from step S2403 to step S2409 of FIG. 25. In this step, it is judged whether or not the item of the selected bracket shot is a shooting distance. When the item of a shooting distance is selected, a flow proceeds to step S2410 and when any item other than the shooting distance is selected, a flow proceeds to step S2411. In this step, each camera is instructed respectively to set a correct condition decided by master camera A itself to master camera A and to set a given changed step of an increment from the correct condition to slave camera B. A flow proceeds to step S2412 and waits for exposure completion and if not completed, a flow gets back to S2409. In step S2409, a display example for selecting the item of a shooting distance is shown in FIG. 50. In step S2410, it is judged which item is selected from the selection screen of FIG. 50.

When a first item of FIG. 50 is selected, a flow proceeds to step S2411 where as described before, master camera A is instructed to set a focusing lens to a focus position and slave camera B is instructed to set a focusing lens to a position displaced by a given distance. A second and third items of FIG. 50 are a case where a position of the focusing lens of slave camera B is independent from that of master camera A. In this case, a flow proceeds to step S2413 from step S2410 and depending upon whether or not a distance is manually set, a flow proceeds to step S2414 when the second item of FIG. 50 is selected and when the third item of FIG. 50 is selected, a flow proceeds to step S2415 respectively. In step S2415, it is judged whether or not the focusing positions of master camera A and slave camera B are manually set. After completion of the distance setting, a flow proceeds to step S2412 and waits for completion of the exposure. In this case, however, each exposure is not performed when fully-depress switch 1163 of master camera A is turned on, but an exposure is performed automatically per each camera when fully-depress switch 1163 is turned on and then, a subject enters into a shooting position set by each camera. Accordingly, with a single shutter releasing on master camera A, an unmanned shots of a subject at a position of a plurality of focusing lenses become possible. When the third item of FIG. 50 is selected, subsequently a screen display to set a shooting distance per each camera appears, but a diagram is omitted herein.

In step S2413, a case where the second item of FIG. 50 that "take shots at a plurality of peak positions" is selected will be explained. In this case, a flow proceeds to step S2414 because the shooting distance setting is manual. In step S2414, master camera A decides its focusing lens position and a focusing lens position of slave camera B and instructs to set the focusing lens to the position decided per each camera and waits for exposure completion of each camera in step S2412. A detailed work of step S2414 will be explained deeply based upon a flow of FIG. 26 and an evaluation value fluctuation diagram of FIG. 48.

In step S2414, it is judged whether or not a peak with more than a given value in a focus evaluation value obtained by moving throughout a lens movement range by an AF contrast method is detected. For instance, when there are two peoples at a different place in cross direction, as P1 and P2 of FIG. 48 indicate, there is a case where focus information (evaluation value) from a same focusing area represents an existence of a plurality of peaks. Or in the event that there are plural focus areas, a peak position might be different depending upon a focus area. In this case, according to this system, instead of each peak position detected by master camera A, master camera A sends out to slave camera B information about a shooting lens position (e.g. a shooting distance of master camera A:X1, a shooting distance of slave camera B:X2) so as to take a shot at a different peak position per each camera.

Figure 26:
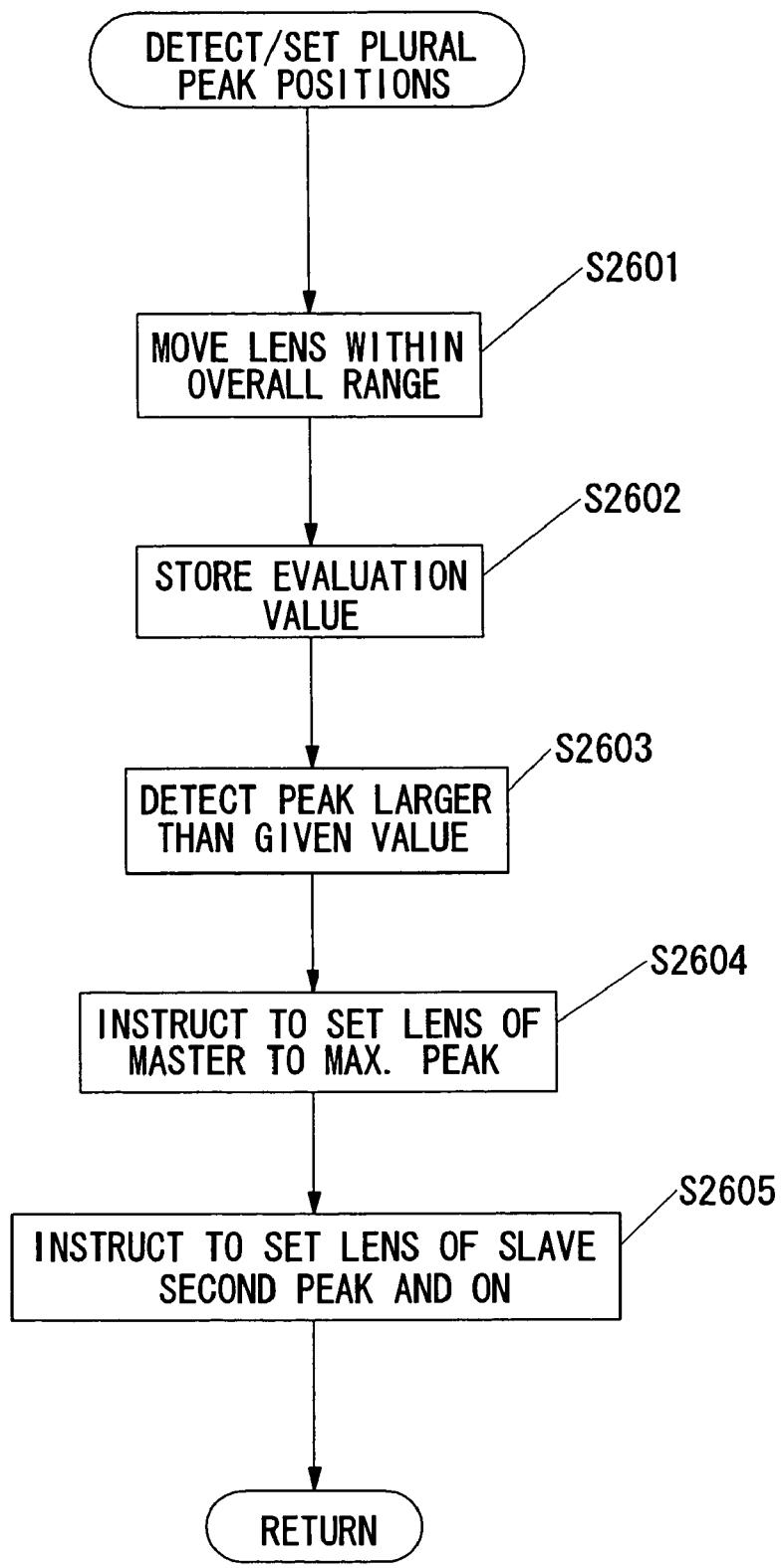
FIG. 26 is a flow chart illustrating a sequence of a detection and setting of a plurality of peak positions.
Figure 27:
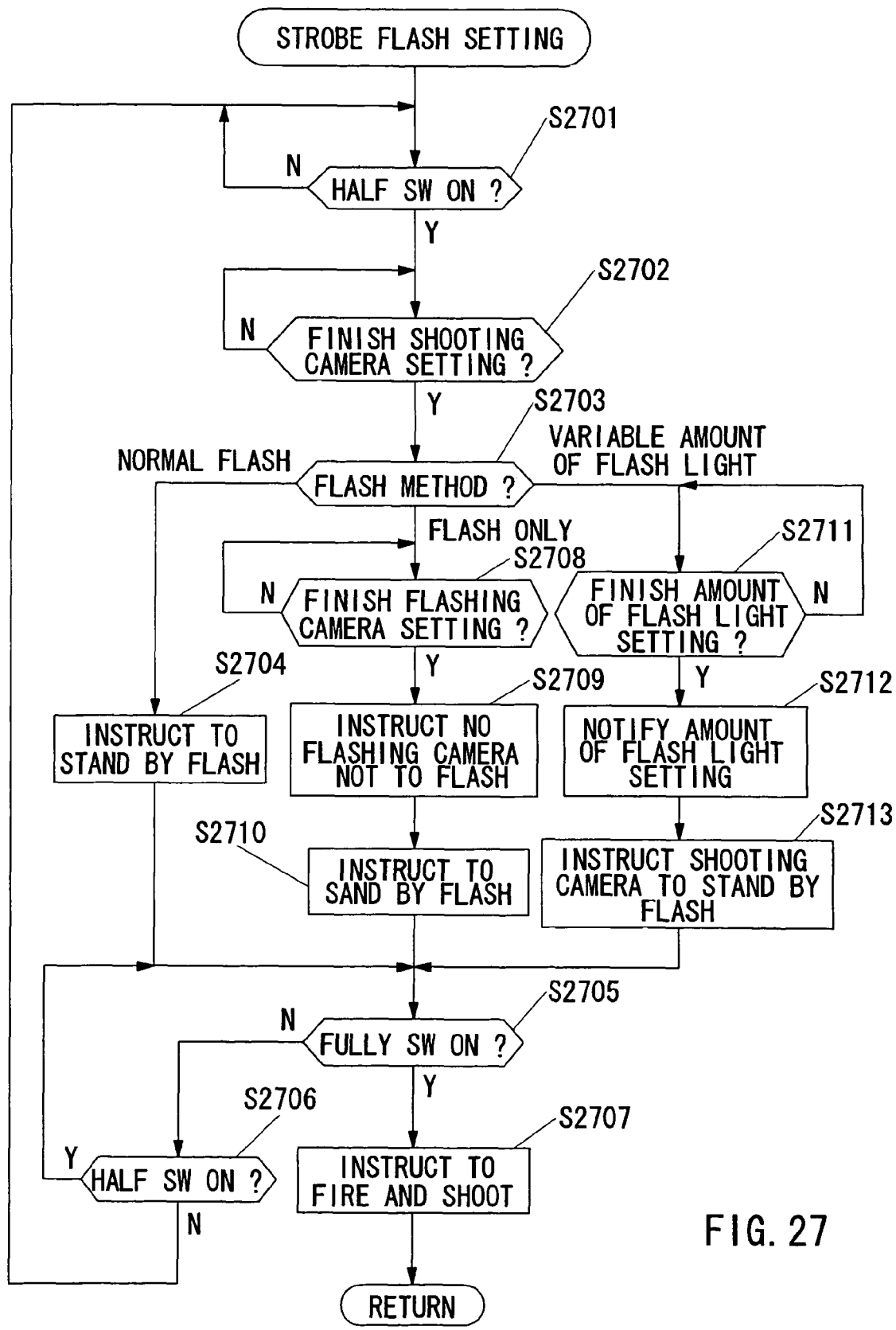
FIG. 27 is a flow chart illustrating a sequence of setting a strobe flash.

Referring to FIG. 26, a work flow will be explained. In step S2601, a focusing lens of maser camera A moves throughout an overall movement range from a nearest point to infinity. In step S2602, an evaluation value in a portion equivalent to an AF area of imaging signals obtained from CCD 113 every a given interval time during the lens movement is calculated at AF calculation 1126 and the calculated evaluation value is stored onto storage device 1128 with the corresponding lens position. In step S2603, it is judged whether or not there is any peak position with more than the given value from the stored evaluation values. In step S2604, an instruction to set a focus lens position of master camera A to a maximum peak position is performed. In step S2605, an instruction to set a position of a focusing lens of slave camera B to a second peak position and on is performed. Regarding a third peak position and on, when there are plural of the slave cameras, an instruction to set a position of a focusing lens to the different peak positions equivalent to the number of cameras is performed. On the contrary, when a number of peak positions are less than a number of shooting cameras, an instruction to set the maximum peak position to plural cameras is performed. Accordingly, collaborate shot becomes possible at a different peak position at the same time.

—Consecutive Shot Setting—

Figure 51:
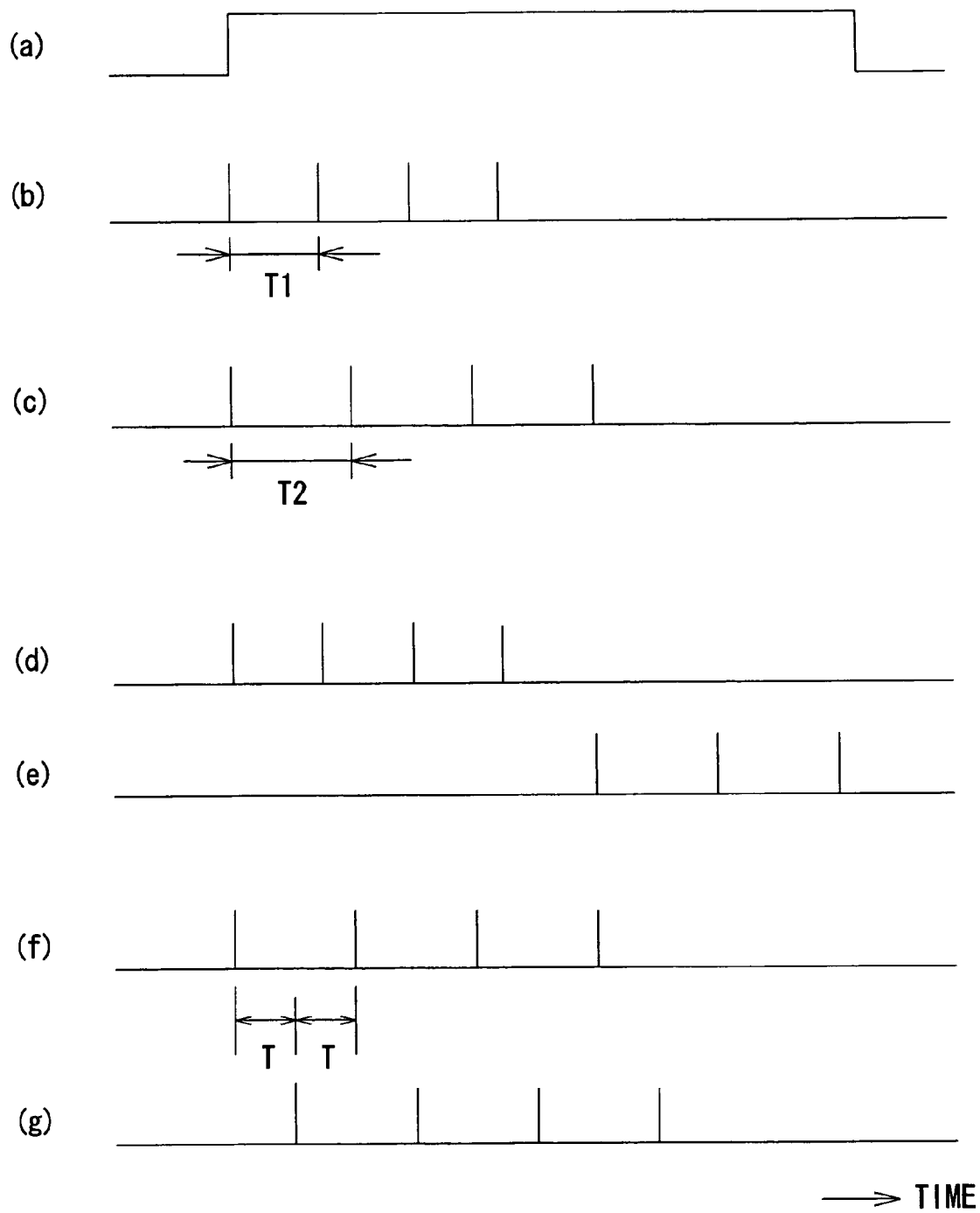
FIG. 51 represents shot timing of each camera in a consecutive shot.
Figure 52:
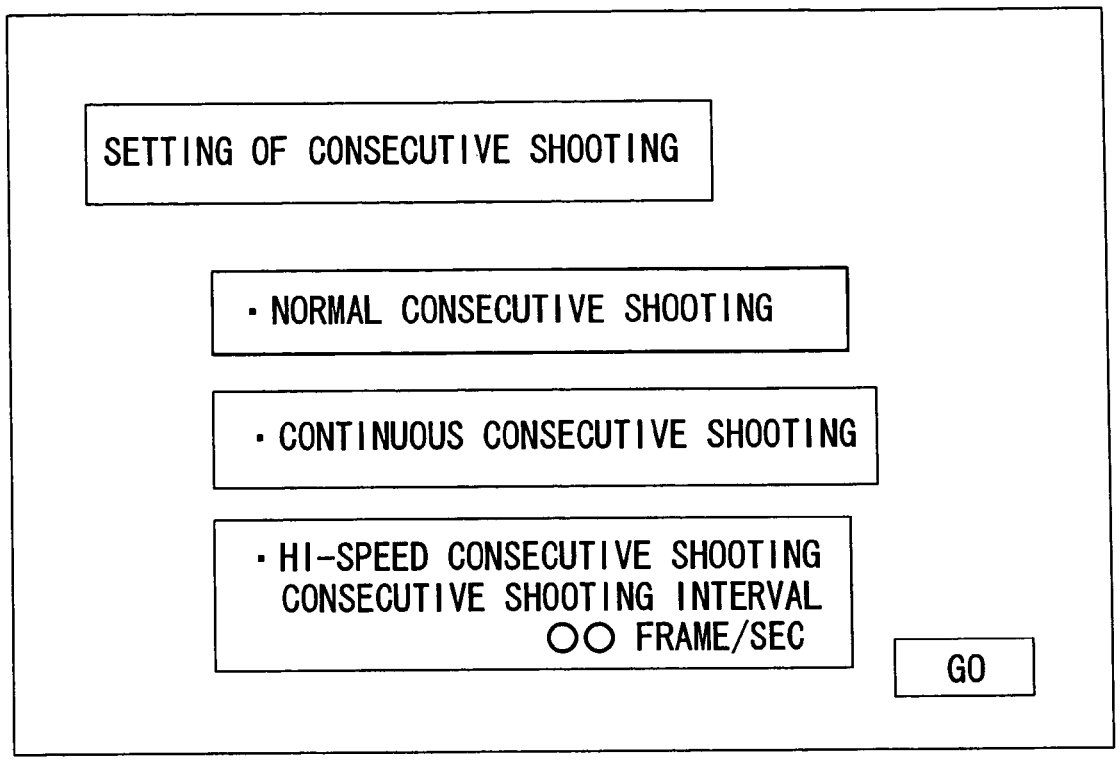
FIG. 52 is an example of a menu display for selecting a shot pattern of a consecutive shot.

Referring to FIG. 51, a consecutive shot will be explained, but a detail is going to be available in collaborating exposure to be explained later, so an explanation of the consecutive shot is limited to a setting item. Collaborating work has following three types of consecutive shots. A case where a consecutive shot is performed by two cameras will be explained. (1) When fully-depress switch 1163 of a master camera is turned on, the consecutive shot is independently performed by each of two cameras (this corresponds to (b) and (c) of FIG. 51 and is referred to as normal consecutive shot therein). (2) When fully-depress switch 1163 of the master camera is turned on, any of two cameras first starts a consecutive shot and at a time when a buffer memory of this camera gets full, the consecutive shot is started by other camera (this corresponds to (d) and (e) of FIG. 51 and is referred to as continuous consecutive shot therein). (3) When fully-depress switch 1163 of the master camera is turned on, a consecutive shot is taken alternatively by two cameras (this corresponds to (f) and (g) of FIG. 51 and is referred to as high speed consecutive shot therein). A screen example for setting these three types of consecutive shots is shown in FIG. 52

—Strobe Setting—

Figure 53:
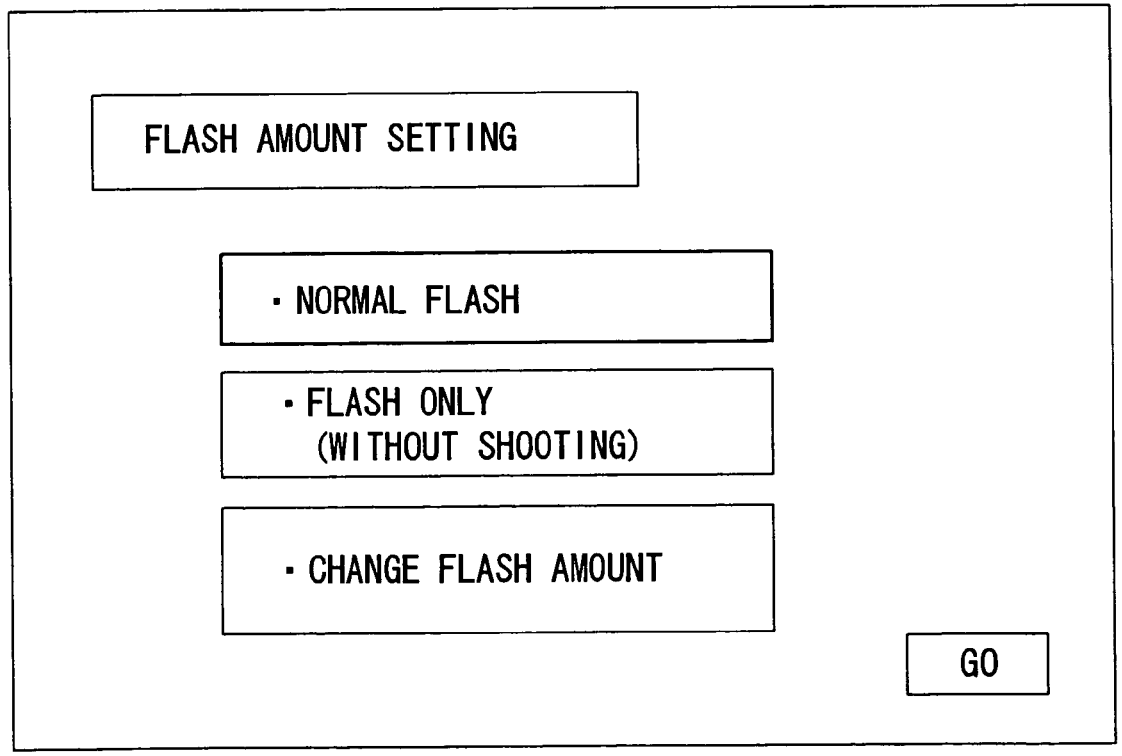
FIG. 53 is an example of a menu display for setting a flash type in FIGS. 54 and 55.
Figure 54:
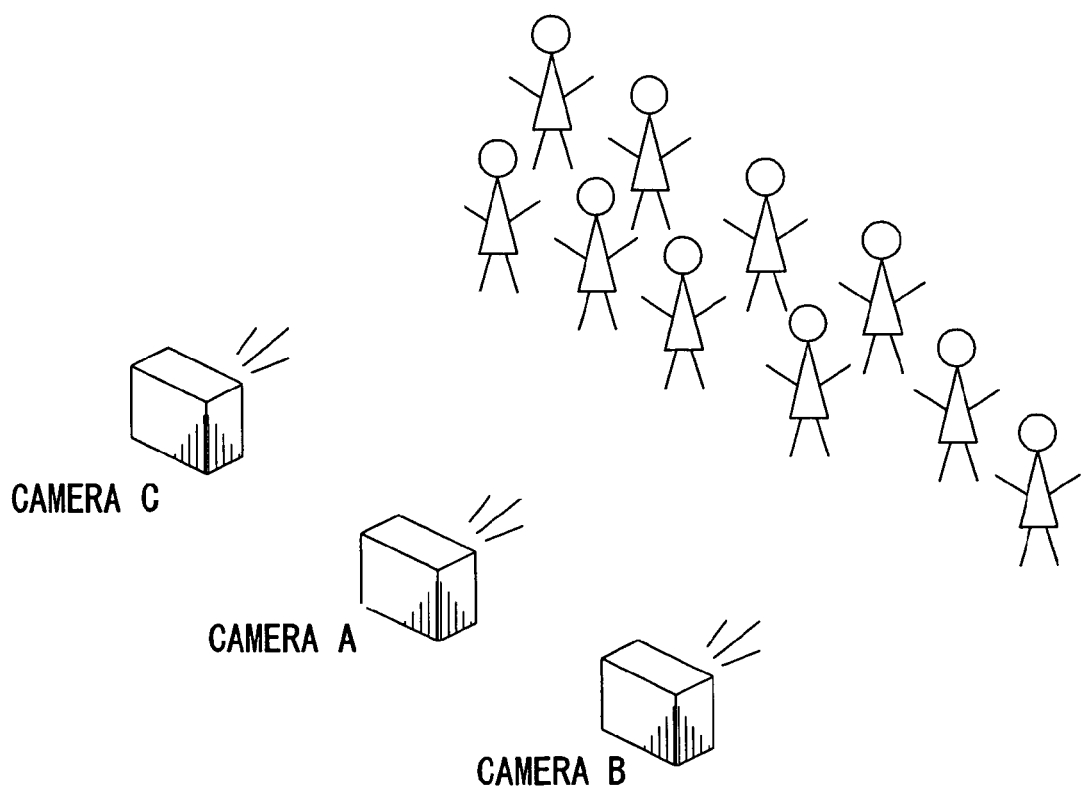
FIG. 54 is an example of a strobe flash type in a collaborating shot.
Figure 55:
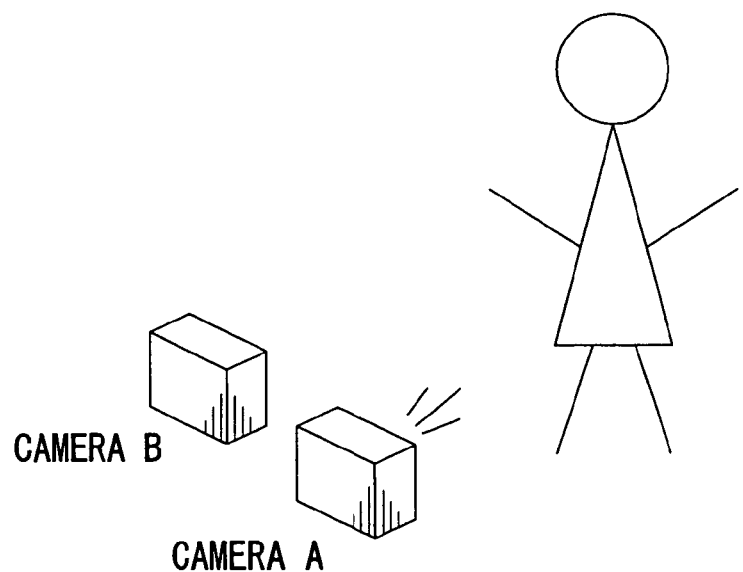
FIG. 55 is an example of a strobe flash type in a collaborating shot.

A display example for setting a strobe is shown in FIG. 53, an explanation about actual usage is shown in FIGS. 54 and 55. In FIG. 53, as a default, a first item "Normal flash" is set. The normal flash is that a flash is automatically fired by selected all cameras at a dim light like a case other than collaborating work. A following explanation refers to a strobe built in a camera, but an outside strobe may be used in the same way.

In this system, on top of that, a flash firing and an amount of a flash can be set per each salve camera via a master camera. A second item of FIG. 53 will be explained. As represented in FIG. 54, this setting item is used in a case where a wide angle picture in shooting a group subject is taken or a subject with depth is taken. In this case, other than a camera taking a main subject (camera A), cameras (cameras B and C) are arranged around the subject and the cameras arranged there are used only for illuminating the subject. Like this, in the even that a camera has a built-in strobe for use in collaborating shot, it is convenient that an extra strobe is not required for an additional flash firing. Cameras B and C take a picture firing a normal strobe flash, not firing a flash only for illumination and being temporarily stored into a memory card, a taken image may be erased by an instruction from a master camera. Or, the master camera may instruct in such a way that after a flash picture is taken, a camera work is finished at a time when cameras B and C store a taken image into buffer memories temporarily, not into memory cards. If the second item is selected in FIG. 53, a selection screen to pick up a camera that fires a flash is displayed on LCD monitor 109, a diagram of which is omitted.

A selection of a third item will be explained by referring to FIG. 55. On the contrary to the second item, this is a case where as shown in FIG. 55, a same subject is taken from an almost same position by several cameras. If all shooting cameras fire flashes, the subject might be overexposed owing to overdose of illumination. Thus, in a case of taking a picture with two cameras, for example, one of cameras is set not to fire a flash or an amount of a flash in each strobe of cameras is set to an appropriate amount somewhere from non-firing flash to a full amount of a flash. The third item of FIG. 53 is selected and then, a screen for setting the amount of a flash as shown in FIG. 56 is displayed. In this setting screen, the amount of a flash can be selected through choice of any of five increments between 0% and 100%, but a desired amount may be directly input or in an analogue way. A setting of this third item can be also used in a case where the master camera without a strobe takes an image using a strobe of a slave camera in the event that the master camera without a strobe takes a flash picture.

When a normal flash is selected, a flow proceeds to step S2704 and a camera selected as a shooting camera is instructed to stand by a strobe flash. Then, in step S2705, it is judged whether or not fully-depress switch 1163 is turned on. If switch 1163 is not turned on, a flow proceeds to step S2706 where it is judged whether or not halfway-depress switch 1162 is turned on. If switch 1162 is turned on, a flow gets back to step S2705 and waits for turning on of switch 1163. If switch 1162 is not turned on, a flow gets back to step S2701 and waits for turning on of switch 1162. In step S2705, when switch 1163 is turned on, a flow proceeds to step S2707 where the camera selected as the shooting camera is instructed to start a flash firing and a shooting. In this case, a strobe may be caused to flash based upon independent judgments of all the shooting cameras when a subject is dark.

In step S2703, when a camera is set to fire the flash only, a flow proceeds to step S2708 where it is checked whether or not a setting of firing the flash only is completed. If the setting is not completed, a flow waits for setting completion and when the setting is completed, a flow proceeds to step S2709 where a camera other than the camera set to fire the flash only is instructed not to fire a flash and in step S2710, the camera set to fire a flash is instructed to stand by the strobe flash firing. Then, a flow proceeds to step S2705 and waits for turning on of switch 1163 and in step S2707, the camera set to fire the flash is instructed to fire and also a camera set as a shooting camera is instructed to start a shooting.

In step S2703, when a change of the amount of a flash is set, it is checked whether or not each setting of the amount of a flash in cameras set as a shooting camera in step in S2710 is completed. If the setting is not completed, a flow waits for the setting and when the setting is completed, each shooting camera is informed of the set amount of a flash in step S2712. Then, in step S2713, the shooting camera is instructed to stand by a strobe flash firing and in step s2705, a flow waits for turning on of switch 1163.

—Multi Image Confirmation—

This collaborating work camera system has a function to let several images taken by same cameras or different cameras be multi-displayed and only a necessary image data of these images be stored. This function will be detailed later by referring to FIGS. 31 and 32.

An explanation about settings relevant to step S208 of FIG. 7 is finished. Getting back to step S205 where it is checked that switch 1162 is turned on, a flow proceeds to step S210 where it is checked whether or not a bracket is set. When the setting is complete, master camera A, in step S211, sends out a compensation condition at a bracket shot to each slave camera, but when the setting is not complete, a flow proceeds to step S212 of FIG. 8. In step S212, a shooting condition for AE, AF, WB and so is decided per each camera based upon the calculation result in the step S204

In step S213, it is judged whether or not a setting is to use a shutter speed and an aperture value decided by master camera A, not by a slave camera. When the setting is not to use, a flow proceeds to step S214 where the slave camera is instructed to send out to master camera A a shooting condition such as the shutter speed, the aperture value, a shooting distance and WB and a storage condition like a compression ratio and so of the slave camera determined based upon the calculation of the slave camera and these calculation results sent from the salve camera are displayed on LCD monitor 109 in step S216. When the shooting and storage conditions set by master camera A are used in step S213, master camera A sends out these shooting and storage conditions to the slave camera in step S215. As the setting in step S208 can be changed several times until switch 1163 is depressed, master camera A sends out latest information set by master camera A in step S215 and the latest information is displayed on LCD monitor 109 in step S216.

In step S217, a signal instructing to send to master camera A a shutter release permit signal indicating the shooting camera set in step S208 being capable of releasing a shutter is sent out to the shooting cameras. Also, this shutter release permit signal is created by master camera A itself, too. In step S218 where master camera A receives the shutter release permit signals from the set shooting cameras, a flow proceeds to step S219.

In this case, master camera A does not need to wait for shutter release permit signals from all the cameras. In step S218, when there is a shooting camera from which master camera A does not receive the shutter release permit signal among the set shooting cameras, a flow proceeds to step S220 and master camera A waits to receive the shutter release permit signal for a given period of time. If the wait is within the given period of time, a flow gets back to step S208 and repeats the process. After the given period of time elapses, in step S221, LCD monitor 119 displays that a shooting is impossible and in step S222 displays a camera model name incapable of shooting. To this camera incapable of shooting, a re-setting like a user sets again a shooting camera or the like is required, so a sequence of this collaborating shot with this camera is finished. However, a sequence of the collaborating shot as a whole is still continued in the shooting camera from which master camera A detects the shutter release permit signal.

In step S219, it is judged whether or not switch 1163 of master camera is switched on. When switch 1163 is not switched on, a flow proceeds to step S223 where it is judged whether or not switch 1162 is switched on and when switch 1162 remains depressed, a flow gets back to step S219 and waits for switching on of switch 1163 of master camera A. In step s219, when it is detected that switch 1163 is switched on, a flow proceeds to a sequence of a collaborating exposure of step S224. A detail of the collaborating exposure will be explained later. After the sequence of the collaborating exposure is finished, it is judged whether or not switch 1162 is turned on in step S225 and when switch 1162 is turned on, a flow get s back to step S219, but when switch 1162 is not turned on, this sequence of the collaborating shot is finished. On the contrary, when it is detected in step S223 that switch 1162 is turned off, a flow gets back to step S115 of FIG. 5 where a mode setting of the select dial is checked.

<<Collaborating Exposure Sequence>>

Figure 9:
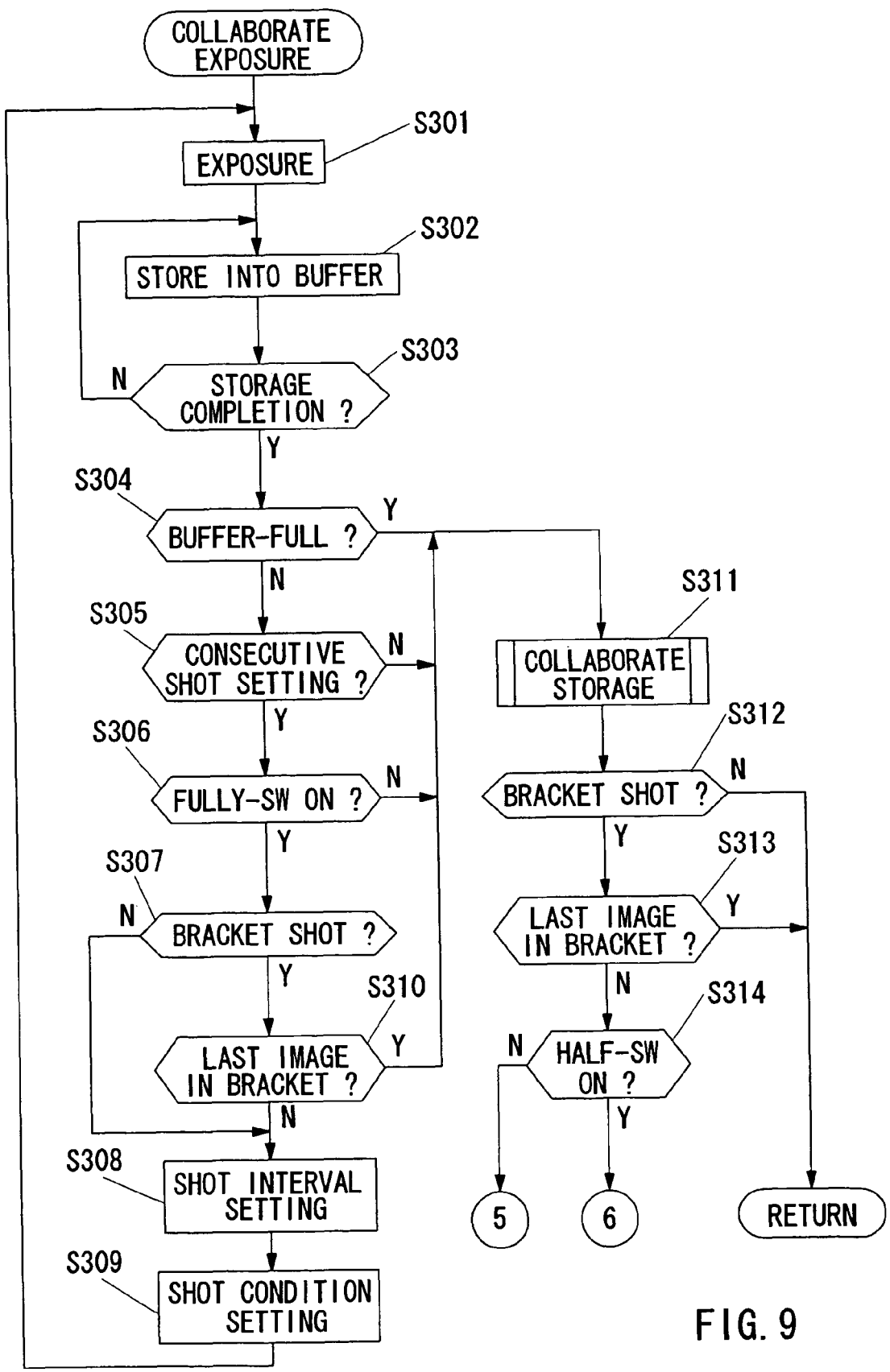
FIG. 9 is a flow chart illustrating a camera sequence in a collaborating exposure.

Referring to FIGS. 9 and 10, a sequence of a collaborating exposure will be explained. FIG. 9 indicates a collaborating exposure sequence to be executed by master camera A per se and FIG. 10 represents a collaborating exposure sequence of master camera A in order for slave camera B to collaborate an exposure. When master camera A is first set as a shooting camera, after it is checked in step S301 that master camera A is ready to release a shutter, a subject is exposed with a decided exposure condition on the basis of calculation results of AE, AF and AWB. After exposure completion, in step S302, a taken image data is stored into buffer memory 105. In step S303 where it is checked whether or not storage of the mage data into buffer memory 105 is completed, a flow gets back to step s302 if storing is midway and when storage is completed, a flow proceeds to step S304. In step s304, it is judged whether or not buffer memory 105 of master camera A gets full. If the buffer memory 105 is full, further shooting is impossible and then a flow proceeds to collaborating storage of step S311. A detail of this collaborating storage will be explained later. In step S304 where it is judged that buffer memory 105 does not get full, a flow proceeds to step S305 where it is judged which is set, a single shot or a consecutive shot.

When the single shot is set, a flow proceeds to collaborating storage of step S311. When the consecutive shot is set, a flow proceeds to step S306 where it is checked whether or not switch 1163 still remains on for the consecutive shot. When it is judged that switch 1163 is off, a flow proceeds to the collaborating storage of step S311. When it is judged that switch 1163 remains on, a flow proceeds to step s307 where it is checked whether or not a bracket is set and if the bracket is not set, a flow proceeds to step S308 where a shot interval at a consecutive shot is set. This shot interval will be explained later. When the shot interval is set, a flow proceeds to step S309 where a next shooting condition is set. However, this setting is a condition in the bracket mode and so, when the bracket mode is not set, the hitherto same shooting condition is set.

Then, getting back to step S301, the subject is taken again in accordance with the shot interval set in step S308. In the step S307, when the bracket shot is set, a flow proceeds to step S310 where it is checked whether or not a last shooting of the bracket shot is completed. If the last shooting does not come, a flow proceeds to step S308 where the shot interval is set and in step s309, a next bracket shot shooting condition is set. And then getting back to step s301, the subject is taken again in accordance with the shot interval of step S308 and the bracket shot setting condition of step S309. In step S310, when the last shooting is completed, a flow proceeds to step S311 where collaborating storage is performed.

Prior to an explanation about the collaborating storage of step S311 and on, a case where two cameras take the consecutive shot with the shot interval or the shot timing in the consecutive shot mode that have been described so far will be explained based upon FIG. 51. In this diagram, (a) indicates a period of time when fully-depress switch 1163 of the master camera remains on. Provided that a possible frame of the consecutive shot is four (4) frames per each camera and a consecutive shot speed is that a consecutive shot interval of master camera A is T1 (sec/frame) and T2 (sec/frame) is for slave camera B. (b) and (c) indicate each shot timing of master camera A and slave camera B respectively in the normal consecutive shot. In this case, fully-depress switch 1163 of master camera A is turned on, a shooting is started per each camera simultaneously and at a time when a CPU of each camera detects that four (4) frames are taken per each or that the buffer memory of each camera gets full, the consecutive shot is finished regardless of on or off of switch 1163. As seen from this diagram, a consecutive shot interval gets disrupted when looking at diagrams indicated by two cameras in order of an elapsed time of a shooting time.

(d) and (e) represent a shot timing of master camera A and slave camera B respectively in a continuous consecutive shot. In this case, turning on switch 1163 of master camera A, master camera A starts the consecutive shot (refer to (d)). At a time when master camera A takes four (4) consecutive shots and its buffer memory 105 gets full, receiving a consecutive shot start signal from master camera A, slave camera B keeps on the consecutive shot (refer to (e)). Accordingly, the continuous consecutive shot equivalent to a number of cameras at collaborating work becomes possible. A flow of the collaborating exposure of this case will be explained later since the flow is different from the work flow of FIG. 9 or 10 that has been so far explained. Even when the normal consecutive shot mode has been set, if an item "shoot with a single camera" is selected in a setting of a shot timing as explained in FIG. 45, the collaborating work is the continuous consecutive shot work as represented in these (d) and (e).

(f) and (g) represent a shot timing of master camera A and slave camera B in a high-speed consecutive shot. In this case, CPU 112 of master camera A sets to let a consecutive shot interval as a whole be narrower than shot intervals of shooting cameras and be at regular interval in accordance with information about a consecutive shot speed of camera information sent from slave camera B. Next, an example of two cameras will be explained. Let the consecutive shot interval have T (sec/frame) and when T1 and T2 has a relation of (T2)/2<T1<T2, a highest consecutive shot speed (or shot interval) of T=(T2/2(sec/frame) can be gained. In a case of FIG. 51, as the consecutive shot interval of slave camera B is long, the consecutive shot interval of master camera A alone seems to become a little bit longer, but as a whole a shot is taken at a half the consecutive shot interval of slave camera B. When the consecutive shot intervals of master camera A and slave camera B are equal, two times consecutive shot speed becomes possible in comparison to the consecutive shot speed of a single camera. More specifically, this two times consecutive shot speed can be gained by staggering the shot timing of slave camera B at a half the shot interval of master camera A. Like this way, in the event that three cameras take high-speed consecutive shot, three times consecutive shot speed becomes available.

Accordingly, the shot interval calculated and stored into storage unit 1128 is read out and is set in step S308, and in step S301, master camera A is instructed to start an exposure. This flow is the same as with slave camera B to be next explained in FIG. 10. Regarding a shot timing of slave camera B, although a shot start signal may be sent to slave camera B from master camera A, a shot start signal of a first shot and the shot interval may be sent to slave camera B from master camera A and thereafter a CPU of slave camera may control. The consecutive shot interval calculated as a whole system like this is displayed on LCD monitor 105. In a case of the second continuous consecutive shot, consecutive shot speed of one camera with higher consecutive shot speed may be controlled so as to mach with that of other camera with slow consecutive shot speed. According to this control, two times consecutive shot with a same consecutive shot speed becomes possible. When the types of master camera A and slave camera B are known to be identical from the beginning, a judgment of camera information about slave camera B is unnecessary.

As a result of works from step S301 to step S310 of FIG. 9, an image data equivalent to one shot exposure in a case of the single shot is stored into buffer memory 105 of master camera and when the consecutive shots are taken, the image data equivalent to one shot or plural exposures are stored into buffer memory 105 in accordance with a duration time of turning on of fully-depress switch 1163. In the collaborating storage of step S311 of FIG. 9, the image data is stored into a medium used for long storage or a memory card from buffer memory 105. After storage into the memory card is completely finished, a flow proceeds to step S312 where it is checked whether or not the bracket shot is set. In this step, a bracket setting is for the single shot. When it is judged in step S312 that the bracket is not set, the collaborating exposure sequence is finished. If it is judged in step S312 that the bracket is set, it is judged in step S313 whether or not the last shooting of the bracket shot is completed. If the last shooting is completed, the collaborating exposure sequence is finished, but when the last shooting is not completed, a flow proceeds to step S314 where it is checked whether or not half-depress switch 1162 is turned on. When it is judged that switch 1162 is not turned on, a flow gets back to step S115 of FIG. 5 and waits for a next operation and if switch 1162 remains turned on, a flow gets back to step S210 of FIG. 7 where a next bracket shooting condition is set to master camera A.

Referring to FIG. 10, the collaborating exposure sequence of master camera A against slave camera B set as a shooting camera will be explained. A check of each setting and a work flow instruction is performed by master camera A in this sequence flow, so there are much of overlap between flows of FIGS. 9 and 10. In step S331, the exposure start signal indicative of starting the exposure is first sent out to the slave camera set as the shooting camera from master camera A. According to this, slave camera B exposes for a given period of time and then after completion of the exposure, an image data is stored into a buffer memory of slave camera B. In this step S301, information about a file name and a folder name when slave camera B stores the image data into the buffer memory of slave camera B is simultaneously sent out to master camera A with the exposure start signal. Information about these names will be detailed in a step of collaborating storage to be explained later. As explained before, in a case where the continuous consecutive shot is set, since it is necessary to configure in such a way that after completion of master camera A's consecutive shot, the exposure start signal is sent out to slave camera B, a flow of this case will be explained later in FIG. 11.

Next in step S332, slave camera B is instructed to send a shutter release permit signal indicative of a next shutter being releasable after storage of an image signal created by the previous exposure into the buffer memory is completed and a buffer-full signal from slave camera B in a case of the buffer memory being full. In step S333, it is checked whether or not the shutter release permit signal is received by master camera A and when the signal is received, a flow proceeds to step S335, but when the signal is not received, a flow proceeds to step S334 where it is judged whether or not the buffer-full signal is received. When the buffer-full signal does not come, a flow gets back to step S333 and waits for the shutter release permit signal. In step S334 where the buffer-full signal is received, a flow proceeds to step S341 where slave camera B is instructed to collaborate storage. This collaborating storage will be detailed later. In step S333, master camera A receives the shutter release permit signal and a flow proceeds to step S335 where it is judged which mode is set, a single shot or a consecutive shot.

In a case of a single shot setting, a flow proceeds to collaborating storage of step S341. In a case of a consecutive shot setting, a flow proceeds to step S336 where it is judged whether or not fully-depress switch 1163 of master camera A remains turned on for the consecutive shot. When it is judged that switch 1163 is turned off, a flow proceeds to collaborating storage of step S341. When switch 1163 is judged to remain turned on, a flow proceeds to step S337 where it is judged whether or not a bracket shot is set and if the bracket shot is not set, a flow proceeds to step S338 where a shot interval is set. This shot interval is the same as in the step S308 of FIG. 9. When the shot interval is set, in step S339, a next bracket shooting condition is sent out to slave camera B. However, step S339 is a step where the next bracket shooting condition is set in the bracket shot mode, so the same shooting condition is sent out if the bracket shot mode is not set. A flow gets back to step S331 where slave camera B is instructed to expose a subject again in accordance with the shot interval set in step S338. When the bracket shot mode is set in step S337, a flow proceeds to step S340 where it is checked whether or not a last shooting of the bracket shot is completed. Unless the last shooting is completed, a flow proceeds to step S338 where the shot interval is set and step S339 where the next bracket shooting condition is sent out to slave camera B. A flow gets back to step S301 where in accordance with a start of a picture taking is instructed in accordance with the shot interval set in step S338 and the bracket shooting condition set in step S339. When the last shooting of the bracket shot is completed in step S340, a flow proceeds to step S341 where collaborating storage is instructed.

With works from step S331 through step S340 of FIG. 10, an image data equivalent to a single exposure in a case of the single shot is stored into a buffer memory of slave camera B set as a shooting camera and the image data equivalent to the single shot or several shots in accordance with a duration time of turning-on of switch 1163 in a case of a consecutive shot is stored into the buffer memory of the shooting slave camera B. In the collaborating storage of step S341 of FIG. 10, the image data is stored from the buffer memory into a memory card that is a medium for long storage. Storage into the memory card is completely finished and then a flow proceeds to step S342 where it is checked whether or not a bracket shot mode is set. This bracket shot mode is a single shot setting. In step S342, when it is judged that the bracket shot mode is not set, it is checked in step S343 whether or not a last shooting of the bracket shot is completed. When the last shooting is completed, a sequence of a collaborating exposure is finished, but when the last shooting is not finished, a flow proceeds to step S344 where it is checked whether or not half-depress switch 1162 of master camera A is turned on. If switch 1162 is not turned on, a flow gets back to step S115 of FIG. 5 and waits for a next operation and when it is judged that switch 1162 is judged to remain turned on, a flow gets back to step S210 of FIG. 7 where a next bracket shooting condition is sent out to slave camera B.

In the sequence of the collaborating exposure that has been explained so far, the sequence is that a press of fully-depress switch 1163 of master camera A triggers almost simultaneous exposures of master camera A and slave camera B. When other camera keeps on the consecutive shot after one of cameras finishes the consecutive shot, a work flow is different from this flow as explained before. A case where master camera A and slave camera B take continuously the consecutive shot will be explained based upon a sequence of FIG. 11. In step S351, it is checked whether or not switch 1163 is turned on and when switch 1163 is not turned on, this sequence is finished. When switch 1163 is turned on, in step S352, an exposure is first performed by master camera A and an image data is stored into buffer memory 105. At this time, although a flow does not indicate anything therein, in parallel with starting storage of the image data into buffer memory 105, the image data is processed for storage and the processed image data is stored into a memory card of master camera A, too. In step S353, it is checked whether or not buffer memory 105 gets full at a time when storage of the image data into buffer memory 105 is completed. When buffer memory 105 does not get full yet, a flow gets back to step S351 and the exposure and storage of the image data into buffer memory 105 are repeated as long as switch 1163 is turned on.

In step S353, when it is checked that buffer memory 105 gets full, a flow proceeds to step S354. When switch 1163 is not turned on, the sequence of the consecutive shot is finished and when switch 1163 remains turned on, a flow proceeds to step S355. In this step S355, an exposure start signal instructing to start the exposure and also a signal instructing to send out a buffer-full signal indicative of the buffer memory of the slave camera being full when the buffer memory of the slave camera gets full after the exposure and the storage of the image data into the buffer memory of the slave camera are completed are sent out to slave camera B. Even in step S355, information about the file name and the folder name in slave camera B storing an image data into a memory card of slave camera B are sent out to slave camera B simultaneously with the exposure start signal and the buffer-full signal. The information will be detailed in a step of collaborating storage to be explained later.

Figure 11:
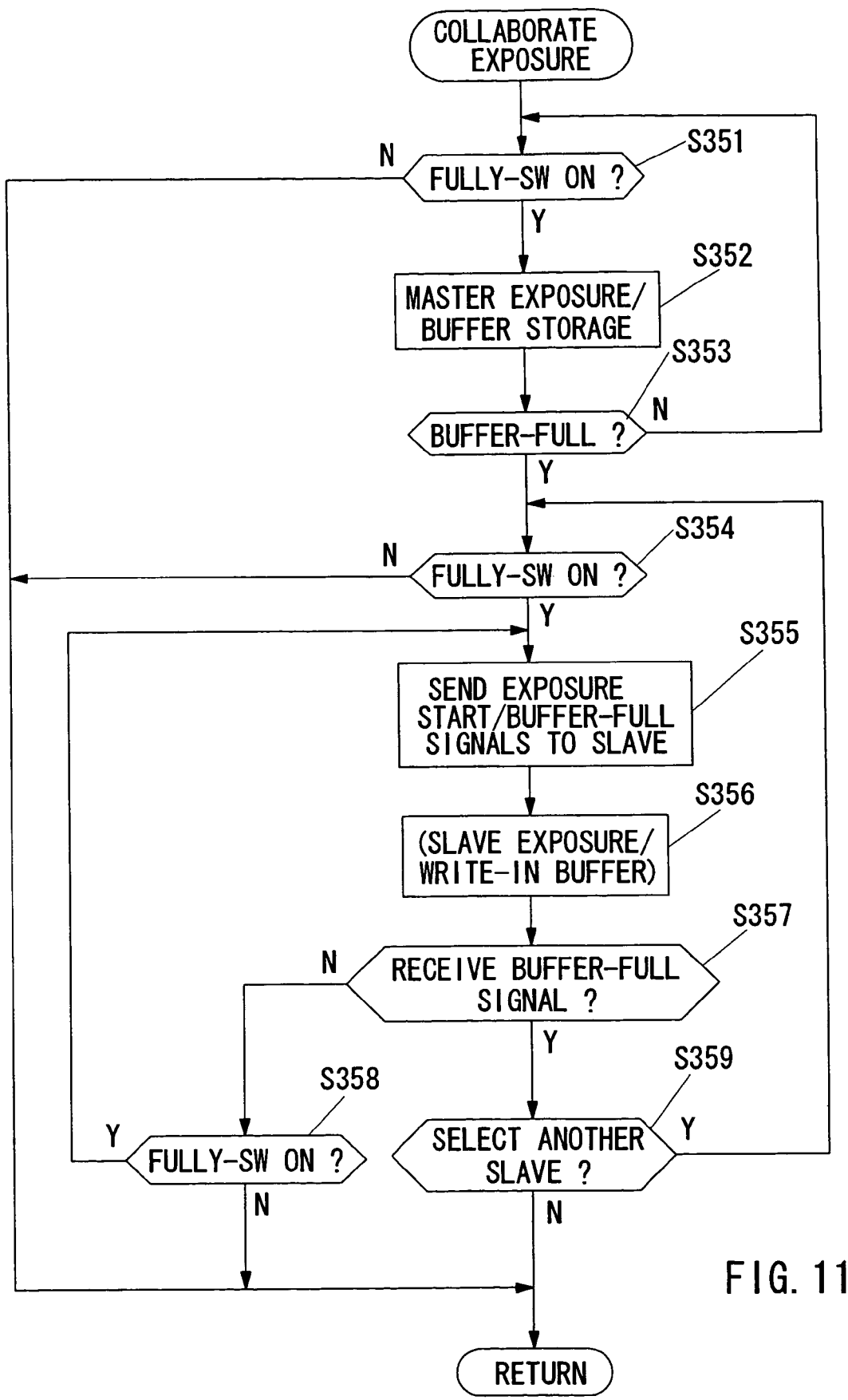
FIG. 11 is a flow chart illustrating a sequence of a collaborating exposure in a consecutive shot.

Step S356 indicates how salve camera B works and on the other hand, a flow of FIG. 11 shows how master camera A works although the flow of FIG. 11 is inherently not necessary. The reason is to show just for your reference purposes that slave camera B performs an exposure and stores an image data into a buffer memory in this step. In step S357, it is checked whether or not the buffer-full signal reaches master camera A from slave camera B. If the buffer-full signal does not come yet, a flow proceeds to step S358 where it is checked whether or not switch 1163 of master camera A remains turned on. When switch 1163 remains turned on, a flow gets back to step S355 and a continuous consecutive shot of slave camera B is continued. When it is checked in step S358 that switch 1163 does not remain turned on, the sequence of the collaborating exposure is finished. Like storage of master camera A, in step S356, in parallel with storing the taken image data into the buffer memory of slave camera B, the taken image data is stored into the memory card of slave camera B. When the buffer-full signal is received from slave camera B in step S357, a flow proceeds to step S328.

In step S328, it is checked whether or not other slave camera other than slave camera B is selected and when other slave camera is selected, a flow proceeds to step S354 and like the foregoing, a continuous consecutive shot is continued by this other slave camera. If other slave camera is not selected, this sequence is finished. Although things have been explained so far by limiting to a basic work of the consecutive shot, a case where the bracket shot mode is added to this basic work is thought to be the same with the explanations in FIGS. 9 and 10 and, so the explanation about the case will be omitted.

<<Collaborating Storage Sequence>>

Figure 12:
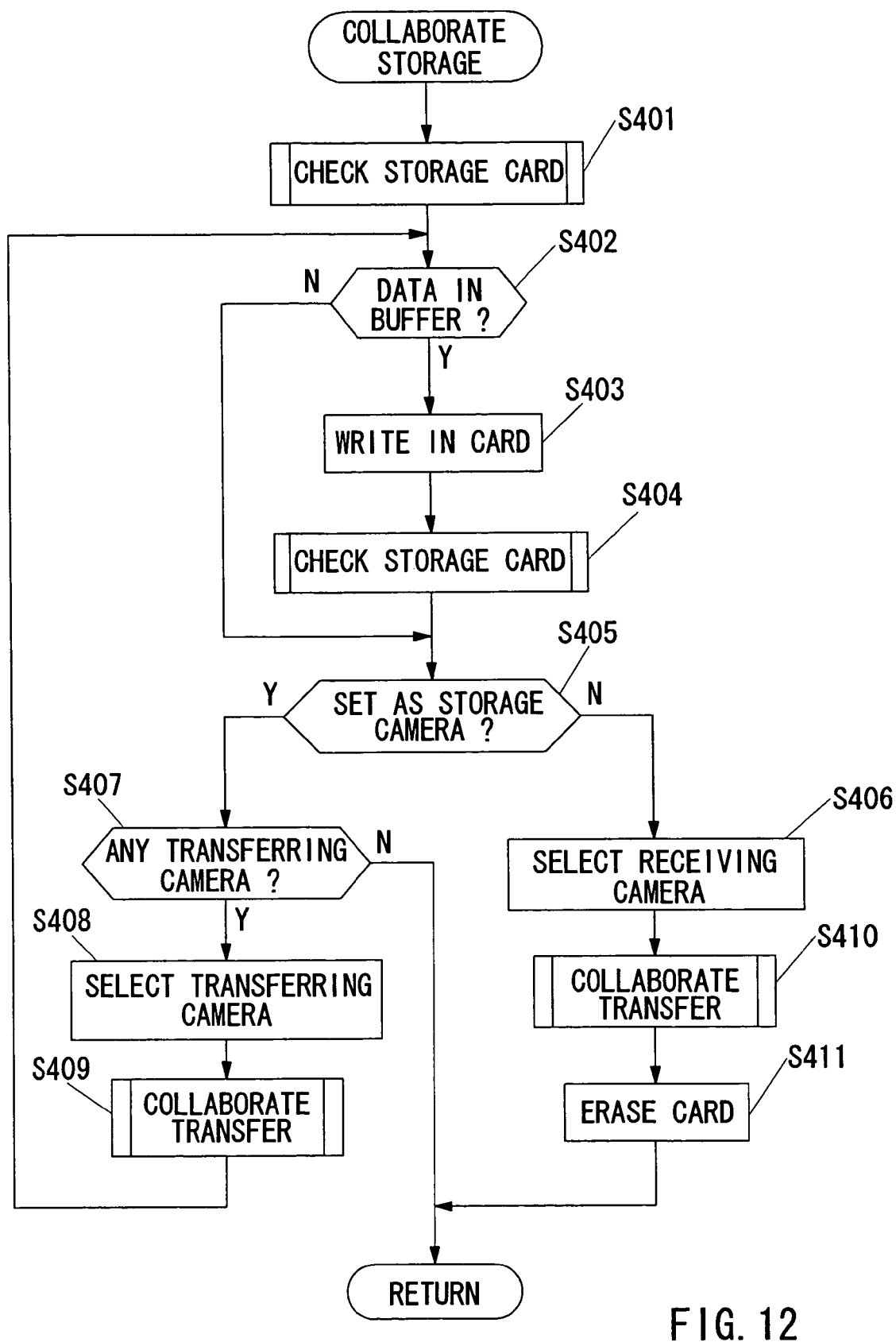
FIG. 12 is a flow chart illustrating a sequence of a collaborating storage.
Figure 13:
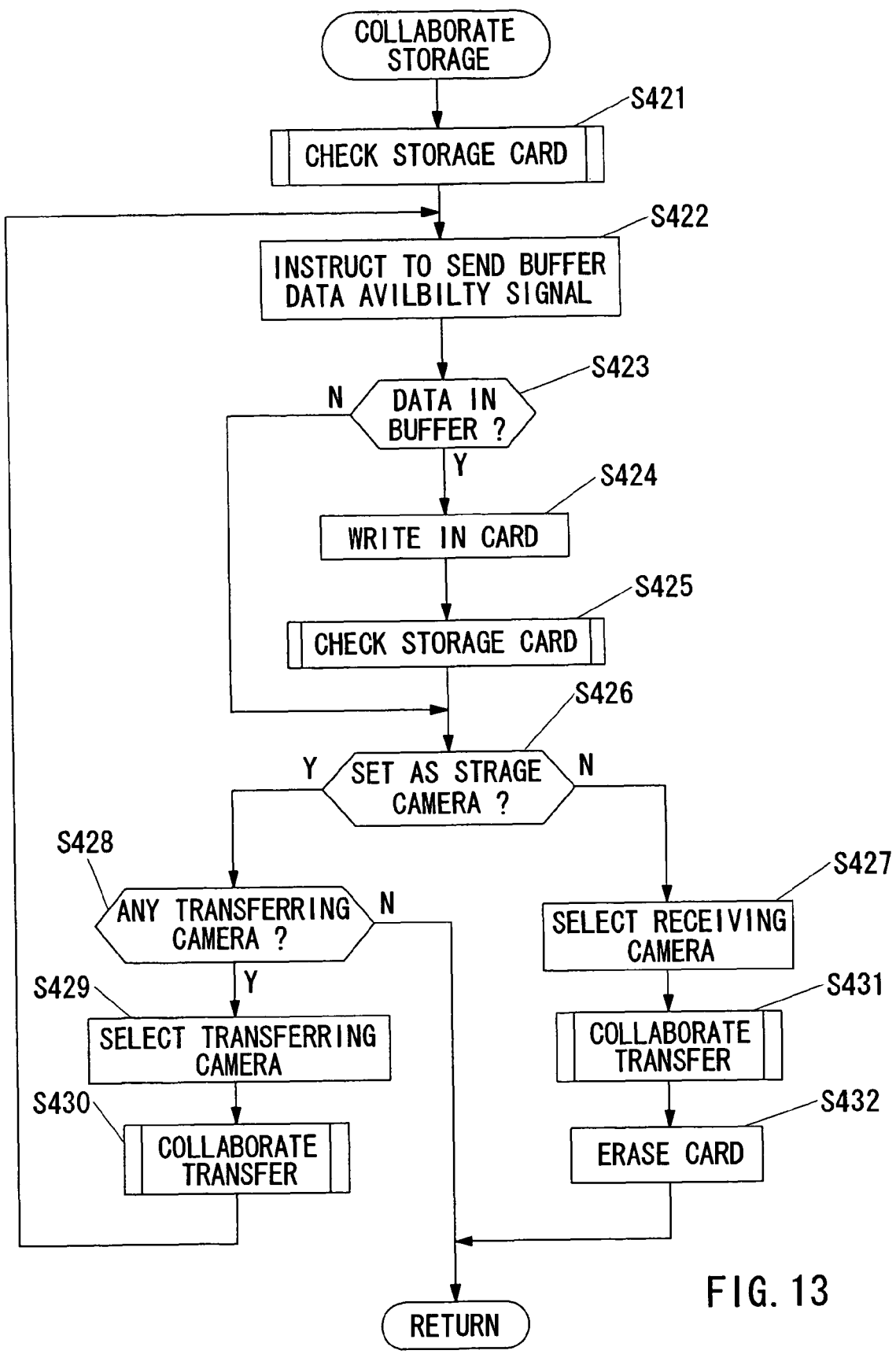
FIG. 13 is a flow chart illustrating a sequence of a collaborating storage.

Referring to FIGS. 11 and 12, a collaborating storage sequence will be explained. FIG. 12 represents a collaborating storage sequence of master camera A and FIG. 13 represents a collaborating storage sequence of slave camera B responding to an instruction of master camera A. An explanation will be started from FIG. 12. In step S401 of FIG. 12, a memory card of master camera A is checked like whether or not a memory card of master camera A is put inside master camera A or the card gets full. A detail of this check will be explained later. After check completion of the memory card, it is checked in step S402 whether or not an image data is stored into buffer memory 105 of master camera A. When the image data is stored, in step S403, the image data of buffer memory 105 is stored into a memory card. In order to check whether or not the post-stored memory card gets full, the storage card is checked again in step S404. After check completion of the memory card, a flow proceeds to step S405. When it is judged in step S402 that there is no image data in buffer memory 105, a flow directly proceeds to step S405. In step S405, it is checked whether or not master camera A is set as a storage camera and when master camera A is not set as the storage camera, a flow proceeds to step S406 and when master camera A is set as the storage camera, flow proceeds to step S407.

In step S407, it is checked whether or not there is a slave camera set to transfer an image data to master camera A. When there is no slave camera to transfer, this collaborating storage sequence is finished. When there is the slave camera to transfer, a transferring camera is selected in step S408 and in step S409, an image data is transferred from a slave camera and then a flow gets back to step S402. A detail of a collaborating transfer of step S409 will be explained later. When there are plural transferring slave cameras, this loop is repeated. When the master camera is not set as the storage camera in step S405, a receiving slave camera is selected in step S406 and in step S410, the image data stored into buffer memory 105 of master camera A is transferred to this slave camera. After completion of the transfer, in step S411, the post-transferred image data temporarily stored into the memory card of master camera A is erased and the collaborating storage sequence is finished.

In the collaborating storage sequence up to here, prior to a check of whether or not master camera A is set as the storage camera, storage is performed into a memory card of master camera A. This reason is as follows. If an image data is not stored into a memory card and is started to be transferred to a slave camera B after the image data is stored into buffer memory 105 of master camera A, this transfer might fail due to some reason. In this case, the image data temporarily stored into the memory card of master camera A is again transferred to the slave camera or the transfer is halted and the image data remains stored into the memory card of the master camera A intact, which can avoid an erasure of the important image data. In a case where a procedure from a shooting to completion of the transfer is quickly finished, writing into a memory card in step S403 may be omitted. Or, by synchronizing a start of writing into the memory card in step S403 with a start of transferring to the receiving slave camera in step S410, a time required from the shooting to completion of the transfer can be shortened. Further, in step S411, the post-transferred original image data is configured to be erased, but the erasure of the post-transferred original image data or leaving the post-transferred original image data stet as it is may be configured to be pre-selectable. To this end, it is preferable to display whether or not the image data is erased after completion of the transfer on LCD monitor 109.

Referring to FIG. 13, collaborating storage in slave camera B will be explained. In step S421, it is checked whether or not a memory card is inserted into slave camera B or the card gets full. A detail of this storage card check will be explained later in FIG. 30. After completion of the memory card check, in step S422, master camera A instructs slave camera B to send a buffer data storage availability signal indicative of an image data being stored into the buffer memory of slave camera B. Based upon this signal, in step S423, it is checked whether or not an image data is stored into the buffer memory of slave camera B. When the data is stored, in step S424, a signal instructing to store the image data stored into the buffer memory into a memory card is sent. In order to check whether or not the memory card storing the image data gets full, the storage memory card is checked again in step S425. After completion of the memory card check, a flow proceeds to step S426.

On the contrary, in step S423, when it is judged that there is no image data in the buffer memory, a flow directly proceeds to step S426. In step S426, it is checked whether or not slave camera B is set as a storage camera and when slave camera B is not set as the storage camera, a flow proceeds to step S427 and when slave camera B is not set as the storage camera, a flow proceeds to step S428. In step S428, it is judged whether or not any other camera is set to transfer to slave camera B an image data from other camera including master camera A. When there is no any other camera transferring an image data to slave camera B, this collaborating transfer sequence is finished. When there is a camera transferring the image data to slave camera B, in step S429, the transferring camera is selected and in step S430, an image data from this transferring camera is collaborated to be transferred and a flow gets back to step S422. When there are several transferring cameras, this loop is repeated.

In step S426, when slave camera B is not set as the storage camera, in step S427, a receiving camera is selected and in step S431, the image data stored into the buffer memory of slave camera B is transferred to this receiving camera including master camera A. In step S422, an erasure signal to erase the post-transferred image data stored into the memory card of slave camera B is sent out and this collaborating storage sequence is finished.

Figure 30:
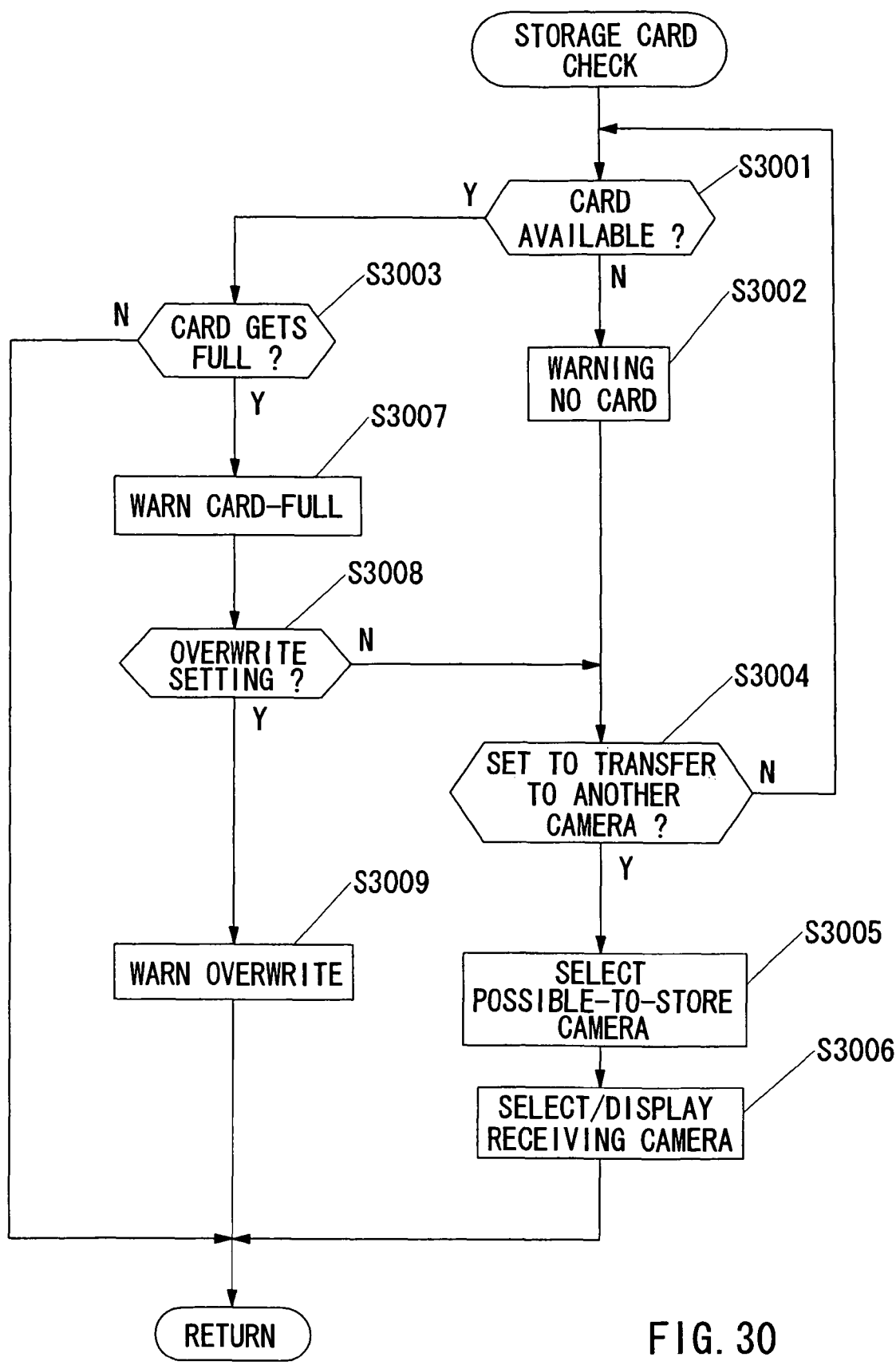
FIG. 30 is a flow chart illustrating a sequence of checking a storage card.
Figure 60:
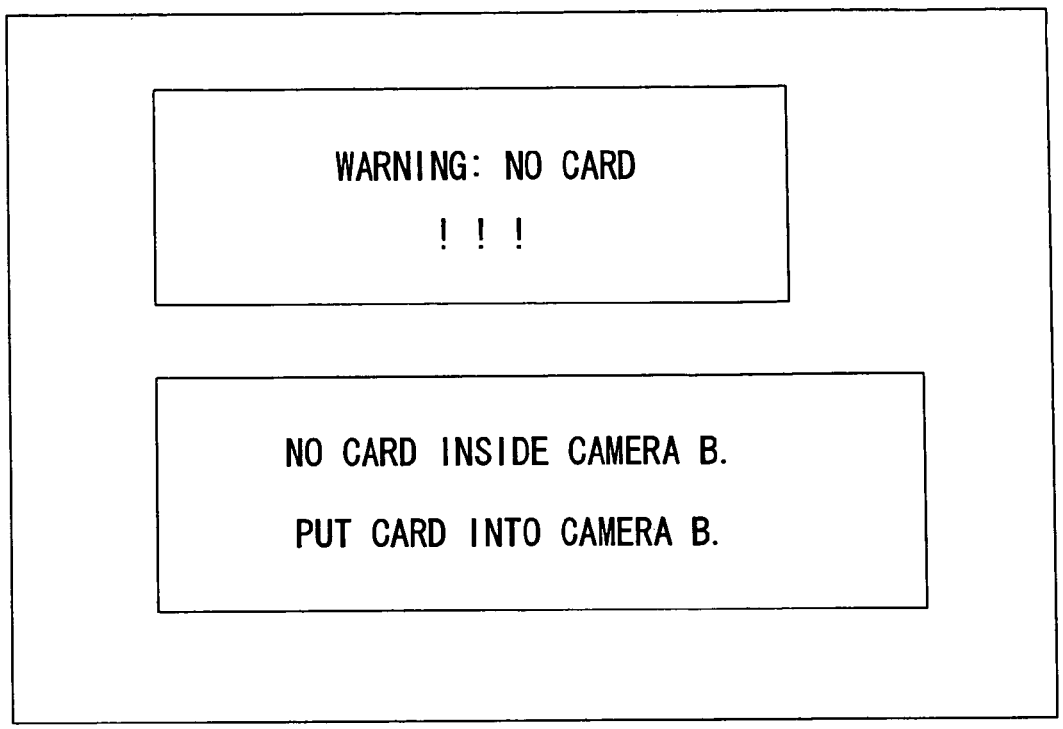
FIG. 60 is an example of a warning display when the card is not loaded.

A detail about the check of the storage card referred to in step S401 and so will be explained in accordance with FIG. 30. In step S3001 of FIG. 30, it is checked whether or not a memory card is inserted per each camera set as a storage camera of cameras at collaborating work. When slave camera B is set as the storage camera, master camera A instructs slave camera B to send a signal for checking memory card availability and master camera A checks availability of the memory card based upon the received signal. In this step S3001, when it is judged that there is a camera that the memory card is inserted into, a flow proceeds to step S3003, but when it is judged that there is no camera that the memory card is inserted into, in step S3002, a warning that no memory card is inserted and an camera name that no memory card is inserted into are displayed on LCD monitor 109. FIG. 60 represents a display screen example.

Figure 61:
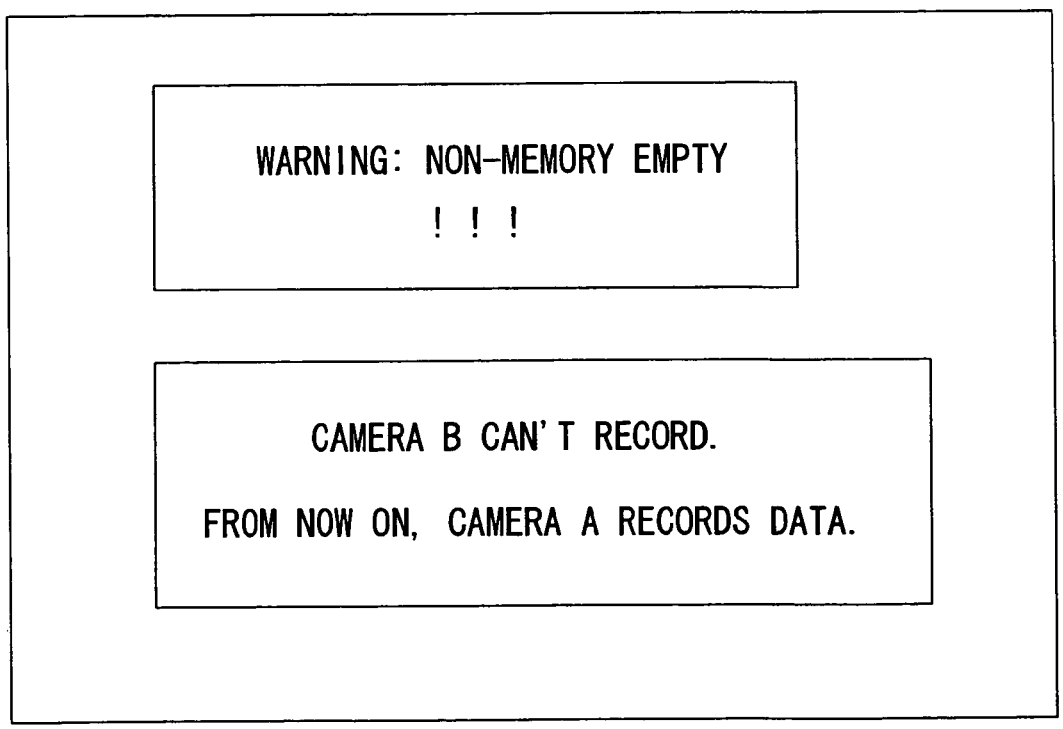
FIG. 61 is an example of a warning display when the card is not loaded or gets full.

In step S3004, it is checked whether or not a transfer to other storage camera is set. This is a case where the second item as represented in the display example of FIG. 36 is selected. If the transfer is not set, a flow gets back to step S3001 and waits for insertion of a memory card by a user. At this time, the displays of a no-card warning and a no-card camera name as shown in FIG. 60 carries on until a user inserts the memory card into a camera set as the storage camera or unless the storage camera setting is changed. In step S3004, when the transfer to other storage camera is set, a flow proceeds to step S3005 and a transferable storage camera as of this time is selected and in step S3006, the no-card warning and a receiving camera name in place of those in FIG. 60 are displayed on LCD monitor 109 of master camera A. FIG. 61 represents a display screen example of this case. This display screen example doubles as a display when a card gets full. After completion of the selection of the receiving camera and the display, a card check sequence is finished.

Figure 62:
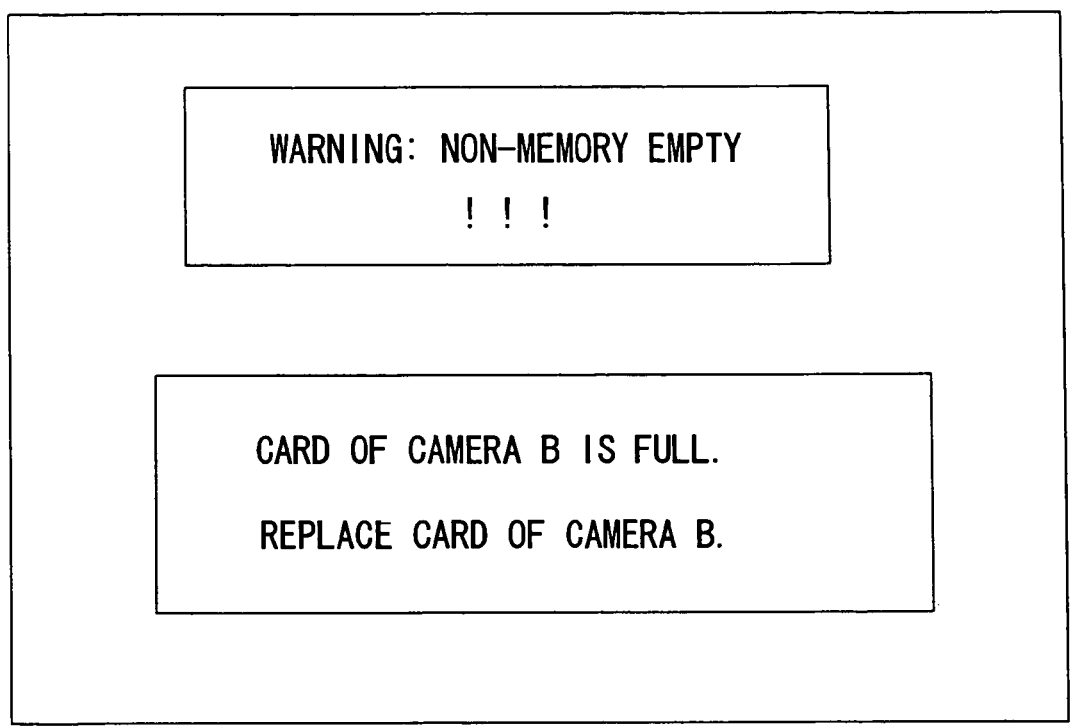
FIG. 62 is an example of a warning display when the card gets full.

In step S3001, when it is checked that the memory card is inserted into, in step S3003, it is checked whether or not the inserted memory card becomes a card-full that an image data cannot be stored any more. When checking the memory card of slave camera B set as the storage camera, master camera A sends to slave camera B a signal instructing to send a card-full check signal and judges whether or not the memory card gets full based upon the received card-full check signal. When the memory card does not get full, this sequence is finished, but when the memory card is full, a flow proceeds to step S3007 where a card-full warning and a card-full camera name that the memory card cannot store any more of image data are displayed on LCD monitor 109. This display example is represented in FIG. 62.

Figure 63:
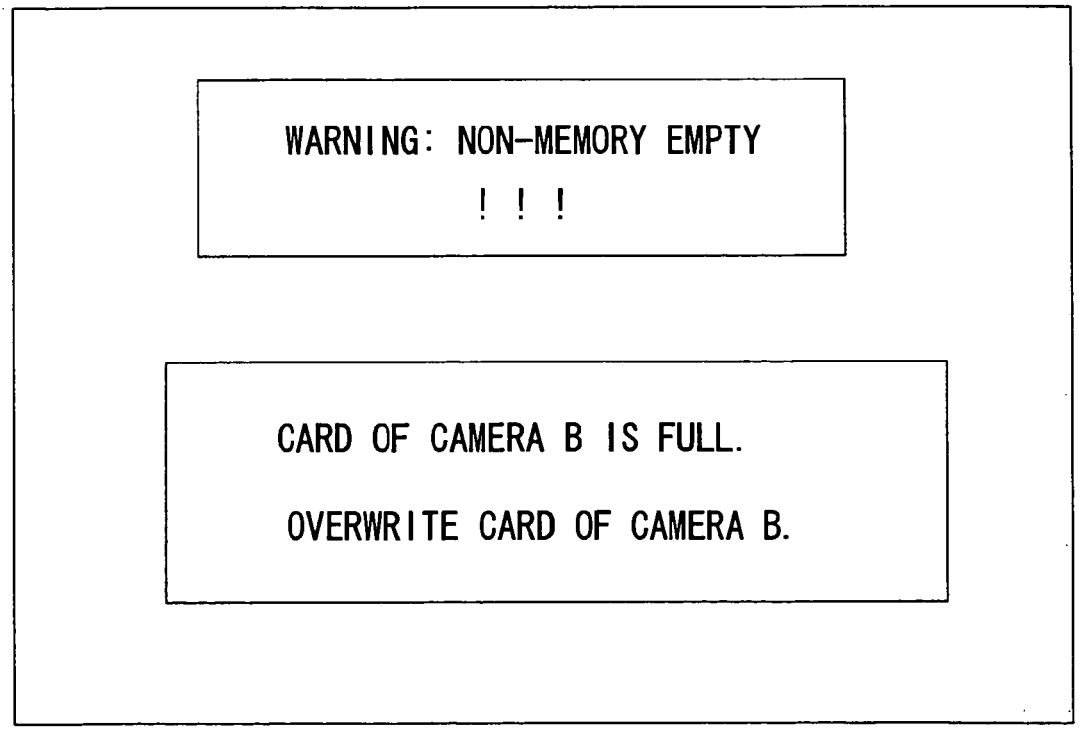
FIG. 63 is an example of a warning display when the card gets full.

In step S3008, it is checked whether or not overwrite at a time of the card getting full is set. To this end, it is checked whether or not the third item "overwrite" on the screen as shown in FIG. 36 is selected. When no-"overwrite" is set, a flow proceeds to step S3004 where it is checked whether or not a transfer to other camera is set. When "overwrite" is set, a flow proceeds to step S3009 where the card-full warning and the card-full camera name are displayed on LCD monitor 109 of the master camera. FIG. 63 represents a display screen example. After completion of this display, a card check sequence is finished. In this sequence, when the various warnings are displayed, a sound warning by buzzer 124 goes off simultaneously at the start of the warning.

Of the steps of collaborating storage that have been explained so far, a management method for managing a file name or a folder name of a data at a time of writing the data into the memory card of master camera A in step S403 of FIG. 12 or writing the data into the memory card of slave camera B in accordance with writing instruction from master camera A in step S424 of FIG. 13 will be explained. When cameras are at collaborating work, there is a case where image data of a subject in common taken by several cameras are stored or the image data is stored into other digital camera by transferring the image data among cameras. At this moment, it is necessary to store an image data in such a state that an editing of the image file after shot or transferred can be performed as simple as possible. Namely, a storage configuration that enables to differentiate storage by a single camera from storage through collaborating work of several cameras is required. To realize this object herein, camera information about several cameras that shoot or transfer in a collaborating work mode are stored by being linked to the taken image data.

Figure 64:
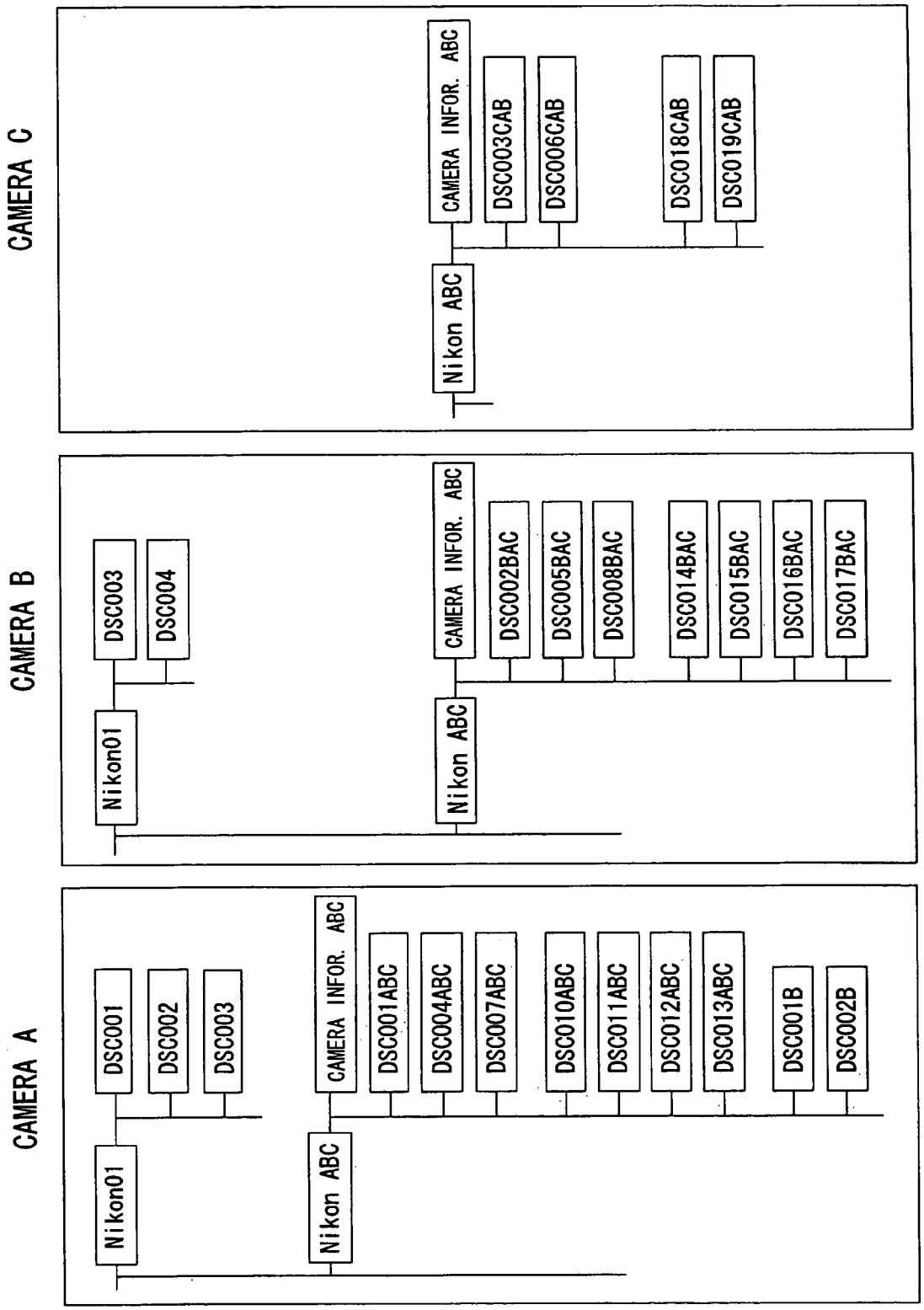
FIG. 64 is a diagram explaining an inner structure of a file in a collaborating storage.

Referring to FIGS. 64 and 65, a file name, a folder name and camera information in storing an image data in a collaborating work mode will be explained. As already explained simply in step S114 of FIG. 5, CPU 112 of master camera A creates file name information and folder name information in the collaborating work mode and integrated camera information integrating each camera information about cameras at collaborating work based upon camera information about each camera. Master camera A stores an image data into its memory card based upon the information. When master camera A gives slave camera B a shot instruction or a transfer instruction, the file name, the folder name and the integrated camera information based upon the information is simultaneously transferred to slave camera B. Or, slave camera B may be configured to create a file name and a folder name in storage by slave camera B based upon file name information and folder name information sent from master camera A.

FIG. 64 represents the file name and the folder name in storing into the memory card of each camera based upon file name information and folder name information about each camera. The diagram shows a case where camera A, camera B and camera C are at collaborating work. When camera A and camera B are the identical type and independently shoot and store, a default folder name or Nikon 01 is created in each camera and a file name like DSC001, DSC002, DSC003 and so on in order of taken shots is allocated in the folder. In FIG. 64, a folder name "Nikon ABC" is the folder name that is used at collaborating work and represents that three units of cameras A, B and C are at collaborating work. In step S116, a folder name like this folder name has been transferred to each slave camera in advance and a file at collaborating work is stored within this transferred folder name with file name information. Whenever a shot instruction or a transfer instruction is given to a slave camera, a file may be sent out.

A file of camera information ABC out of files within folder Nikon ABC of camera A is a file that integrates camera information about each slave camera and camera information about the master camera received in step S110 of FIG. 4 stores integrated information. A data of camera information ABC is transferred to camera A, camera B and camera C respectively in step S114 of FIG. 5 and is stored within folder Nikon ABC created by each camera. As explained in step S104 of FIG. 4, different information such as various shooting conditions and a remaining non-shot-taken frame number each time a single shot is taken is included in camera information sent from each camera. Therefore, information like a maker name, a camera type, a buttery type and the like that are not subject to change during the collaborating work is integrated with regard to all collaborating cameras and stored as integrated camera information.

File DSC001ABC and on within folder Nikon ABC of camera A is a file of an image data actually taken by camera A. Reference ABC denoting a shooting data in a collaborating work with three cameras A, B and C is allocated behind a shot number 001. But, in order to show that this image data file is taken by camera A, reference A comes first behind the shot number. References B and C are not in fixed order. A next file name is DSC 004ABC. This reference numeral 4 indicates that prior to this shot taken by camera A, a slave camera took two shots. Like this way, naming of a file is decided by setting to let file name information be numbered in order of a shot in step S112 of FIG. 5 and also each slave camera can grasp the whole shot order by sending out to each slave camera information about the shot order simultaneously when a master camera sends out to each slave camera the exposure start signal. Accordingly, an image data of which a file name is DSC 002BAC is first stored in camera B. In step S112, it may be set so as to number the shot in order per each camera. Subsequent file names DSC 007ABC, DSC 007ABC of camera B and DSC 003CAB and so on are the same as in the foregoing.

Files from DSC 010ABC to DSC 0013ABC are the ones that are stored when taking a continuous consecutive shot as explained in FIG. 11. But, it is provided that possible consecutive shot numbers of both of camera A and camera B are four (4) shots. According to this diagram, firstly, the master camera takes a consecutive shot and after the buffer memory of the master camera gets full, the consecutive shot is succeeded by camera B. The buffer memory of camera B gets full too, and then two consecutive shots are taken by camera C. Files DSC 001B and DSC 002B in camera A are the files that were onetime stored independently into camera B and are transferred to camera A and stored therein. In this case, these files are differentiated from originally existing file DSC 001 by adding reference B to an end of the file name so as to specify the transferring camera.

Further, a detail about an image file that has been explained so far will be explained. For example, image file DSC 002BAC of camera B as shown in FIG. 64 is arranged like a data array as shown in FIG. 65. More specifically, an image data of a single shot is stored as a same file with linkage of an image data area storing the taken image data and an area storing various data in taking a shot. A file name that integrates camera information about each camera at collaborating work into single information and stores this information and information that identifies works of cameras at collaborating work are included in these various kinds of data. Accordingly, names like a master camera, a slave camera, a shooting camera and so in storing a file can be identified. Being omitted in FIG. 65, common various shooting conditions like a shooting Y/M/D, a shutter speed, an aperture value and the like are stored into this area, too.

In collaborating storage so far, a case where all taken image data are stored into any of the cameras set as the shooting camera has been explained. Then, a case where an image data selected from the taken image data is only stored will be explained. Even in collaborating shot, especially in a case of the bracket shot, lots of similar image data are stored into the memory card. No matter how lots of the image data are stored by linking to each other between the images or cameras with the file name or folder name, it will become quite burdensome to check each image data afterward. Pre-storage of only a pre-selected necessary image data into a memory card at a time of taking a shot enables this check procedure to get smooth. And further, when multi exposure is performed, pre-storage of suitable image data only pre-selected from the image data taken by the bracket shot per each camera as explained before permits to reduce consumption of the memory card and shorten a time to check.

Figure 31:
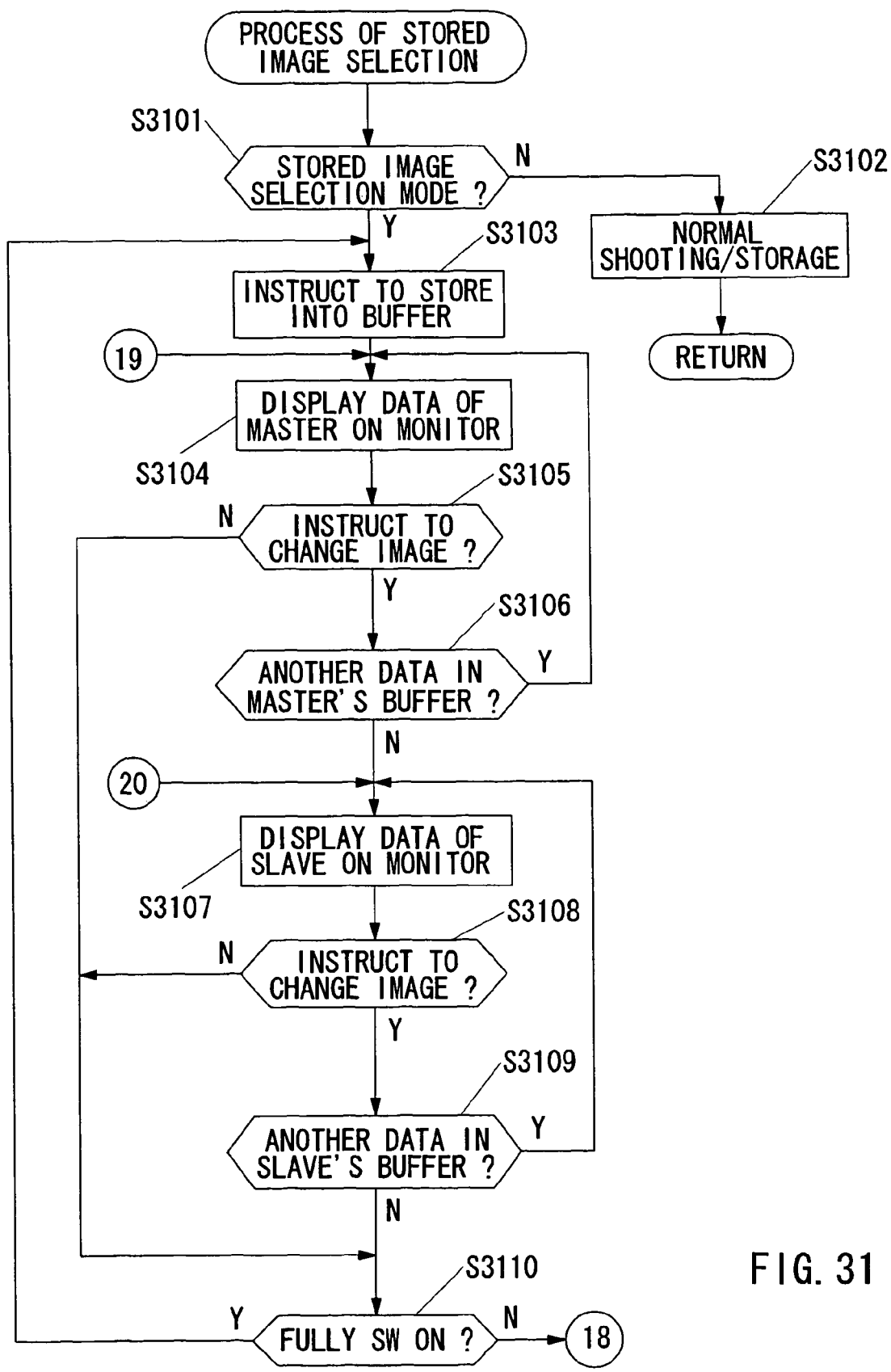
FIG. 31 is a flow chart illustrating a sequence of selecting a storage screen.
Figure 32:
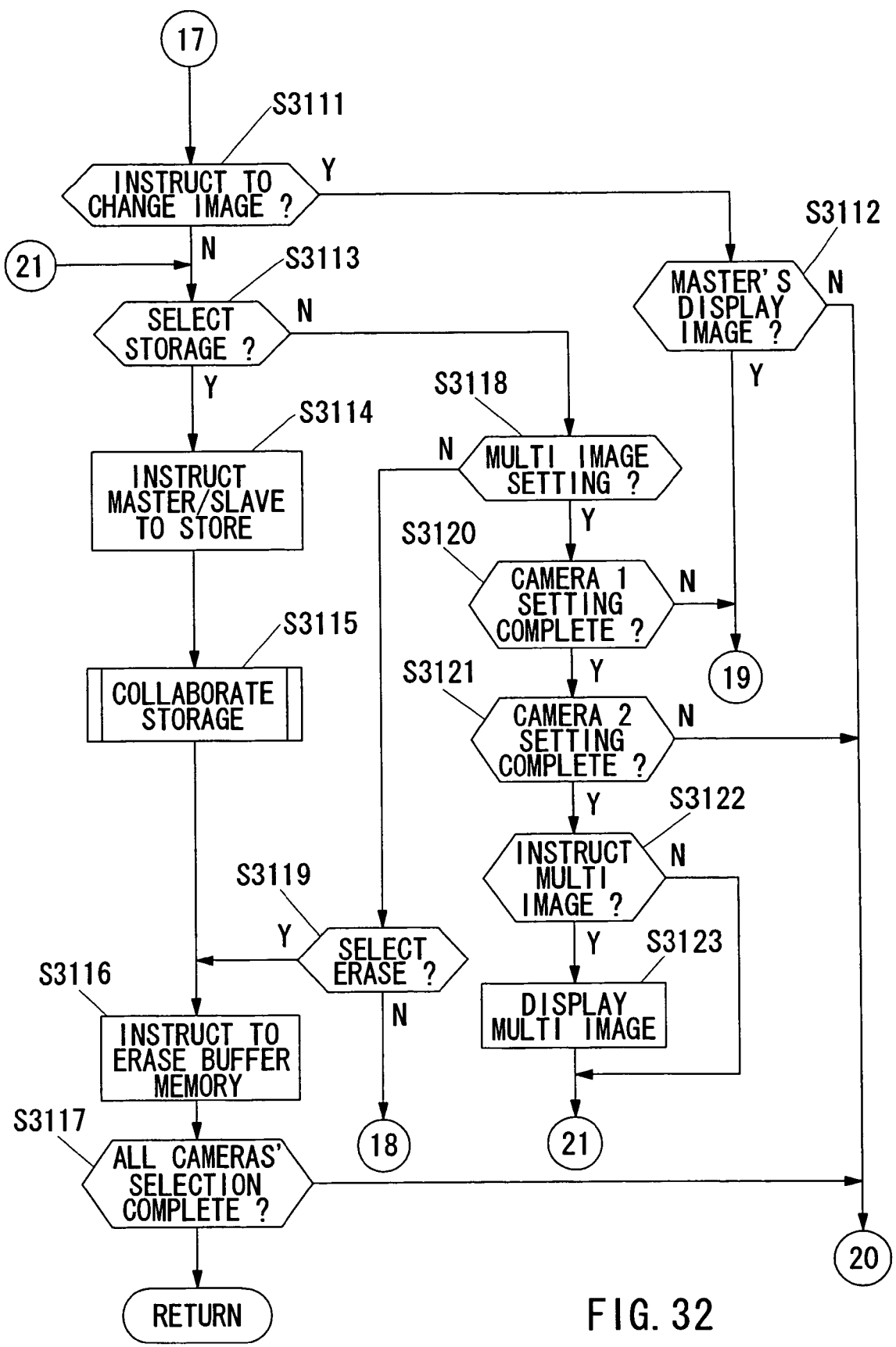
FIG. 32 is a flow chart illustrating a sequence of selecting a storage screen.

Referring to flows of FIGS. 31 and 32 and display screen examples of FIGS. 66 and 67, a mode for selecting a storage screen will be explained. This mode is set in steps S112 and 113 of FIG. 5. The mode may be set as necessary during a collaborating shot mode. When it comes to a concrete setting, just like setting other item in step S112 of FIG. 5, an item of "select storage screen" is selected from a menu displayed on LCD monitor 109 via setting button 1164 (not shown). After this selection, a collaborating shot is started in step S116 of FIG. 5. When fully-depress switch 1163 is depressed, it is checked in step S3101 whether or not this storage screen selection mode is selected. If not selected, a flow proceeds to step S3102 and then a taken image data is stored into a memory card corresponding to a normal collaborating storage.

When the storage screen selection mode is selected, a flow proceeds to step S3103. A taken image data is stored into a buffer memory in response to On of switch 1163, not into a memory card. A slave camera is instructed to store an image data taken by the slave camera into the buffer memory only. But, as described later, all taken image data are temporarily stored into the memory card and then the rest except for necessary image data may be erased. After storage into the buffer memory is complete, a flow proceeds to step S3104 where one frame of an image data taken by master camera A and stored into buffer memory 105 is first reproduced on LCD monitor 109 of master camera A. FIG. 66 represents a reproduced image and a menu for a process selection.

A reproduced image data, a camera name reproducing this image data, a shot frame number and a four-itemized selection menu like "Display next screen", "Check multi image", "Store selected screen" and "Erase all image data stored into a buffer memory" are displayed simultaneously and then a storage screen is selected by selecting any of these items. In step S3105, it is first checked whether or not "Display next screen" is selected out of the four items. When not selected, a flow proceeds to step S3110.

When it is judged that the item "Display next screen" is selected and a change of a screen is instructed, a flow proceeds to step S3106 where it is checked whether or not other image data is stored into buffer memory 105. When the other image data is stored into buffer memory 105, a flow gets back to step S3104 where the other image data stored into buffer memory 105 is displayed on LCD monitor 109. When a display of an image data stored into the buffer memory of master camera A is complete as usual, a flow proceeds to step S3107 where an image stored into a buffer memory of slave camera B is displayed on LCD monitor 109. In step S3108, it is judged whether or not a reproduced image from the buffer memory of slave camera B is changed in the same way as in step S3105.

When the item "Display next screen" is selected and a change of a screen is instructed, a flow proceeds to step S3109 where it is checked whether or not other image data is stored into a buffer memory of slave camera B. When not selected in this step, a flow proceeds to step S3110. When the item "Display next screen" is selected and a change of a screen is instructed, a flow gets back to step S3107 where other image data is displayed on LCD monitor 105 of master camera A. When a display of an image data stored into buffer memory of slave camera B is complete as usual, a flow proceeds to step S3110 where it is checked whether or not fully-depress switch 1163 is turned on.

When switch 1163 is turned on, a flow gets back to step S3103 where a taken image data is stored into buffer memory 105 of master camera A and slave camera B is instructed to store an image data taken by slave camera B into a buffer memory of slave camera B. Accordingly, repeatedly pressing of switch 1163 enables a plurality of image data to be stored into a buffer memory of each camera until each buffer memory of cameras gets full. Even in this case, storage into a memory card of each camera may be performed.

Figure 66:
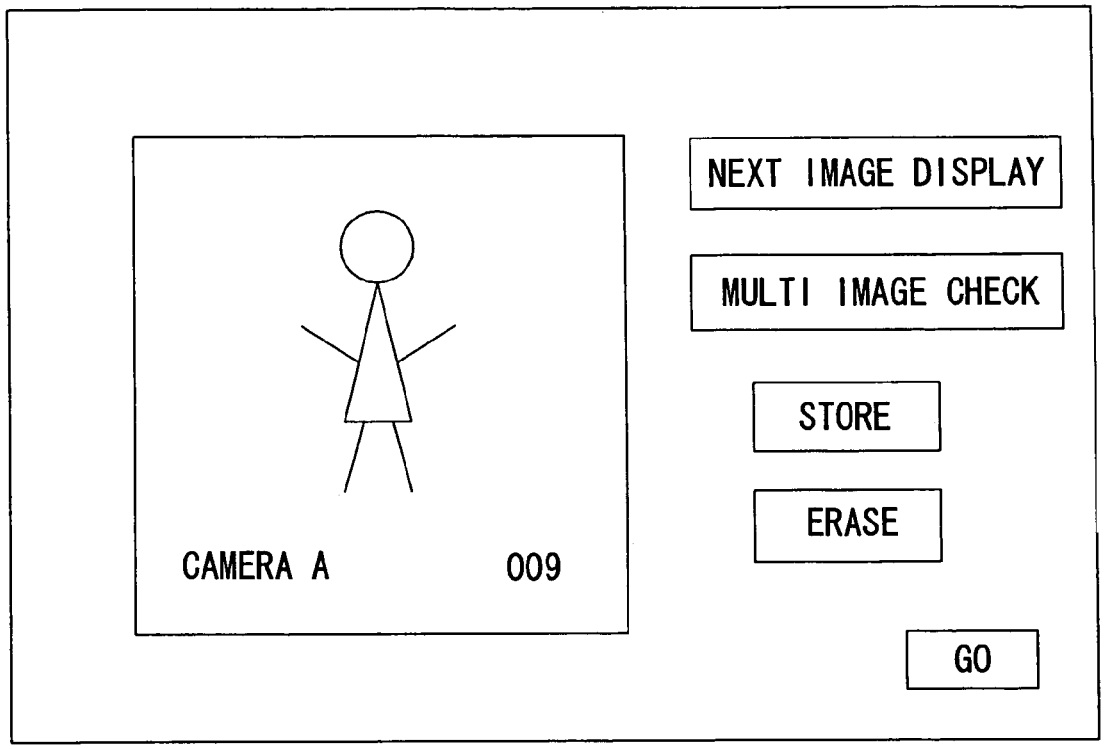
FIG. 66 is an example of a menu display for selecting a storage screen.

In step S3110, when it is judged that switch 1163 is not turned on, it is checked again in step S3111 whether or not an item for changing a screen is selected from a selection menu of FIG. 66. When a change of a screen is instructed, a flow proceeds to step S3112. In this step S3112, it is checked whether or not displayed going screen is an image from master camera A and when a displayed image is from camera A, a flow gets back to step S3104 and when an image from slave camera B is displayed, a flow gets back to step S3107 where an image of slave camera B is displayed. When a change of a screen is not instructed in step S3111, a flow proceeds to step S3113. In step S3113, it is checked whether or not an item "Instruct to store" against an image as shown in FIG. 66 is selected. When an item "Instruct to store" is not selected, a flow proceeds to step S3118. When "Instruct to store" is selected, a flow proceeds to step S3114 where master camera A or slave camera B is instructed to store a selected image data from image data stored into each buffer memory and collaborates to store in step S3115.

After a collaborating storage is complete, in step S3116, an image data stored into buffer memory 105 of master camera A or an image data stored into a buffer memory of slave camera B is instructed to be erased and a flow proceeds to step S3117. An erasure instruction herein is identical to a permit-to-overwrite-of a new image data-instruction to a buffer memory. And as explained in step S3103, if all taken image data are temporarily stored into a memory card, an erasure of the rest of other image data except for a selected image data is instructed. In step S3117, it is checked whether or not storage of selected image data about all cameras is complete. If a selection and storage are not complete, a flow gets back to step S3107 where a taken image data of slave camera B is displayed and the same operation is repeated. When selections of all cameras are complete, this sequence is finished.

When a storage is not instructed in step S3113, a flow proceeds to step S3118 where an item "Check multi image" and if selected, a flow proceeds to step S3120, but when not selected, a flow proceeds to step S3119. In step S3119, it is checked whether or not an item "Erase" as shown in FIG. 66 is selected. When an item "Erase" is not selected, a flow gets back to step S3111 and waits for an instruction to change a display screen. When it is judged that an "Erase" is selected, a flow proceeds to step S3116 and an erasure of image data stored into a buffer memory of each camera is instructed.

When an item "Check multi image" is selected in step S3118, a flow proceeds to step S3120. From then on, as shown at an upper side of FIG. 67, LCD monitor of master camera A displays reproduced image data stored into master camera A and slave camera B respectively on a single screen at a time (referred to as multi image display). In FIG. 67, one frame of reproduced image data stored into buffer memory 105 of master camera A is displayed on a screen of camera 1 at a left side. At this moment, a screen of camera 2 at a right side does not appear yet. When a selection of a screen of camera 1 is not complete, an item "Display next screen" is selected and a flow gets back to step S3104 of FIG. 31 where a next screen is displayed on a screen of camera 1. From then on, a reproduced image is reproduced with multi image display.

After a setting of camera 1 is complete, an item "Select camera" as shown at an upper side of FIG. 67 is selected and in step S3121, a screen of camera 2 is set likewise. When a setting is not complete, a flow gets back to step S3107 of FIG. 31. After a screen setting of camera 2 of FIG. 67 is complete, it is judged in step S3122 whether or not a multiplied-images screen of cameras 1 and 2 is checked. When an item "Check multi image" is selected from a selection menu on a screen at an upper side of FIG. 67, a multi image screen as shown at a lower side of FIG. 67 in step S3123 is displayed on LCD monitor 109 of master camera A. After this display, a flow gets back to step S3113 where it is checked whether or not each display screen is stored into a memory card of each camera or an image data to be stored is re-selected.

When an item "Store" is selected in FIG. 66, a flow proceeds to step S3114 where master camera A and slave camera B are instructed respectively to store a selected image data. When an item "Reset" is selected, a flow proceeds from step S3113 to step S3118. When "Multi image" is not instructed in step S3122, a flow directly gets back to step S3113. This invention lets only an original image data suitable for a multi image be stored into a memory card respectively, but a multi image that results from multiplied images may be stored simultaneously.

<<Collaborate Reproduction Sequence>>

Referring to FIGS. 14 to 17, a collaborating reproduction sequence in step S117 of FIG. 5 will be explained. When select dial 202 is set to a collaborating reproduction, a master camera reproduces a last taken image in step S501 of FIG. 14. In step S502, slave camera B is instructed to transfer shot information about a shot day/time and the like corresponding to each frame number of all image data stored into slave camera B while the last taken image is being reproduced. In next step S503, it is checked whether or not a thumbnail reproduction is set via setting button 1164 and if not be set, a flow proceeds to step S520 of FIG. 16 where a single screen display is performed in response to U/D button 1165. When it is checked in step S503 that a thumbnail reproduction is set, a flow proceeds to step S504 where it is checked whether or not a thumbnail image of slave camera B is first already received by master camera A. When not received, a flow proceeds to step S505 where slave camera B is instructed to transfer a thumbnail image and salve camera B transfers a thumbnail image. A detail of this transfer sequence will be explained later.

Herein, provided that a thumbnail image of each image data has been created in advance and stored with each image file, this created thumbnail image is transferred. Accordingly, when a receipt of a thumbnail image of a slave camera is complete, it is next checked in step S506 of FIG. 15 which reproduction display mode a reproduction screen is set to, a single reproduction image by a single camera or a multi reproduction image by plural cameras.

When it is judged in step S506 that a multi reproduction image is set, a flow proceeds to step S507 where thumbnail images of master camera A and slave camera B are displayed on a single screen simultaneously as a multi image display. And then in step S508, it is checked whether or not an individual image out of thumbnail images on display is selected. When an individual image is not selected, a flow proceeds to step S509. When a selection of a next thumbnail image is set via an operation of U/D button 1165, a flow gets back to step S507 where a next thumbnail image is displayed. When there is no instruction to renew a thumbnail in step S509, a flow proceeds to step S510. In step S510, if select dial 202 is set to any other than a reproduction mode, this sequence is finished, but when select dial 202 is not set to the foregoing, a flow gets back to step S506. When an individual image selection is set in step S508, a flow proceeds to step S520 of FIG. 16.

When a single reproduction image is set in step S506, a flow proceeds to step S511 where a thumbnail image of master camera A is displayed. Then, it is checked in step S512 whether or not an individual image out of a thumbnail image on display is selected. When an individual image reproduction is set in this step, a flow proceeds to step S520, but when an individual image is not selected, a flow proceeds to step S513. When it is judged in step S513 that a thumbnail renewal operation is not performed, a flow proceeds to step S510. When a setting is to select a next thumbnail image via an operation of U/D button 1165 in step S513, a flow proceeds to step S514. In this step S514, it is checked whether or not a thumbnail image display of master camera A is finished. If not finished, a flow gets back to step S511 where a next thumbnail image is displayed, but when it is finished, a thumbnail image of slave camera B that was already transferred in step S505 as explained before is displayed in step S515 following a thumbnail display of master camera A.

This typical example of this sequence will be represented in FIG. 68. An upper part of FIG. 68 represents a case where reproduction images from master camera A are divided into four (4) small screens and a thumbnail image is displayed with the four small screens and as master camera A stores up to 11th images, three small image screens with $9^{th}$, $10^{th}$ and $11^{th}$ are displayed. Then, when UP button 1165 is pressed, four small image screens of slave camera B with 1st, $2^{nd}$, $3^{rd}$ and $4^{th}$ are displayed as represented in a lower part of FIG. 68. When it is judged in step S516 that an individual image out of a thumbnail image is selected, a flow proceeds to step S520 of FIG. 16, but when is not selected, a flow proceeds to step S517 where it is checked whether or not a next thumbnail image display operation is performed. When U/D button 1165 is not pressed, a flow proceeds to step S510, but when it is judged that U/D button 1165 is pressed, it is checked in next step S518 whether or not a thumbnail image display of a slave camera is finished. When not finished, a flow gets back to step S515 where a next thumbnail image is displayed. When finished, a flow proceeds to step S519 where it is checked whether or not there is other thumbnail image of other slave camera, and if there is, a flow gets back to step S515 and then a thumbnail image of other slave camera is displayed likewise. When reproductions of thumbnail images of all slave cameras are complete, a flow gets back to step S520 where a reproduction of a master camera is started. Accordingly, thumbnail images of a master camera and a slave camera are consecutively and repeatedly displayed in order.

What has been explained so far represents an example that a thumbnail image is displayed in order of a camera storing an image data, but this thumbnail image may be displayed in order of shooting including a slave camera (not shown). Namely, a shot day/time of each image data stored into slave camera B is already transferred to master camera A from slave camera B in step S520, so it becomes easy to perform a thumbnail display in order of shooting based upon this shot day/time. In this case, a multi image setting judged in step S506 is not required Referring to FIG. 16, a sequence of a single image reproduction will be explained. In step S520, it is checked whether a selected image is from master camera A or slave camera B. When an image of slave camera B is selected, a transfer image size in transmitting a selected image from slave camera B is selected in step S521. Regarding this transfer image size, there are two ways, one is to transfer an image data stored into slave camera B intact and the other is to transfer an image data created by downsizing an original image data for displaying in master camera A and a detail will be explained based upon FIG. 33. In step S522, a transfer image data of a size selected in step S521 is transferred to master camera A from slave camera B. This transfer step will be explained later.

In step S523, when this transferred image data is compressed, a decompressed image data is displayed on LCD monitor 109 of master camera A. When an image selected in step S520 is from master camera A, an image data stored into a memory card of master camera A is decompressed when required and a single image is displayed on a screen in step S523. When an image data of slave camera B is displayed on a single screen in this step S523, as a small image data of a thumbnail image of slave camera B was already transferred to master camera A in step S505 of FIG. 14, if the image for displaying is displayed after the small image data for a thumbnail display is displayed, a latency time required for transfer and decompression over a period of time from a setting to a display is lessened. Even in a case of master camera A, it is preferable to display a thumbnail image while decompressing.

Figure 14:
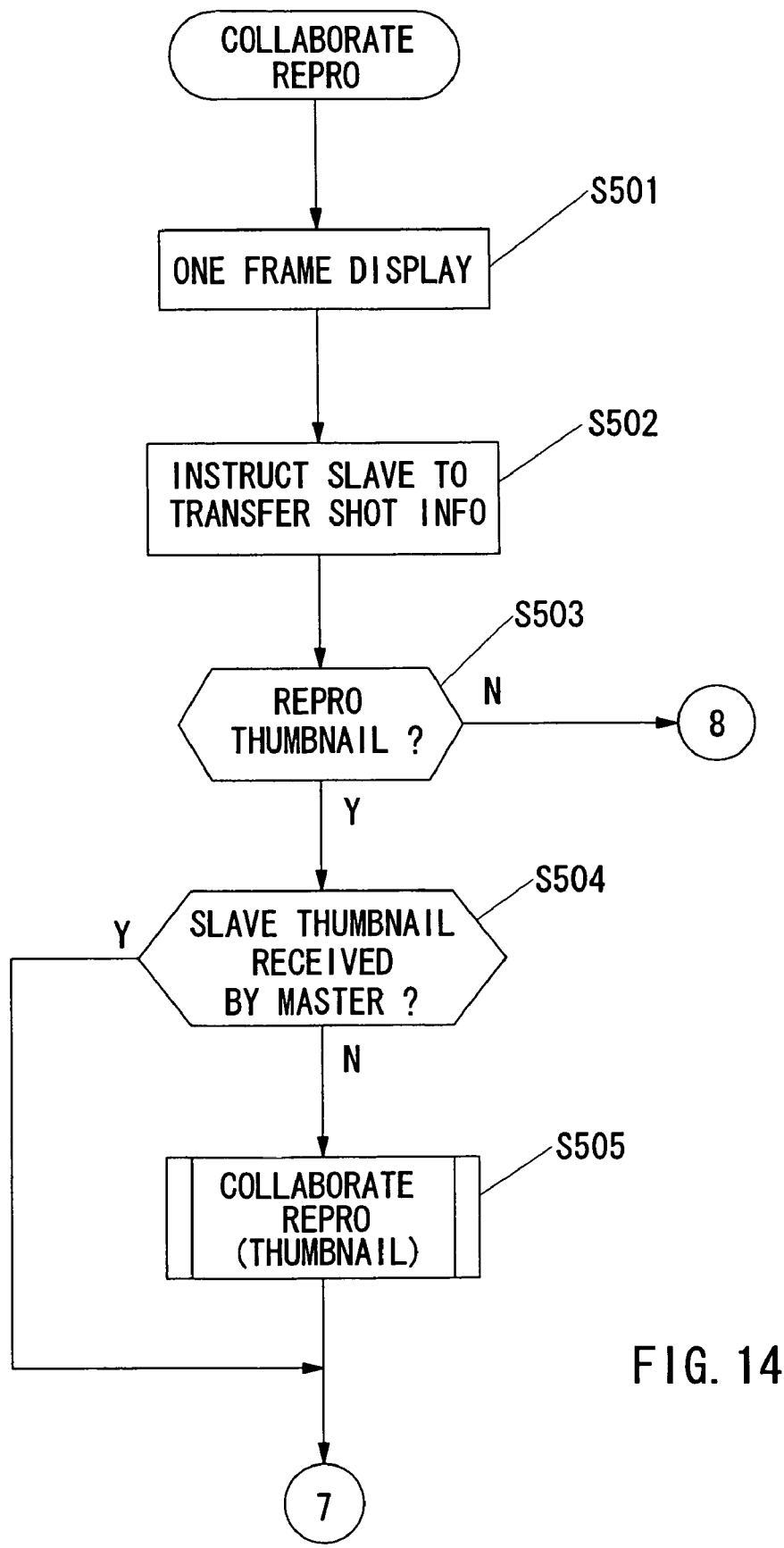
FIG. 14 is a flow chart illustrating a sequence of a collaborating reproduction.
Figure 15:
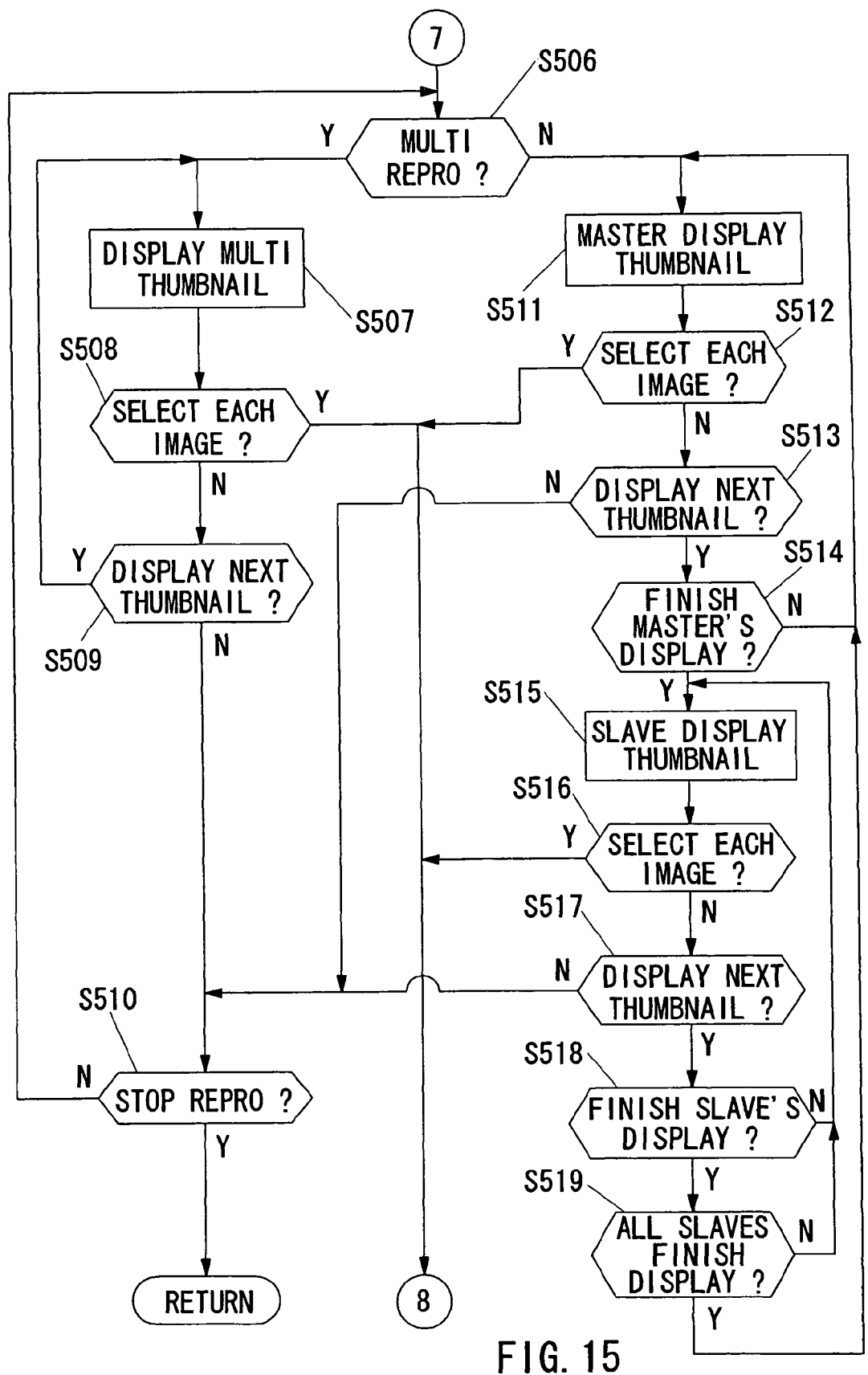
FIG. 15 is a flow chart illustrating a sequence of a collaborating reproduction.
Figure 16:
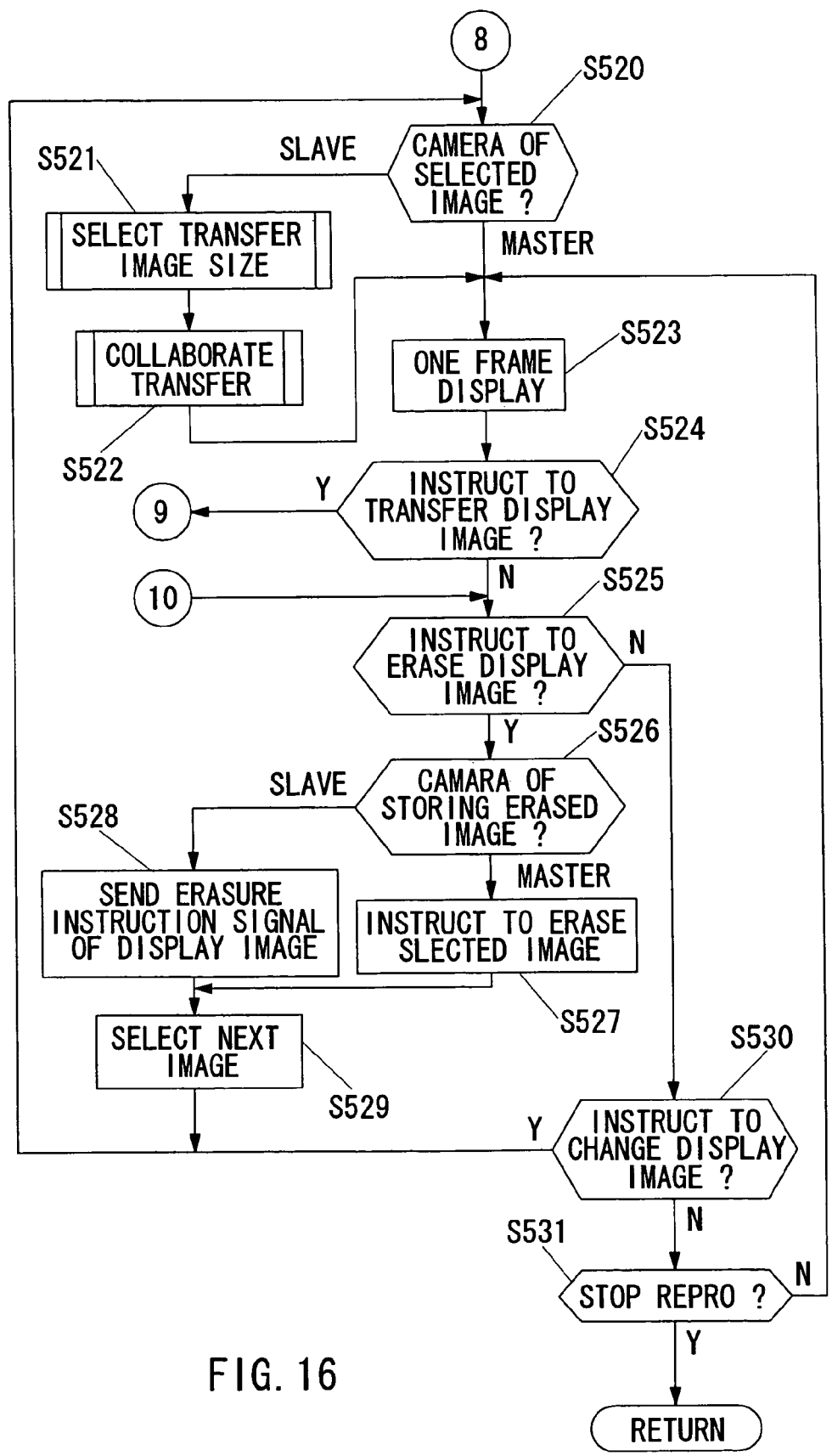
FIG. 16 is a flow chart illustrating a sequence of a collaborating reproduction.

When a flow proceeds to step S520 directly from step S503 of FIG. 14 and a setting is set to perform a single image display of a slave image, as master camera A does not receive yet any image of slave camera B, an image data used for a thumbnail image is first transferred at a time of transferring in step S522 and this image is temporarily displayed and during this display, an image used for a display on LCD monitor 109 is transferred. With this transfer, a user's uncomfortable feeling from a setting to a display may become relaxed to some extent.

In step S524, it is checked whether or not a transfer to other camera is instructed to a displayed image by pressing transfer button 1167. If instructed, a flow proceeds to step S532 of FIG. 17, but when not instructed, a flow proceeds to step S525 where it is checked whether or not an erasure of a display image is instructed by pressing erasure button 1166. If not instructed, a flow proceeds to step S530, but when instructed, a flow proceeds to step S526. In step S526, a camera that stores an image instructed to be erased is identified and, in step S527, when an image instructed to be erased is stored into master camera A, an image data to be erased being stored into a memory card of master camera A is erased and when an image instructed to be erased is stored into slave camera B, in step S527, an erasure signal instructing to erase an image data to be erased being stored into a memory card of slave camera B is sent to slave camera B. When a display image is erased in any of step S527 or step S528, in step S529, a next image is selected to display a subsequent image data on LCD monitor 109 of master camera A. From then on, a flow gets back to step S520 and a single image display is continued.

When a display image is not erased in step S525, a flow proceeds to step S530 where it is checked whether or not a change of a display image is instructed. When it is judged that the change of a display image is instructed via U/D button 1165, a flow gets back to step S520 where a display of a newly selected image is continued. When it is judged that the change of a display image is not instructed, a flow proceeds to step S531. When it is judged in this step that select dial 202 is set to any other than a reproduction mode and a halt of a reproduction is instructed, a collaborating reproduction is finished and when it is judged that a halt of a reproduction is not instructed, a flow gets back to step S523 where a display of a selected image is continued. In this single image display mode like the thumbnail image display, as long as U/D button 1165 is pressed continuously, a display of other image in other camera is succeeded outright after a display of an image in a camera is complete as usual. And each single image of master camera A and slave camera B may get multiplied-image displayed.

In this single image display mode like the thumbnail image display, as a shot day/time is known, an image may be displayed in shooting order including slave camera B. It is quite effective when a user wants to check taken images in order of elapsed time as in the high-speed consecutive shot.

Figure 17:
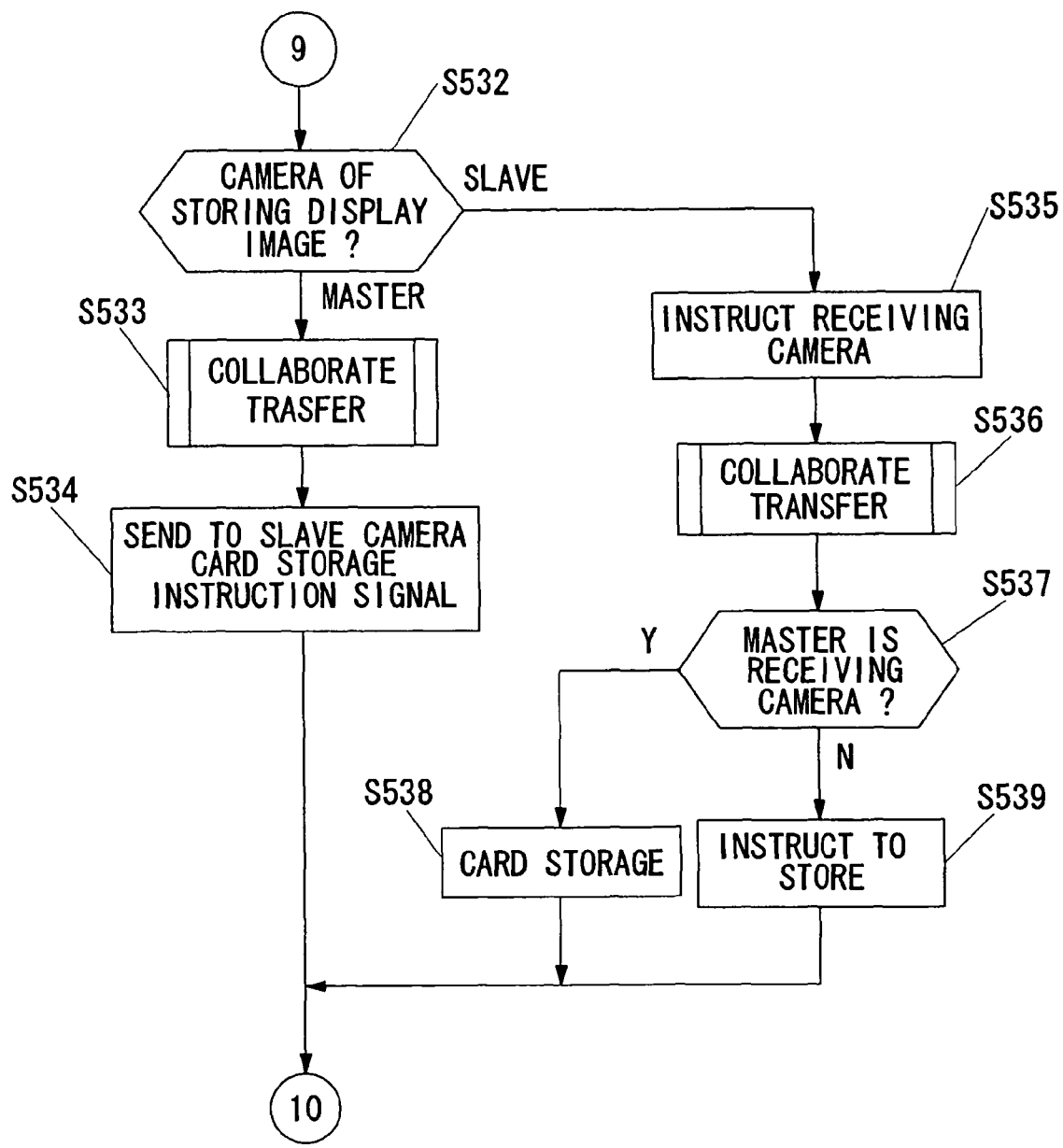
FIG. 17 is a flow chart illustrating a sequence of a collaborating reproduction.

When it is judged in step S524 that a transfer of a display image is instructed, a flow proceeds to step S532 of FIG. 17 where a camera that stores a display image is identified. When it is judged that a camera storing a display image is master camera A, a flow proceeds to step S533 where a selected image data store into a memory card of master camera A is transferred to slave camera B at a transfer destination. In step S534, a storage signal instructing to store into a memory card of slave camera B a transferred image data temporarily stored into a buffer memory of slave camera B at a transfer destination is sent. From then on, a flow gets back to step S525 where it is judged whether or not a display image data that has been already transferred is erased.

When a camera storing a transferred image is a slave camera in step S532, a flow proceeds to step S535 where slave camera B actually storing a display image is informed of a camera at a transfer destination. Then, in step S536, slave camera B at a transferring station is instructed to select and also transfer an image data from a memory car of slave camera B. In step S537, it is judged whether a camera at a transfer destination is master camera A or other slave camera. When a camera at a transfer destination is master camera A, in step S538, a transferred image data that is stored into buffer memory 105 of master camera A is stored into a memory card of master camera A. When a camera at a transfer destination is other camera, in step S539, a storage signal instructing to store into a memory card of this slave camera a transferred image data stored into a buffer memory of this slave camera is sent to this slave camera. After any of step S538 or step S539 is complete, a flow gets back to step S525 of FIG. 16 where it is judged whether or not an image data that has been already transferred is erased.

Anyway, when "Slide show" reproduction is performed, processes of step S520 to step S525 and step S530 are all automatically repeated. In this case, a reproduction may be performed in shooting order including slave camera B.

A detail of a selection of a transfer image size referred to in step S521 will be explained based upon FIG. 33. When transferring an image data from slave camera B to display a stored image of slave camera B on LCD monitor 109 of master camera A, a large amount of a transfer image data takes much time to transfer and a latency time from a setting to a display gets longer, which irritates a user. As for cases bringing about these occurrences, for example, an image data stored by non-compression is transferred, a compressed image data is transferred by expanding this data or a number of imaging pixels of slave camera B is quite large and an amount of a compressed data is still large even though the data is compressed.

Figure 33:
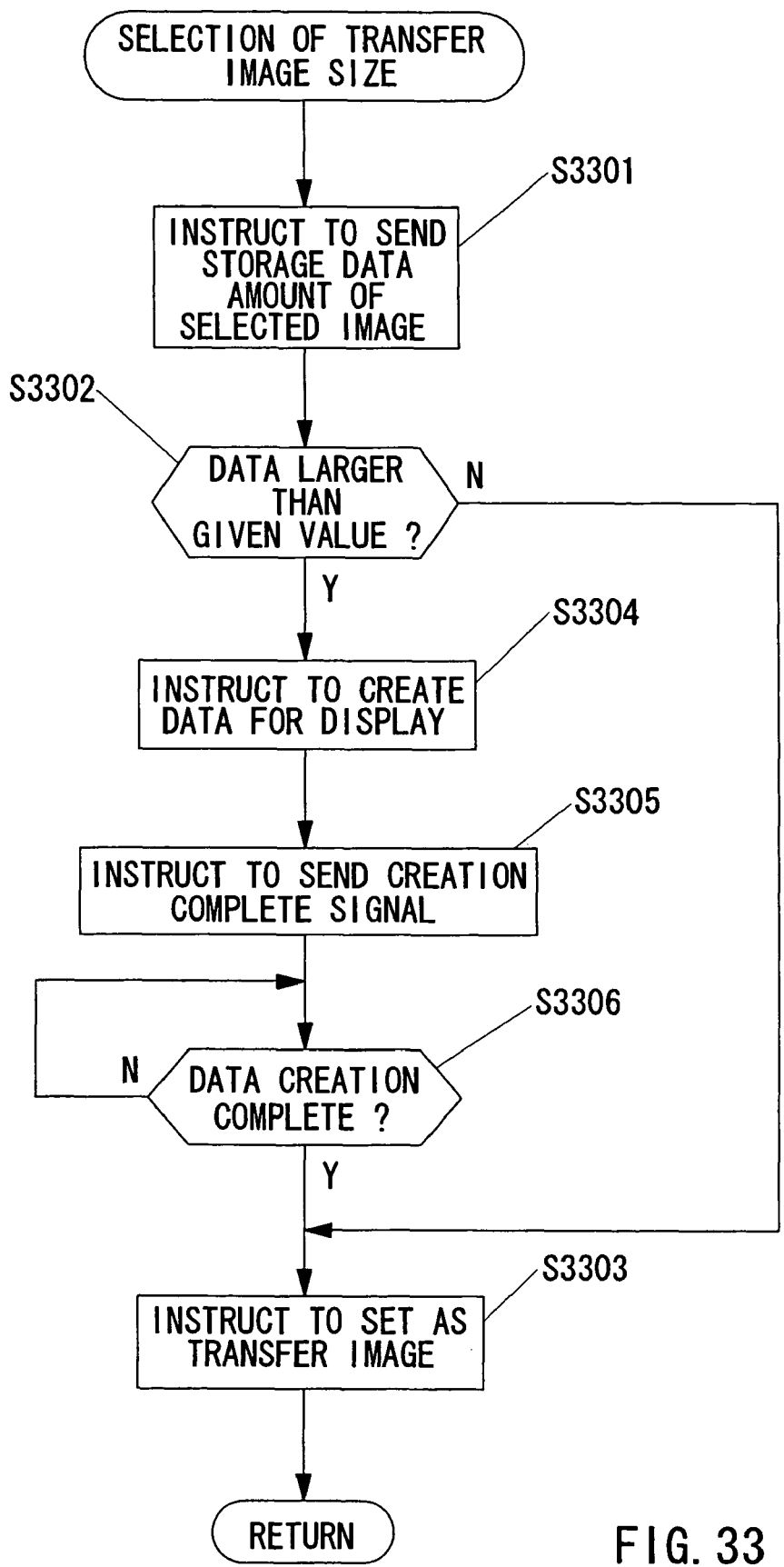
FIG. 33 is a flow chart illustrating a sequence of selecting a transfer image size.

At first, in step S3301 of FIG. 33, a transmit instruction signal is sent to slave camera B so as to transmit to master camera A a size of an amount of a data of a selected image in slave camera B. In step S3302, an amount of a data of an image transmitted from slave camera B is compared to a given value. A given value is a value that brings a resolution power to the extent of being sufficient for displaying on LCD monitor 109 of master camera A. When it is in step S3302 judged that an amount of a stored image data is smaller than this given value, a transfer time is judged to be short and in step S3303, slave camera B is instructed to take an image data stored into a memory card of slave camera B as a transmit image data intact and then this routine is finished. A case where an amount of a data is small corresponds to cases where an amount of a non-compressed data is small from the beginning and an amount of a data becomes small by compression.

When it is judged in step S3302 that an amount of a stored image data is larger than this given value, a flow proceeds to step S3304 where slave camera B is sent an instruction signal to create a data used for a display in master camera A. In step S3305, slave camera B is instructed to send a display data creation complete signal indicative of completion of creating a data used for a display in slave camera B based upon the instruction signal. In step S3306, when waiting for and receiving the display data creation complete signal, a flow proceeds to step S3303 where slave camera B is instructed to take a created image data as a transfer image data.

A selection of a transfer image size can apply to a transfer of a thumbnail image in step S505 of FIG. 14 as explained before. As described before, provided that a thumbnail image in step S505 has been created and attached to each image data in advance, a thumbnail image herein is transferred intact. On the contrary, when an image data file without a created thumbnail image is stored or, for example, four-part split screen of a reproduction thumbnail image and twelve-part split screen of a reproduction thumbnail image can be selected, slave camera B may be instructed to send a data that is downsized in response to the split number in transferring a thumbnail image in step S505 of FIG. 14.

So far, a case where an image data is displayed on an almost overall screen of LCD monitor 109 has been explained. When viewing an image in detail by enlarging or displaying an entire screen by scrolling, there is a case where all image data are needed. In this case, all image data are caused to be transferred while an image data used for a display of the entire screen is first transferred prior to a transfer of all image data and is temporarily displayed on LCD monitor 109. With this process, a user's uncomfortable feeling can be lessened.

<<Collaborating Transfer Sequence>>

Figure 18:
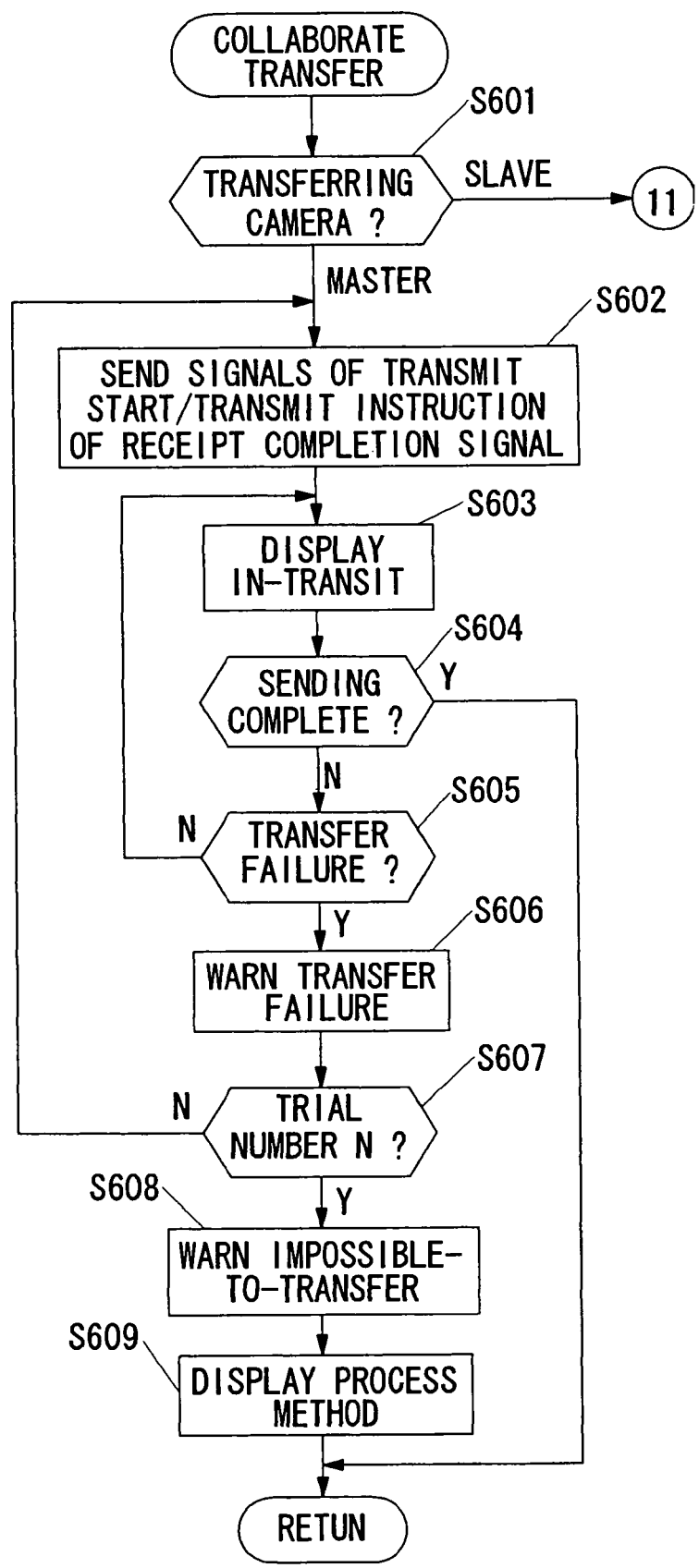
FIG. 18 is a flow chart illustrating a sequence of a collaborating transfer.
Figure 19:
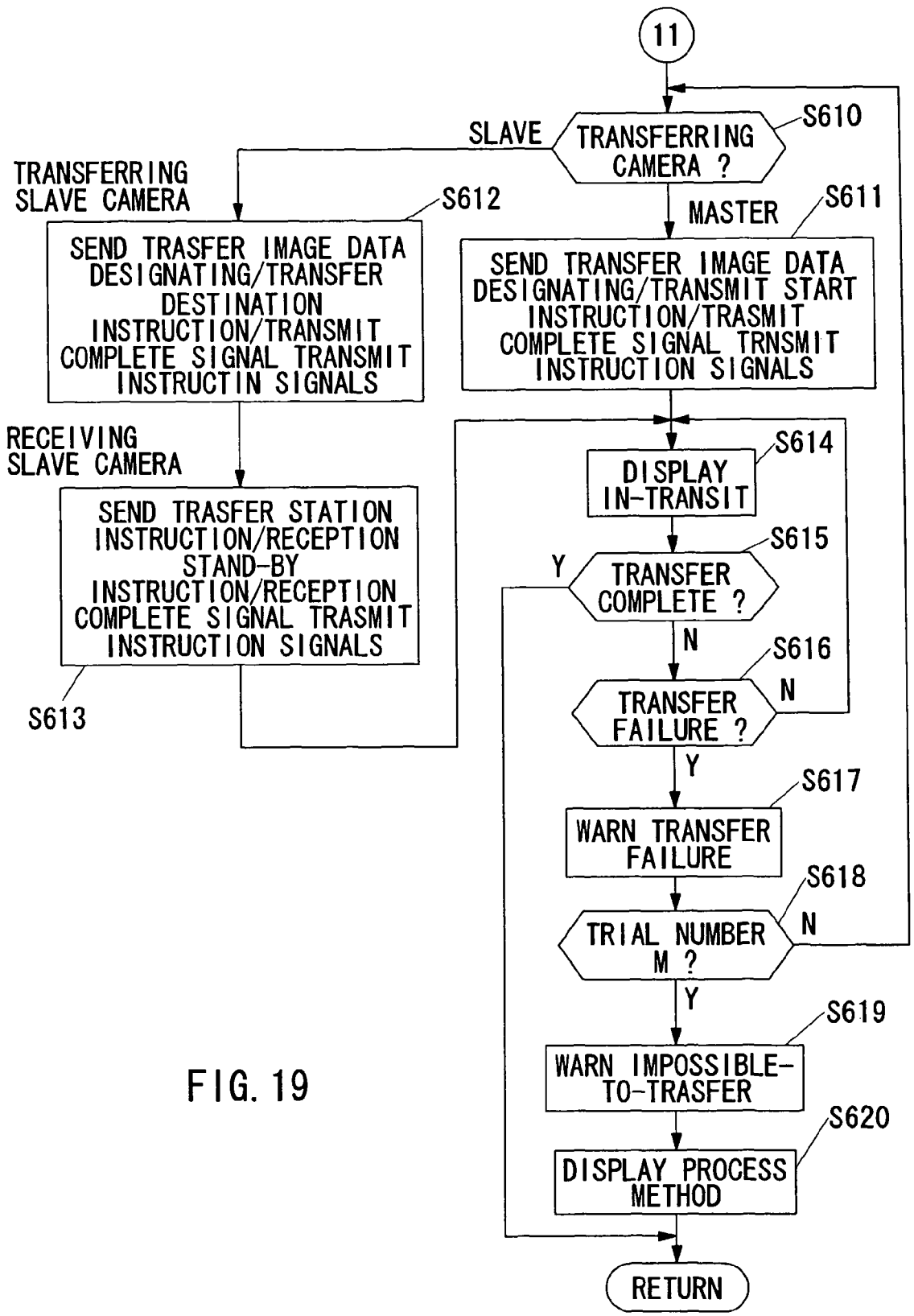
FIG. 19 is a flow chart illustrating a sequence of a collaborating transfer.

Referring to FIGS. 18 and 19, a sequence of a collaborating transfer will be explained. First, in step S601, a camera that transfers an image data is identified. When a camera at a transferring station is master camera A, a flow proceeds to step S602 and when a camera at a transferring station is slave camera B, a flow proceeds to step S610 of FIG. 59. In step S602, master camera A sends slave camera B a transmit-start signal ordering to start a transmit of an image data and a reception-complete-signal-transmit signal instructing to transmit to master camera A a reception complete signal when completing a reception of an image data in slave camera B. In step S603, blinking LEDs of master camera A and slave camera B display that an image is being transferred between master camera A and slave camera B.

In step S604, it is checked whether or not a reception complete signal is sent from slave camera B and when master camera A receives a reception complete signal from slave camera B, a sequence of a collaborating transfer is finished assuming that storage of a transfer image data into a buffer memory of slave camera B of a transfer station is complete. When a reception complete signal is not received in step S604, it is checked in step S605 whether an image is in transit or a transfer was failed. If it is judged that an image is still in transit, a flow gets back to step S603 where an image is transferred and an in-transit display is continued. When it is judged that a communication line has been suspended exceeding over a given period of time or has been completely cut, it is judged that a transfer was failed and in step S606, a transfer fail is warned. As this warning method, a display of LCD monitor 109 (not shown) and an audio warning of buzzer 124 are available. In this case, slave camera B also has an audio warning with a buzzer and a LED used for displaying in-transit status of slave camera B blinks in place of a shut-off LCD monitor.

In step S607, it is judged whether or not this transfer fail amounts to given times (N times). If a transfer fail does not amount to given times, a flow gets back to step S602 and a transfer of an image data to slave camera B is once again started. When this transfer fail amounts to N times, in step S608, LCD monitor 109 displays that a transfer is impossible and an audio warning is performed by buzzer 124. At this moment, in step S609, a menu to let a user select a subsequent process is displayed.

Figure 69:
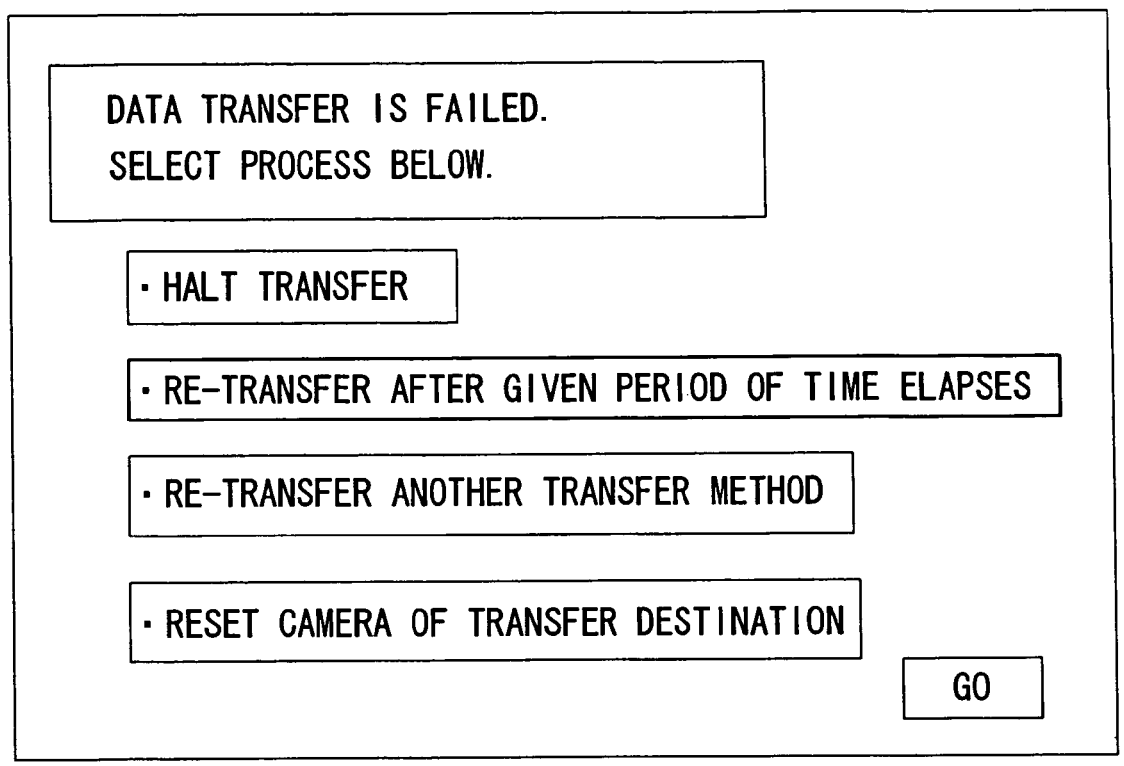
FIG. 69 is an example of a warning when a data transfer failed and a menu display for selecting a subsequent process.

FIG. 69 represents a menu example of a process item in this case. Four kinds of choices are displayed herein; (1) Halt transfer, (2) Start automatic transfer after a given period of time elapses, (3) Select other transferable method if available and (4) Change a camera at a transfer destination. When any of three choices other than (1) is selected, depending upon each content, a coming up subsequent screen lets a user set a given time up to a re-transfer, other transferable method or a different camera at a transfer destination, but examples of these screens are omitted.

A case where a camera at a transfer station that transfers an image data is slave camera B in step S601 will be explained referring to FIG. 19. In this case, first, a camera at a transfer destination is identified. When a camera at a transfer destination is master camera A, a flow proceeds to step S611 where master camera A sends slave camera B at a transfer station a transfer-image data-designate-signal designating a single transfer image data from image data of all thumbnail images stored into slave camera B, an image data designated to be transferred out of image data stored into a memory card and an image data used for a display on LCD monitor display, a transmit start signal instructing to start a transmission of the designated image data to master camera A and a transmit-completion-signal instruct-to-transmit signal notifying master camera A of completion of a transmission when a transmission of an image data is complete.

Regarding an image data designated to be transferred out of all thumbnail image data and image data stored into a memory card of slave camera B, slave camera B selects and starts to transfer a transfer image data immediately when slave camera B is instructed to start a transfer by master camera A. On the other hand, slave camera B reproduces an image data from a memory card of slave camera B and then a reproduced image data has be processed to make a data used for a display, so a time is delayed to some extent until a transfer is started. In this case, as explained before, while a thumbnail image with a small data is transferred at the beginning and is displayed on LCD monitor 109 of master camera A, an image data used for a display is created and is caused to be transferred. With this procedure, uncomfortable feeling against a delayed display can be lessened. Also, a data to be transferred in a collaborating transfer may be a voice data or a text data rather than the foregoing three kinds of image data.

In step S610, when a transfer destination of an image data is other slave camera other than slave camera B, a flow proceeds to step S612. In this step, master camera A sends slave camera B at a transfer station a transfer-image data-designatesignal designating an image data to be transferred out of image data stored into a memory card of slave camera B, a-camera at a transfer destination-instruction signal, a transmit start signal instructing to start a transmission to other slave camera and a transmit-completion-signal instruct-to-transmit signal notifying other slave camera of completion of a transmission when a transmission of a transfer image data is complete. In this step S612, the several signals are sent to slave camera B at a transfer station and at this moment, in step S613, other slave camera at a transfer destination is sent a camera at a transfer station instruction signal, a reception stand-by signal instructing to stand by reception of an image data from a camera at a transfer station and a reception complete signal transmit instruction signal notifying master camera A and slave camera B of reception of a transferred image data is complete.

When an image data transfer is started in any of step S611 or step S612, in step S614, LEDs used for a display of data in-transit of master camera A and slave camera B blink to denote that an image is in-transit between master camera A and slave camera B. When an image data is being transferred from slave camera B to other slave camera, on top of slave cameras sending/receiving an image data, even master camera A performs an in-transit display to represent an in-collaborating transit. In sep s615, judging from master camera A's reception of a transmit completion signal from slave camera B (in transferring from salve camera to master camera A) or a reception completion signal (in transferring between slave cameras), completion of an image data transfer is judged. When master camera A receives the transmit completion signal or the reception complete signal, this sequence is finished assuming that storage of a transfer image data into buffer memory 105 of master camera A or a buffer memory of a camera of a transfer destination is complete.

When a reception complete signal is not received yet in step S615, it is judged whether an image is in transit or a transfer is failed. When an image is judged to be in transit, a flow gets back to step S614 where an image in-transit display is continued. If it is judged that a communication line has been suspended exceeding over a given period of time or has been completely cut, a transfer is judged to be failed and in step S617, a transfer fail warning is displayed on LCD monitor 109 or buzzer 124 performs an audio warning. At this moment, a slave camera also performs an audio warning with a buzzer and lets a LED used for a data in-transit display blink in place of a shut-off LCD monitor. In step S618, it is judged whether or not this transfer fail amounts to given times (M times).

When this transfer fail does not amount to given times, a flow gets back to step s610 where a transfer of an image data from slave camera B is once again started. When this transfer fail amounts to N times, in step S619, an impossible-to-transfer warning is performed by LCD monitor 109 or buzzer 124. Also, in step S620, a menu to respond to this warning is disclosed to a user and in response to a selection of this menu, a transfer process is performed and then this transfer sequence is finished. Content of this menu is the same as in step S609. Herein, N and M are any natural number.

What is claimed is:

1. A digital camera system comprising:
   a first digital camera; and
   a second digital camera;
   the first digital camera comprising:
   a first input/output device that sends/receives data to and from the second digital camera;
   a first plurality of operating devices;
   a first detector that detects an operation of any of the first plurality of operating devices; and
   a second controller that instructs the first digital camera to execute an instruction about taking a photograph based upon an operation of any of the first plurality of operating devices; and
   the second digital camera comprising:
   a second input/output device that sends/receives data to and from the first digital camera;
   a second plurality of operating devices;
   a second detector that detects an operation of any of the second plurality of operating devices;
   a judgment device that judges which detection result was first detected, a detection result of the second detector or a detection result of the first detector input via the second input/output device; and
   a first controller that instructs the first digital camera to execute the instruction about taking a photograph based upon an operation of any of the second plurality of operating devices when the judgment device judges that the detection result of the second detector was detected prior to the detection result of the first detector;
   wherein when the first digital camera detects an instruction about taking a photograph from the first controller while the first digital camera is executing the instruction about taking the photograph by the second controller, the first digital camera stores the instruction about taking the photograph from the first controller and only executes the instruction about taking the photograph from the first controller, which is stored in the first digital camera, after completion of all of the instruction about taking the photograph by the second controller; and
   wherein the instruction about taking the photograph is at least one of an exposure condition to take the photograph, a light metering to take the photograph, White Balance (WB) condition to take the photograph, a shooting lens position to take the photograph, a shutter speed to take the photograph, an aperture value to take the photograph, chromaticness to take the photograph, a shooting sensitivity to take the photograph, an edge enhancement value to take the photograph, a compression ratio to take the photograph, a number of recording pixels to take the photograph and a time setting to take the photograph.

2. The digital camera system set forth in claim 1, wherein when the judgment device judges that the detection result of the first detector was first detected prior to the detection result of the second detector, the first controller is prohibited from controlling the first digital camera.

3. The digital camera system set forth in claim 1, wherein the second controller is prohibited from controlling the first digital camera while the first digital camera is being controlled by the first controller.

4. The digital camera system set forth in claim 1, wherein the first controller is prohibited from controlling the first digital camera while the first digital camera is being controlled by the second controller.

* * * * *

UNITED STATES PATENT AND TRADEMARK OFFICE
Certificate

Patent No. 8,189,059 B2                                                                                                                Patented: May 29, 2012

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Takumi Kawahara, Ichikawa (JP); and Tadashi Ohta, Yokohama (JP).

Signed and Sealed this Twelfth Day of February 2013.

<div style="text-align:right">

SINH TRAN
*Supervisory Patent Examiner*
Art Unit 2661
Technology Center 2600

</div>